United States Patent [19]

Takashima et al.

[11] Patent Number: 5,768,430
[45] Date of Patent: Jun. 16, 1998

[54] MOTION VECTOR DETECTION APPARATUS AND PREDICTIVE CODING SYSTEM FOR COMPENSATING FOR MOVEMENT WITH THE APPARATUS

[75] Inventors: Masatoshi Takashima, Tokyo; Eiji Ogura, Saitama, both of Japan

[73] Assignee: Sony Corporation, Tokyo, Japan

[21] Appl. No.: 869,678

[22] Filed: Jun. 5, 1997

Related U.S. Application Data

[62] Division of Ser. No. 515,527, Aug. 15, 1995.

[30] Foreign Application Priority Data

Aug. 25, 1994 [JP] Japan .................. 6-200662

[51] Int. Cl.$^6$ ............................. G06K 9/36
[52] U.S. Cl. ............................. 382/236
[58] Field of Search ............... 382/232, 236, 382/238, 239, 240, 248, 250; 358/433; 348/394, 396, 407, 409, 413, 416, 420, 421

[56] References Cited

U.S. PATENT DOCUMENTS

| Re. 35,093 | 11/1995 | Wang et al. | 348/413 |
|---|---|---|---|
| 5,402,185 | 3/1995 | De With et al. | 348/407 |
| 5,475,432 | 12/1995 | Park | 348/409 |
| 5,610,659 | 3/1997 | Naturi et al. | 348/396 |

*Primary Examiner*—Jose L. Couso
*Attorney, Agent, or Firm*—Frommer Lawrence & Haug LLP; William S. Frommer

[57] ABSTRACT

A reference frame block from a memory is supplied to a feature extraction circuit and a search frame block from a separate memory is supplied to a feature extraction circuit. Within the extraction circuits, the frame blocks are divided into minor blocks and the integration of all pixels for each minor block gives a matching element. A matching process with the matching elements from the extraction circuits provides a frame motion vector. Data division circuits divide the matching elements provided from the extraction circuits into odd- and even-field matching elements, and the matching process with the odd- and even-field matching elements provides odd- and even-field motion vectors. This eliminates the need for a feature extraction circuit when obtaining field matching elements.

4 Claims, 49 Drawing Sheets

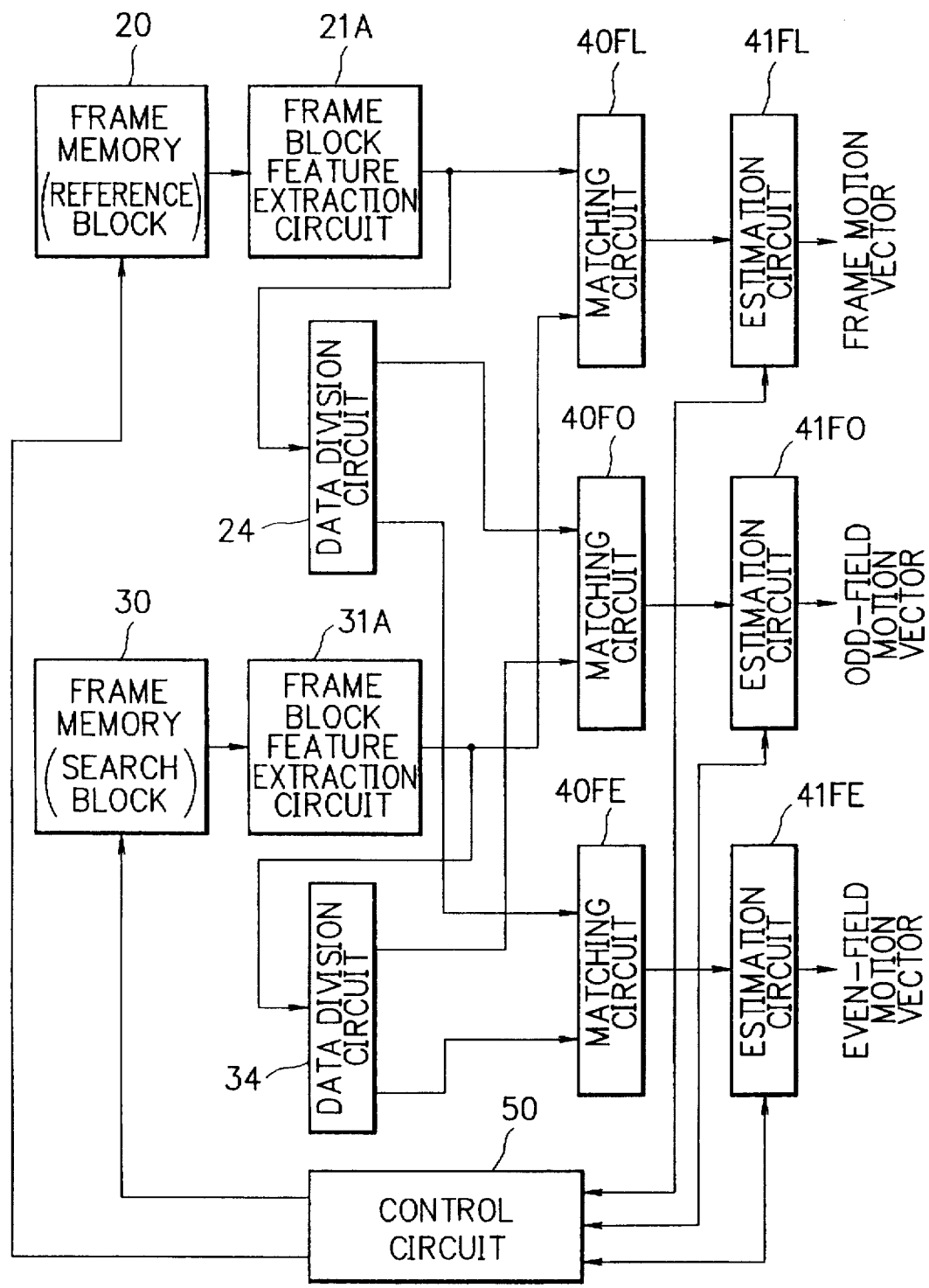
F I G. 1

FRAME BLOCK

DIVISION INTO MINOR BLOCK

EXAMPLE OF
ONE MINOR BLOCK

FRAME MATCHING ELEMENTS

ODD-FIELD
MATCHING ELEMENTS

EVEN-FIELD
MATCHING ELEMENTS

FRAME MATCHING ELEMENT

ODD-FIELD MATCHING ELEMENT

EVEN-FIELD MATCHING ELEMENT

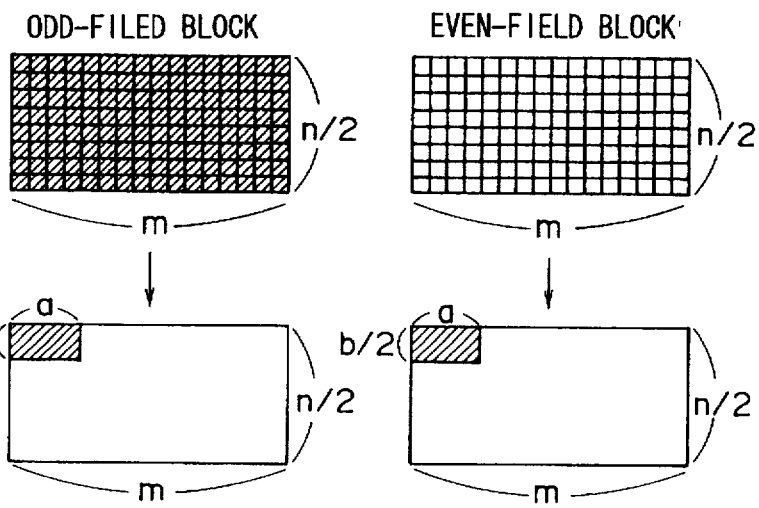
FIG. 5A
FIG. 5B DIVISION INTO MINOR BLOCK
FIG. 5C EXAMPLE OF ONE MINOR BLOCK
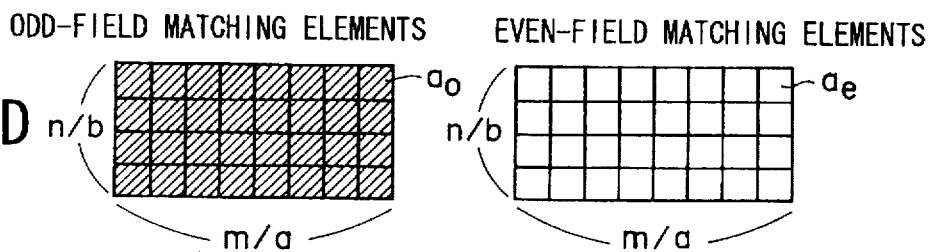
FIG. 5D
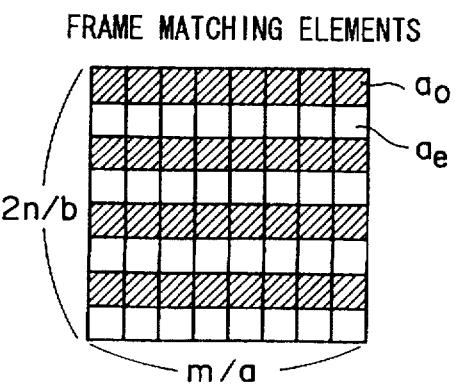
FIG. 5E

FRAME BLOCK

DIVISION INTO
MINOR BLOCK

TWO-DIMENSIONAL
FREQUENCY COMPONENT

DIVISION INTO
MINOR BLOCK

TWO-DIMENSIONAL
FREQUENCY COMPONENT

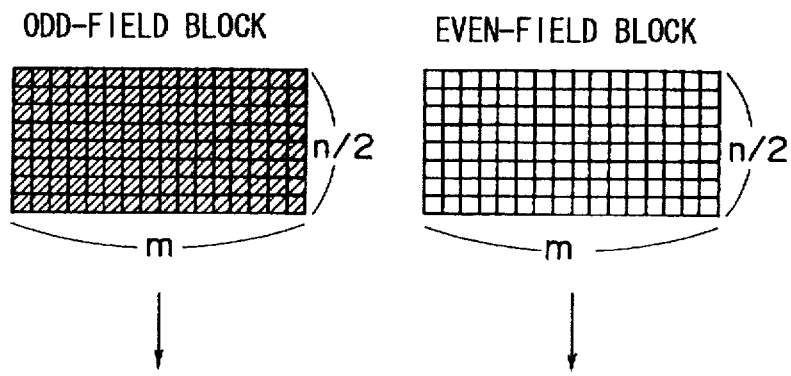
FIG. 8A
ODD-FIELD BLOCK   EVEN-FIELD BLOCK
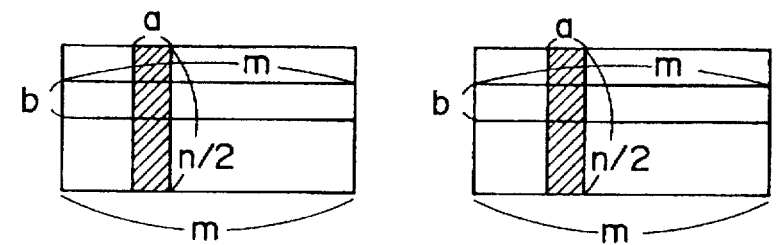
FIG. 8B
DIVISION INTO MINOR BLOCK
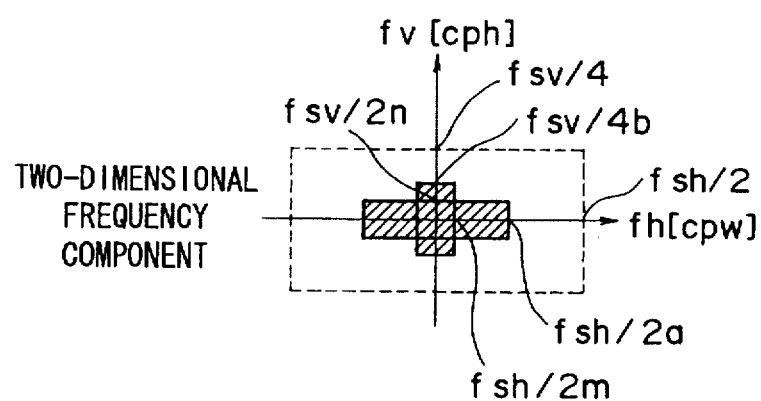
FIG. 8C TWO-DIMENSIONAL FREQUENCY COMPONENT

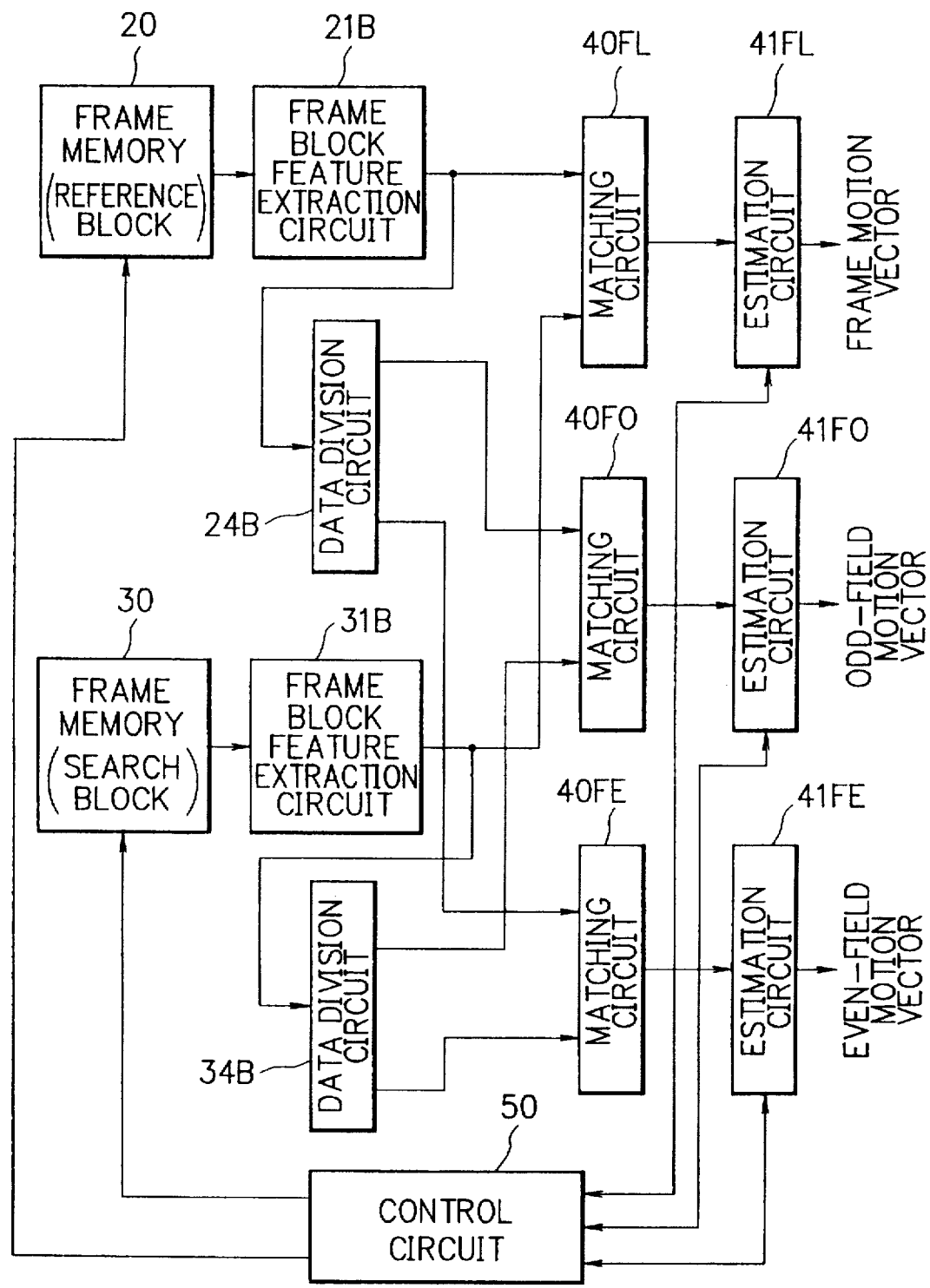
F I G. 9

FRAME BLOCK

DIVISION INTO MINOR BLOCK

EXAMPLE OF ONE MINOR BLOCK

FRAME MATCHING ELEMENTS

ODD-FIELD MATCHING ELEMENTS

EVEN-FIELD MATCHING ELEMENTS

FRAME MATCHING ELEMENT

ODD-FIELD MATCHING ELEMENT

EVEN-FIELD MATCHING ELEMENT

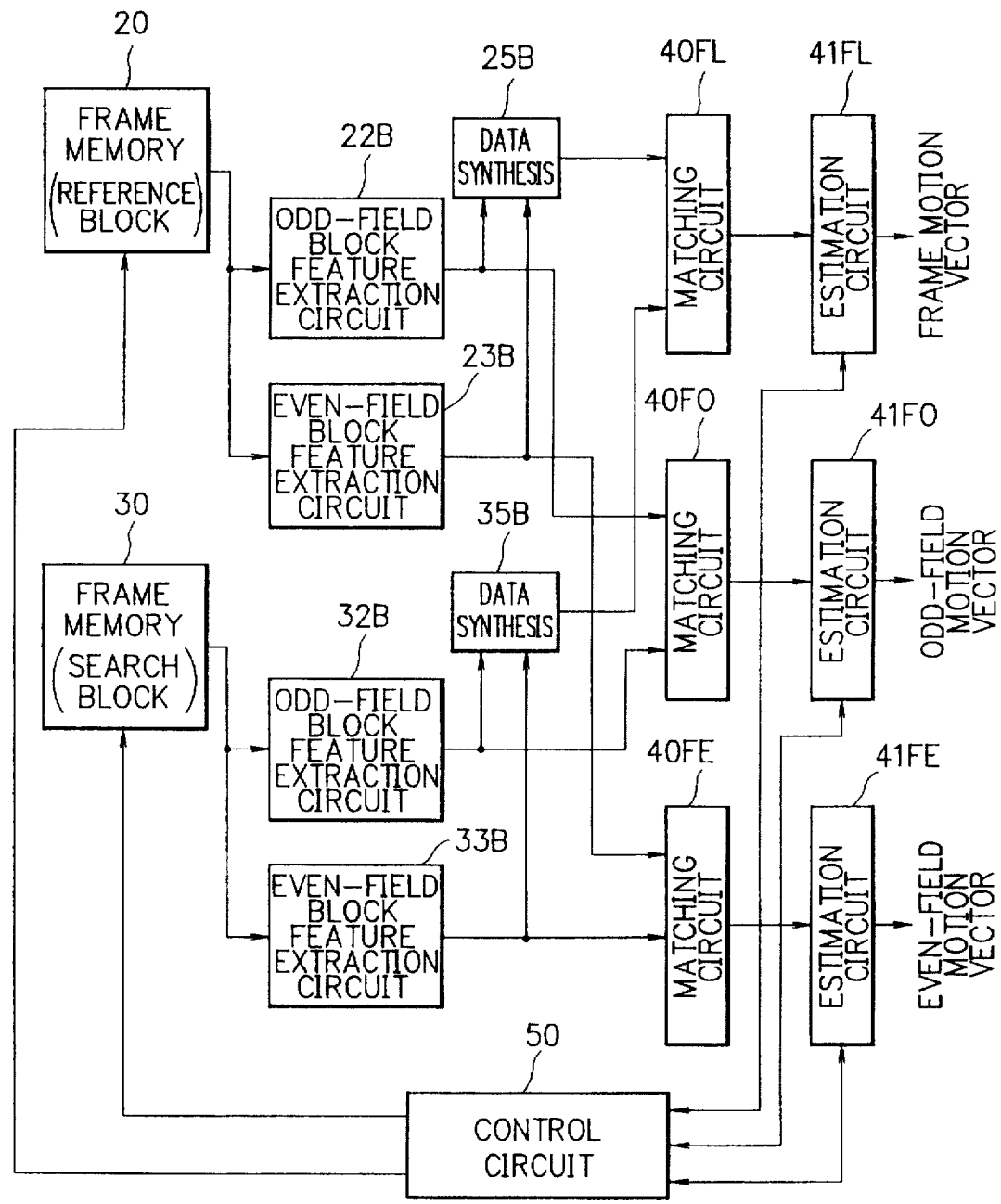
F I G. 12

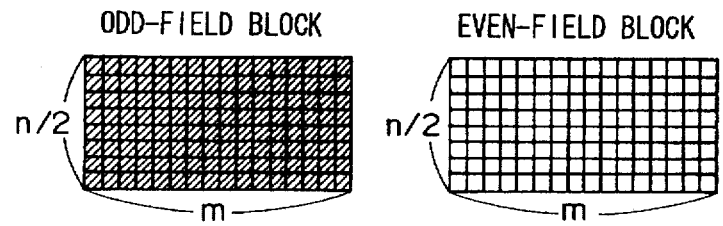
FIG. 13A
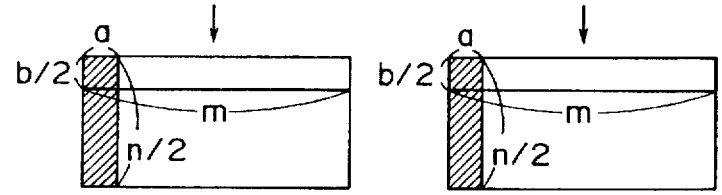
FIG. 13B DIVISION INTO MINOR BLOCK
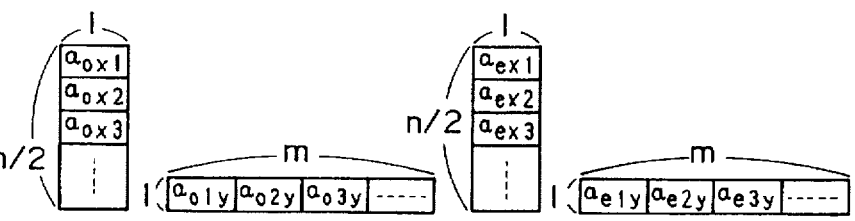
FIG. 13C EXAMPLE OF ONE MINOR BLOCK
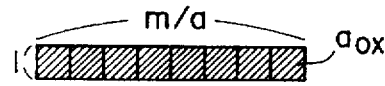
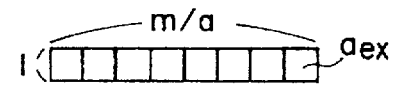
FIG. 13D
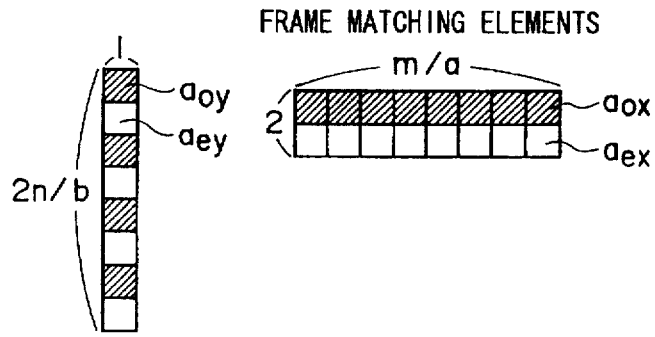
FIG. 13E

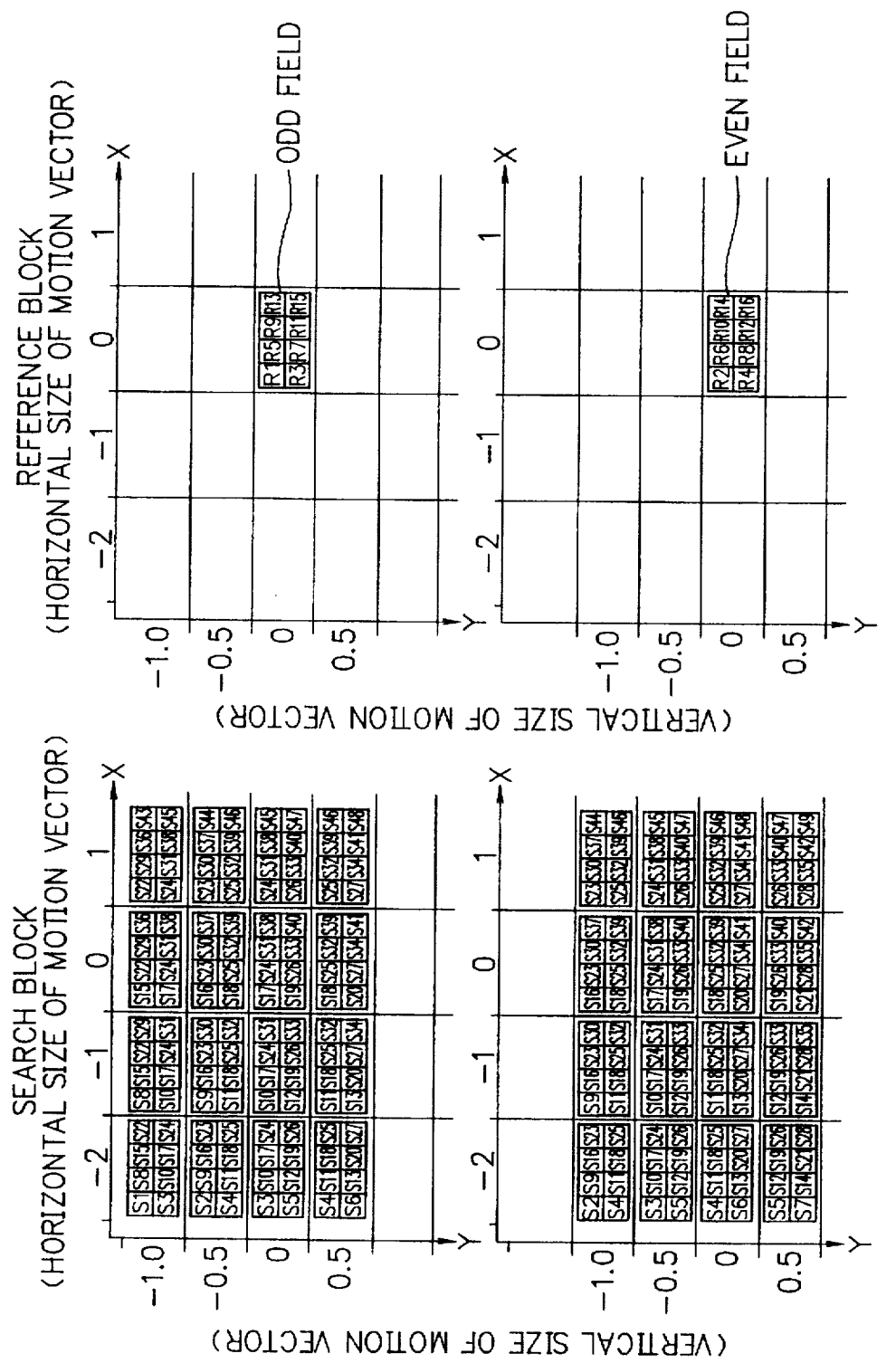
F I G. 15

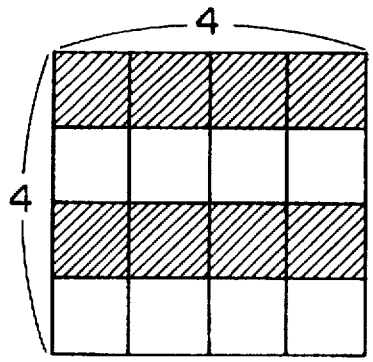
FRAME BLOCK
FIG. 16A
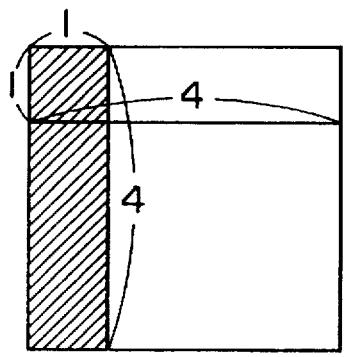
DIVISION INTO MINOR BLOCK
FIG. 16B
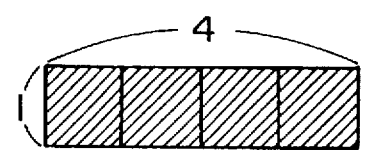
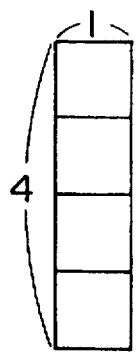
FRAME MATCHING ELEMENTS
FIG. 16C
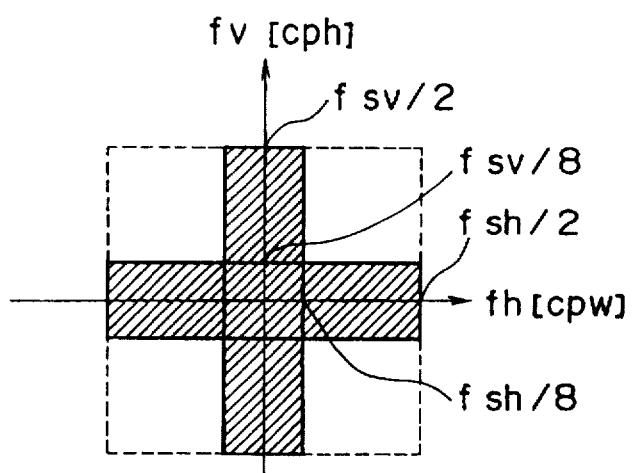
TWO-DIMENSIONAL FREQUENCY COMPONENT
FIG. 16D

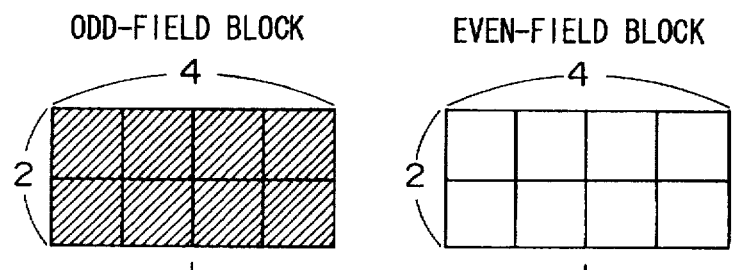
FIG. 17A
DIVISION INTO MINOR BLOCK
FIG. 17B
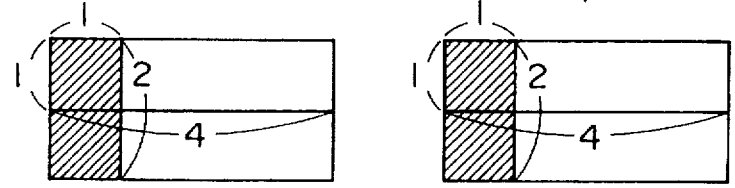
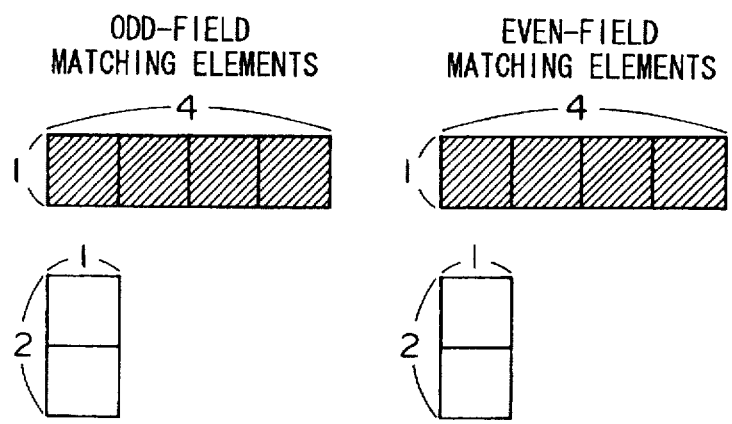
FIG. 17C
TWO-DIMENSIONAL FREQUENCY COMPONENT
FIG. 17D
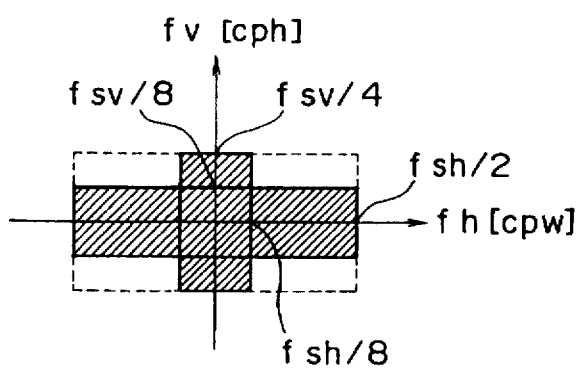

FRAME BLOCK

DIVISION INTO MINOR BLOCK

EXAMPLE OF ONE MINOR BLOCK

FRAME MATCHING ELEMENTS

ODD-FIELD MATCHING ELEMENTS

EVEN-FIELD MATCHING ELEMENTS

FRAME MATCHING ELEMENT

ODD-FIELD MATCHING ELEMENT

EVEN-FIELD MATCHING ELEMENT

FIG. 20A ODD-FIELD BLOCK / EVEN-FIELD BLOCK
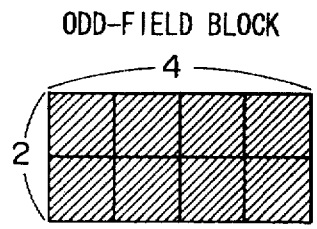 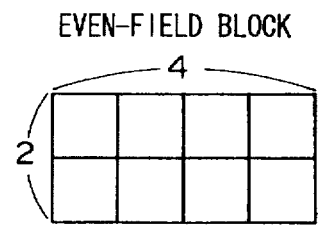
FIG. 20B DIVISION INTO MINOR BLOCK
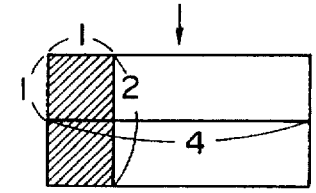 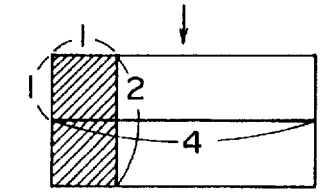
FIG. 20C EXAMPLE OF ONE MINOR BLOCK
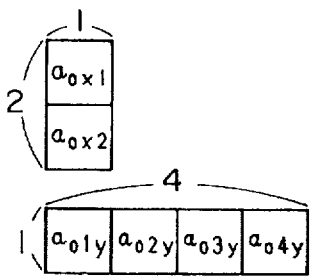 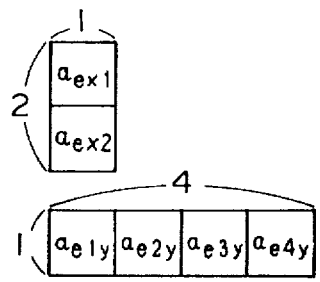
FIG. 20D ODD-FIELD MATCHING ELEMENTS / EVEN-FIELD MATCHING ELEMENTS
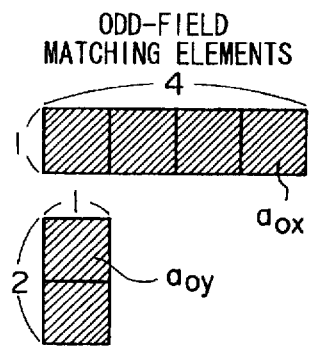 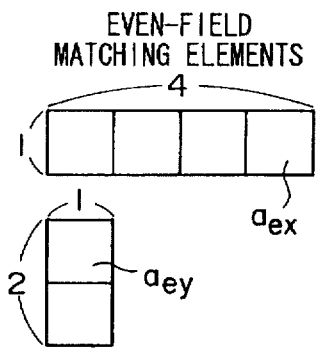
FIG. 20E FRAME MATCHING ELEMENTS
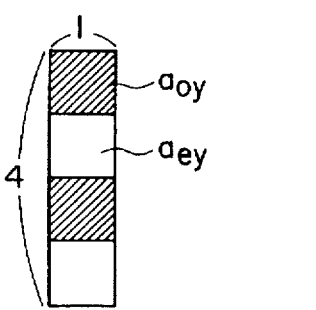 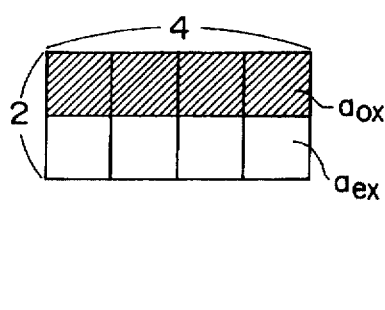

FRAME BLOCK

TWO-DIMENSIONAL FILTER (LPF)

REPRESENTATIVE VALUES

TWO-DIMENSIONAL
FREQUENCY COMPONENT

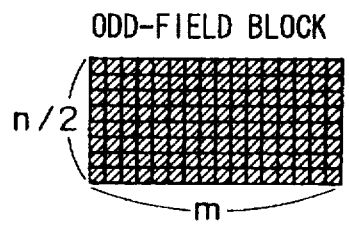
FIG. 27A
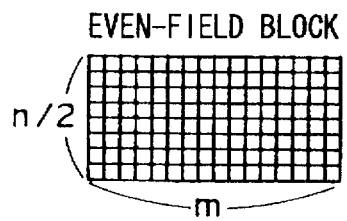
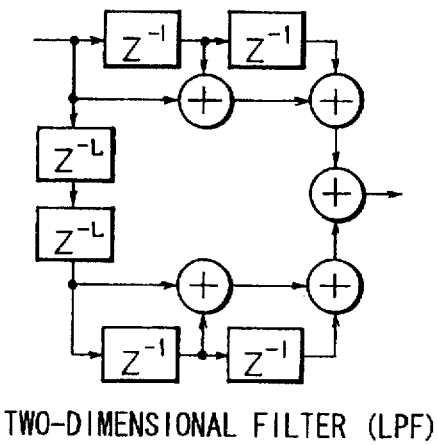
TWO-DIMENSIONAL FILTER (LPF)
FIG. 27B
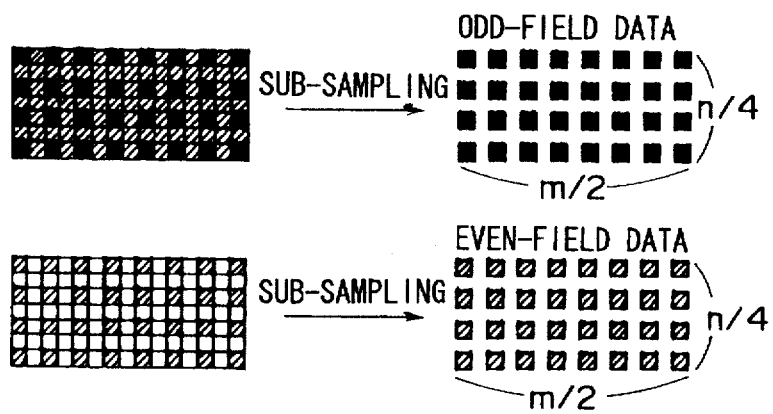
FIG. 27C    FIG. 27D
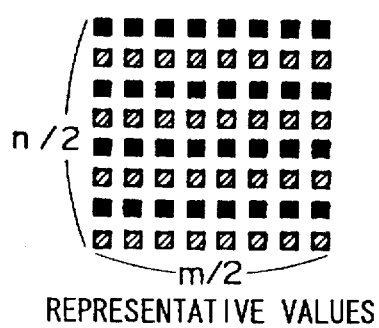
REPRESENTATIVE VALUES
FIG. 27E
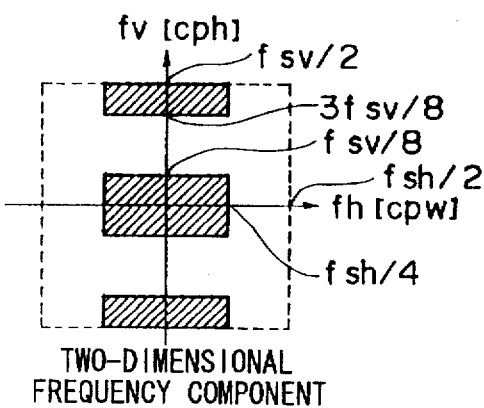
TWO-DIMENSIONAL FREQUENCY COMPONENT
FIG. 27F

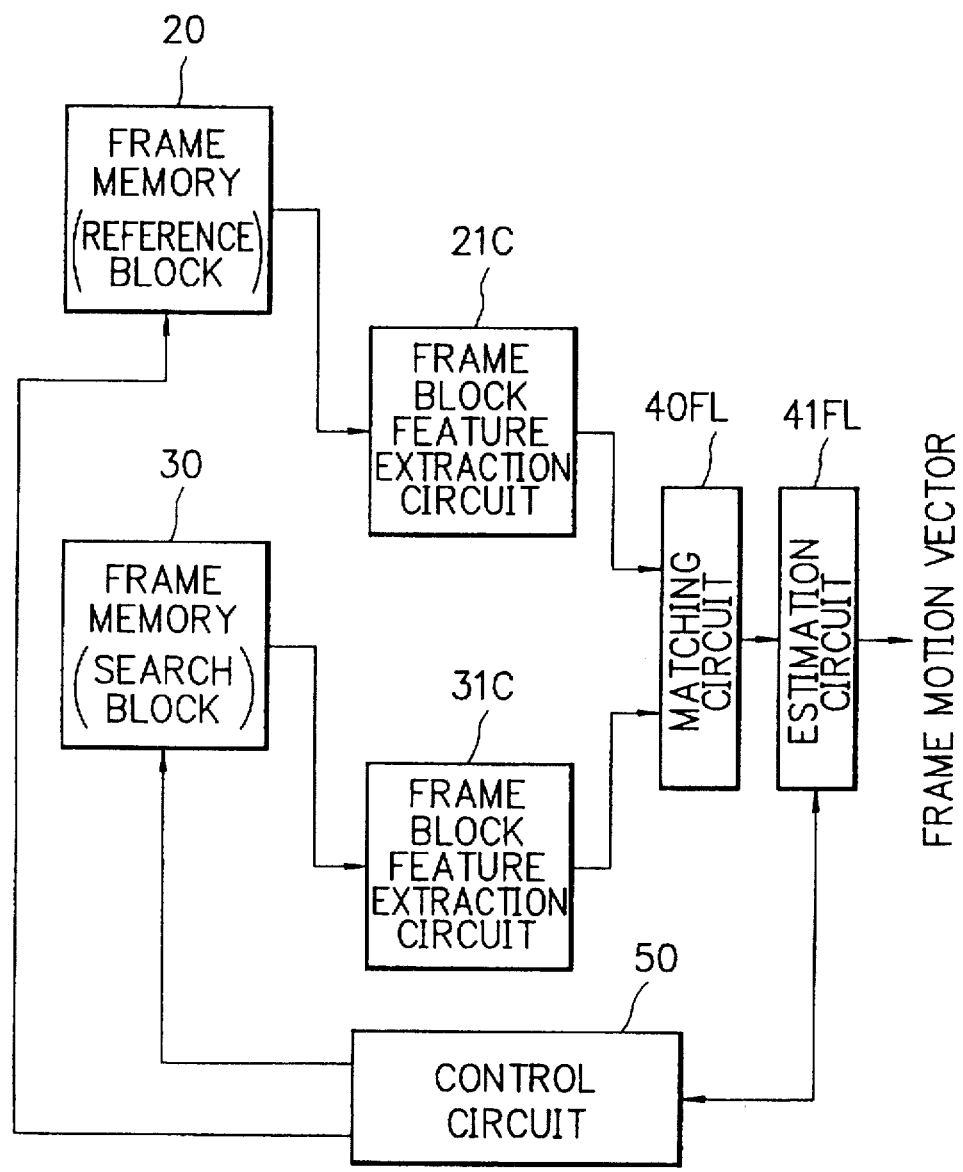
F I G. 28

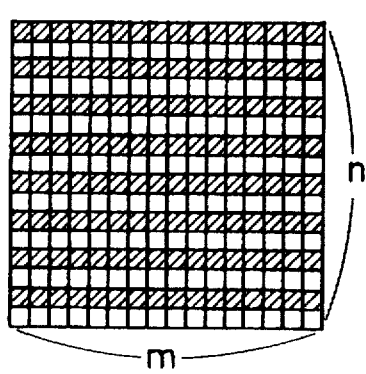
FRAME BLOCK
FIG. 29A
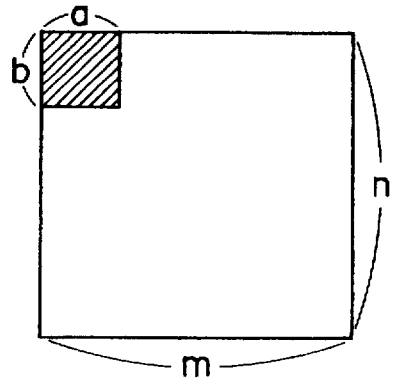
DIVISION INTO MINOR BLOCK
FIG. 29B
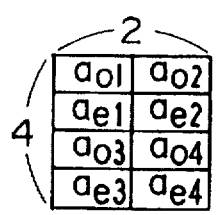
EXAMPLE OF ONE MINOR BLOCK
FIG. 29C
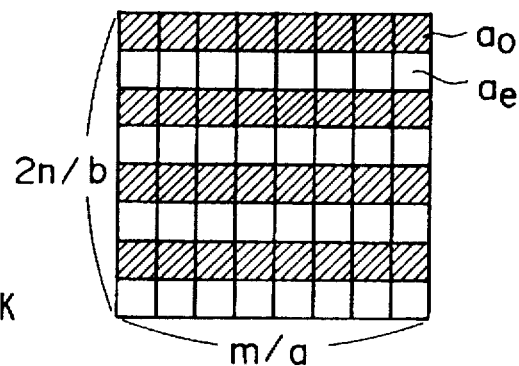
FRAME MATCHING ELEMENT
FIG. 29D
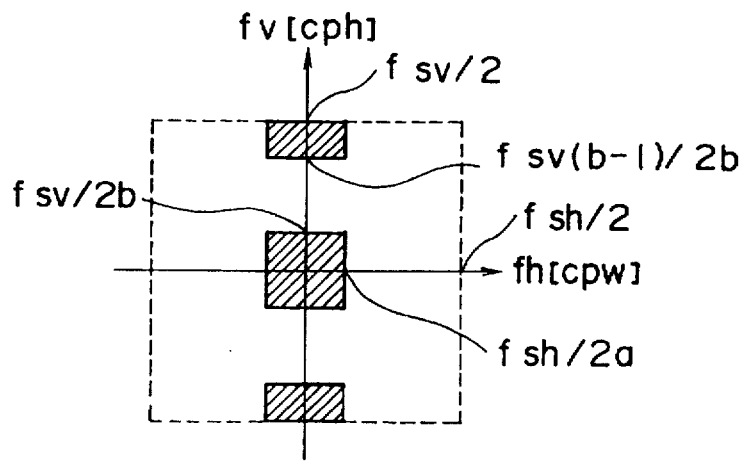
FIG. 29E   TWO-DIMENSIONAL FREQUENCY COMPONENT

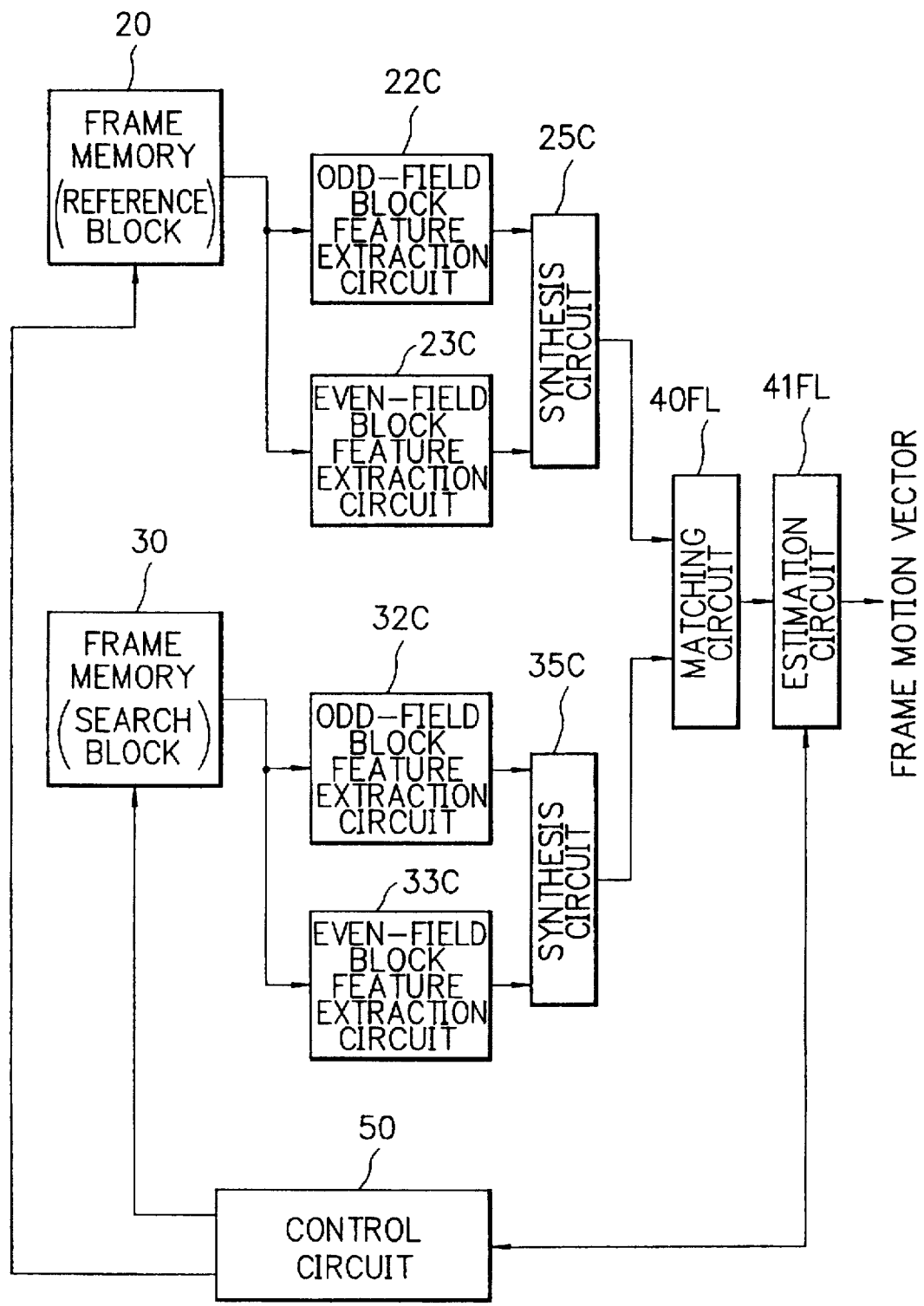
F I G. 30

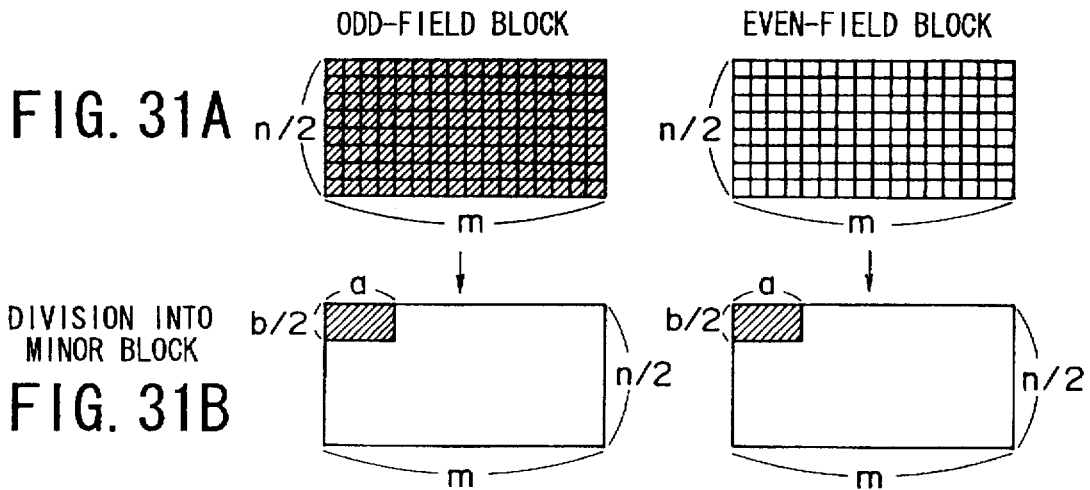
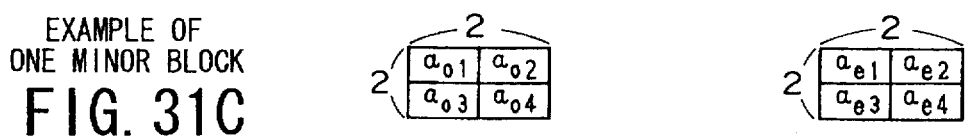
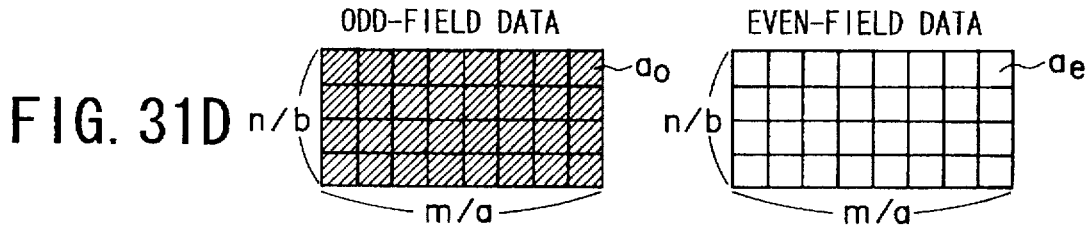
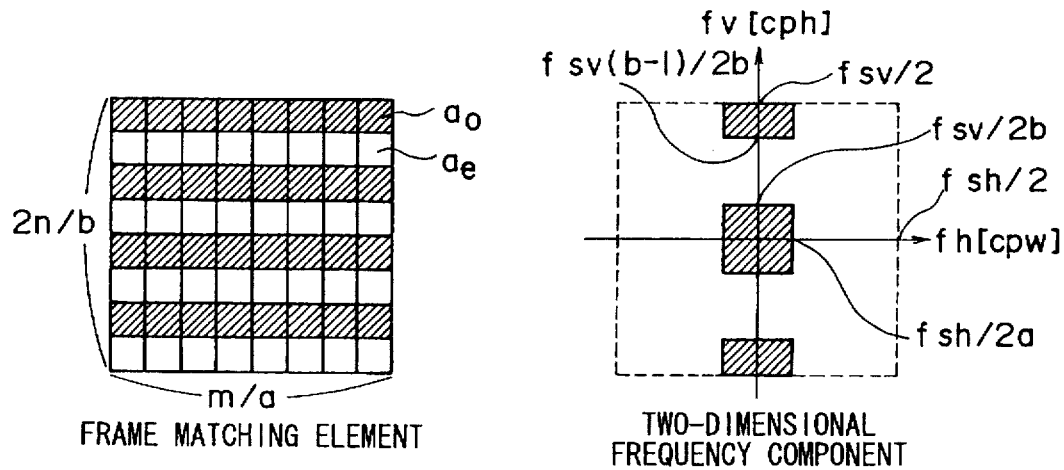

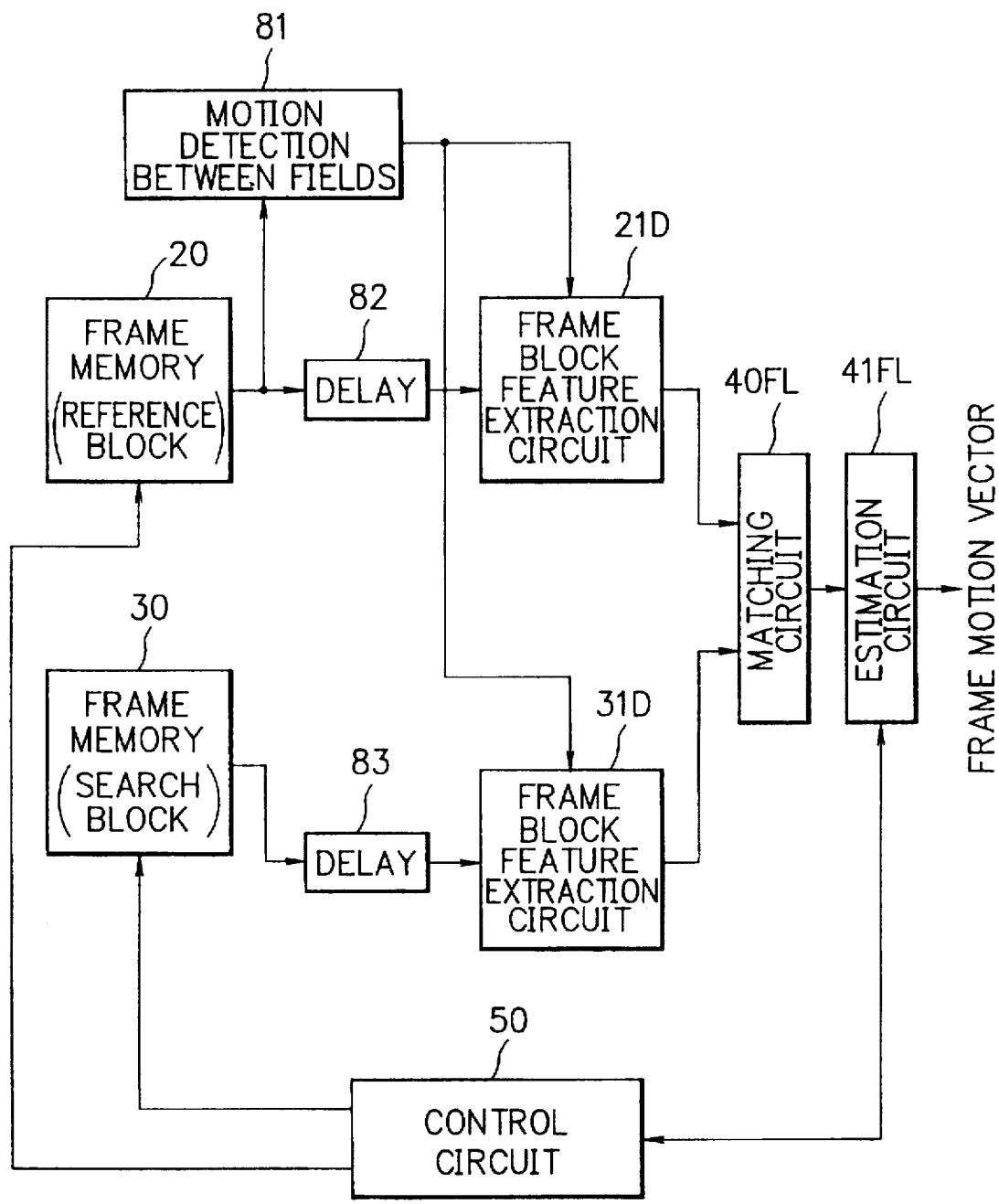
F I G. 32

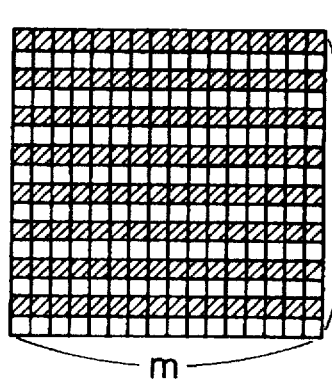
FRAME BLOCK
FIG. 33A
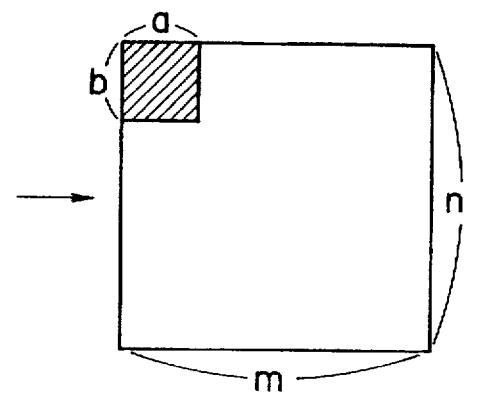
DIVISION INTO MINOR BLOCK
FIG. 33B
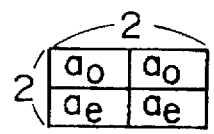
EXAMPLE OF
ONE MINOR BLOCK
FIG. 33C
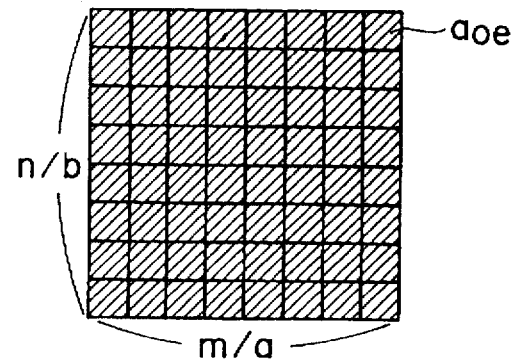
FRAME MATCHING ELEMENT
FIG. 33D
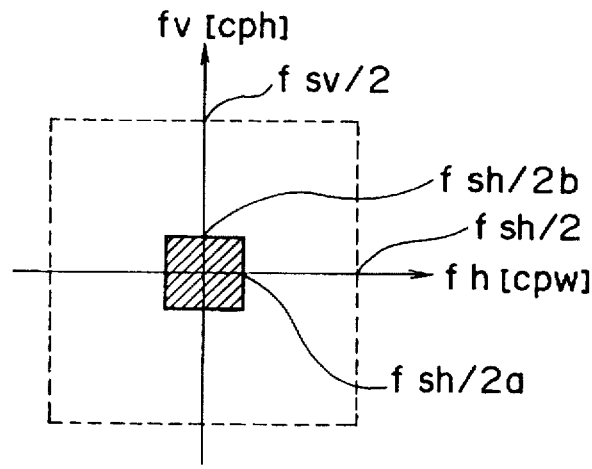
FIG. 33E  TWO-DIMENSIONAL FREQUENCY COMPONENT

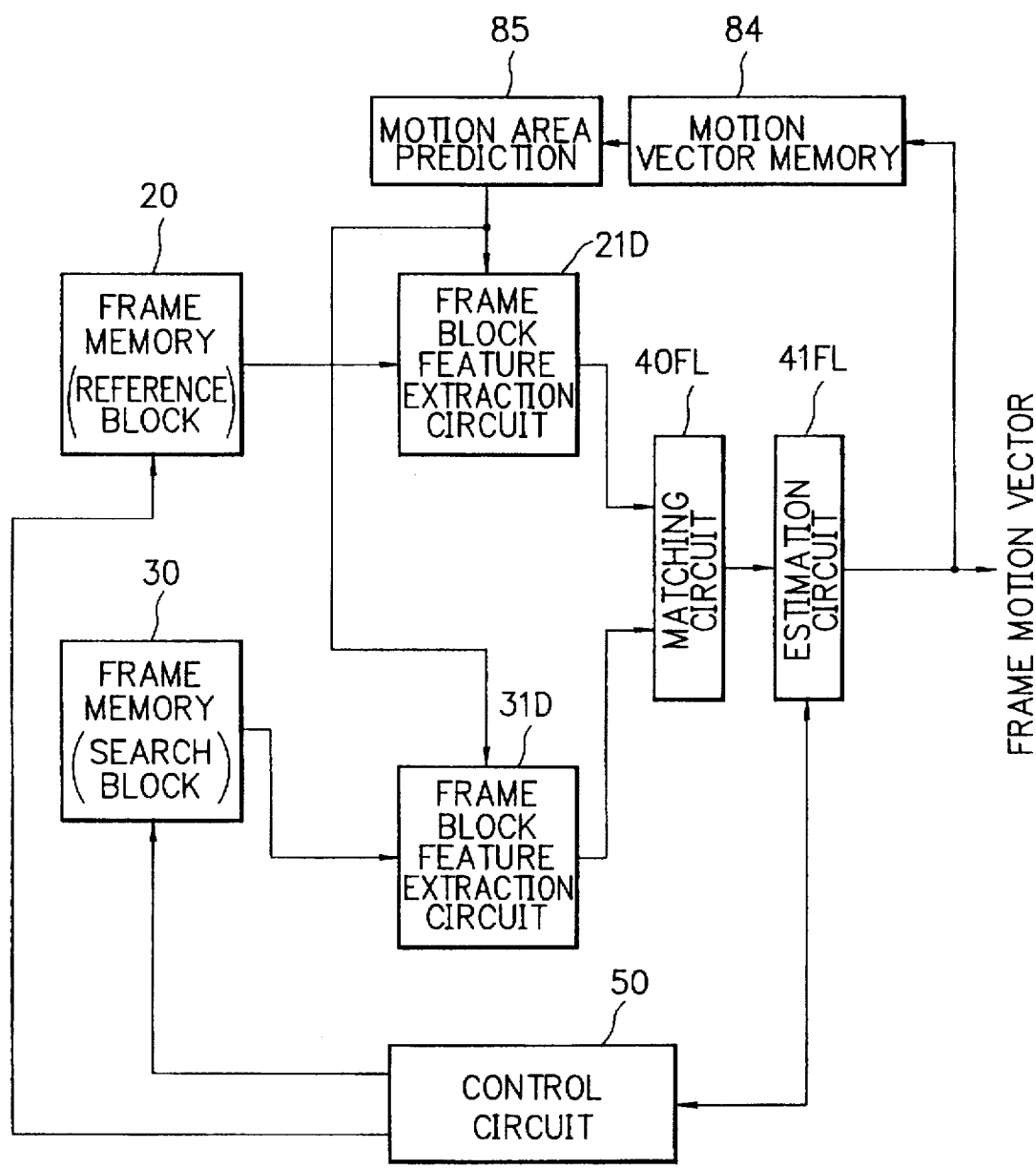
F I G. 34

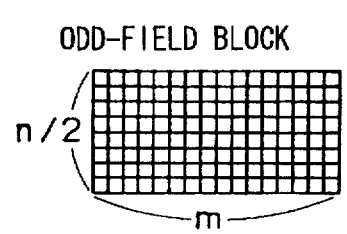
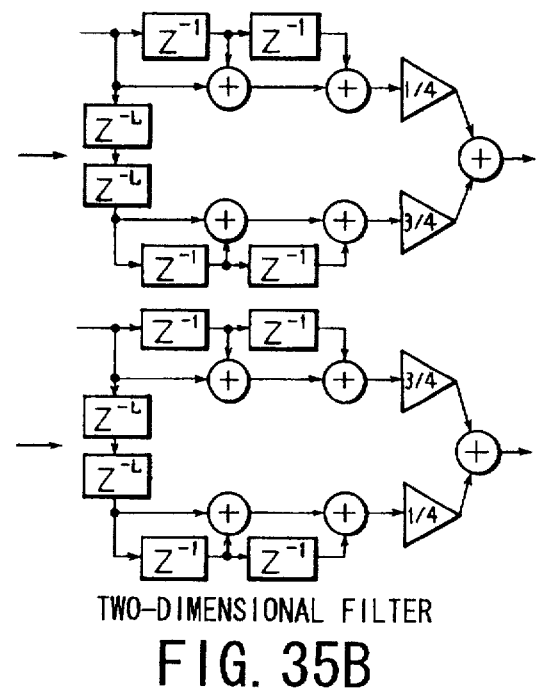
FIG. 35A
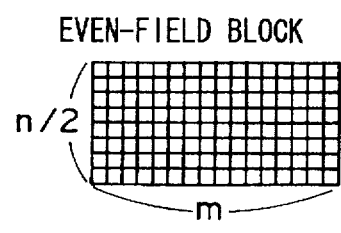
TWO-DIMENSIONAL FILTER
FIG. 35B
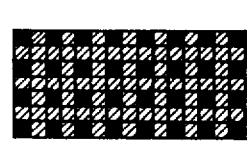
FIG. 35C
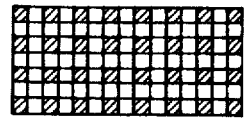
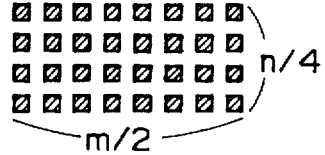
FIG. 35D
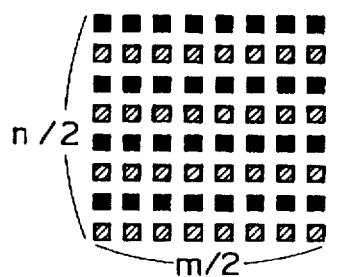
REPRESENTATIVE VALUES
FIG. 35E
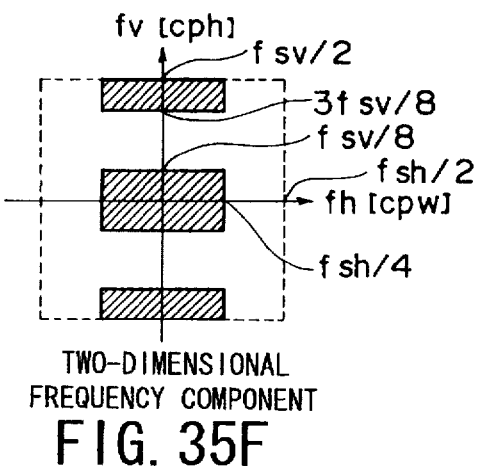
TWO-DIMENSIONAL
FREQUENCY COMPONENT
FIG. 35F

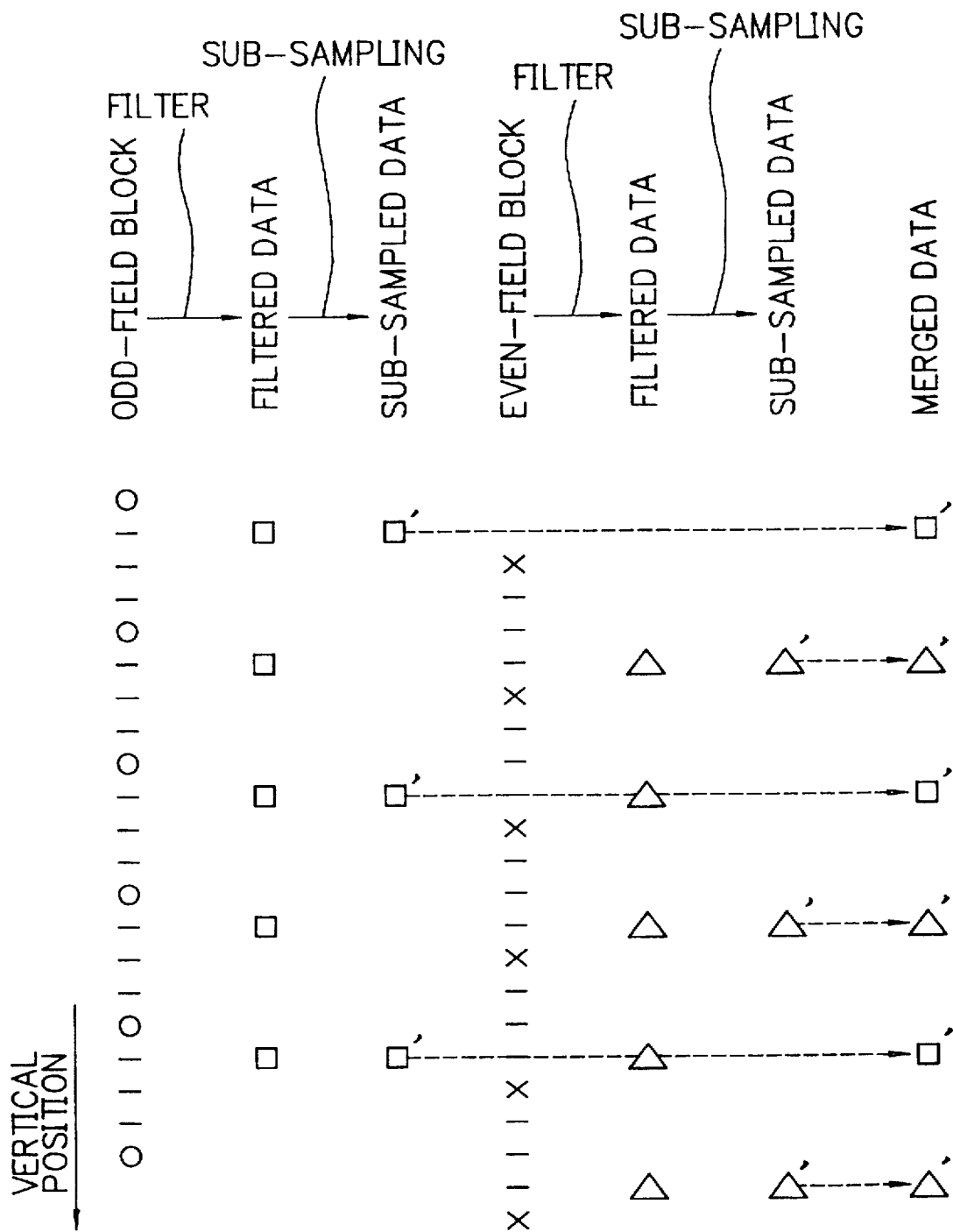
F I G. 36

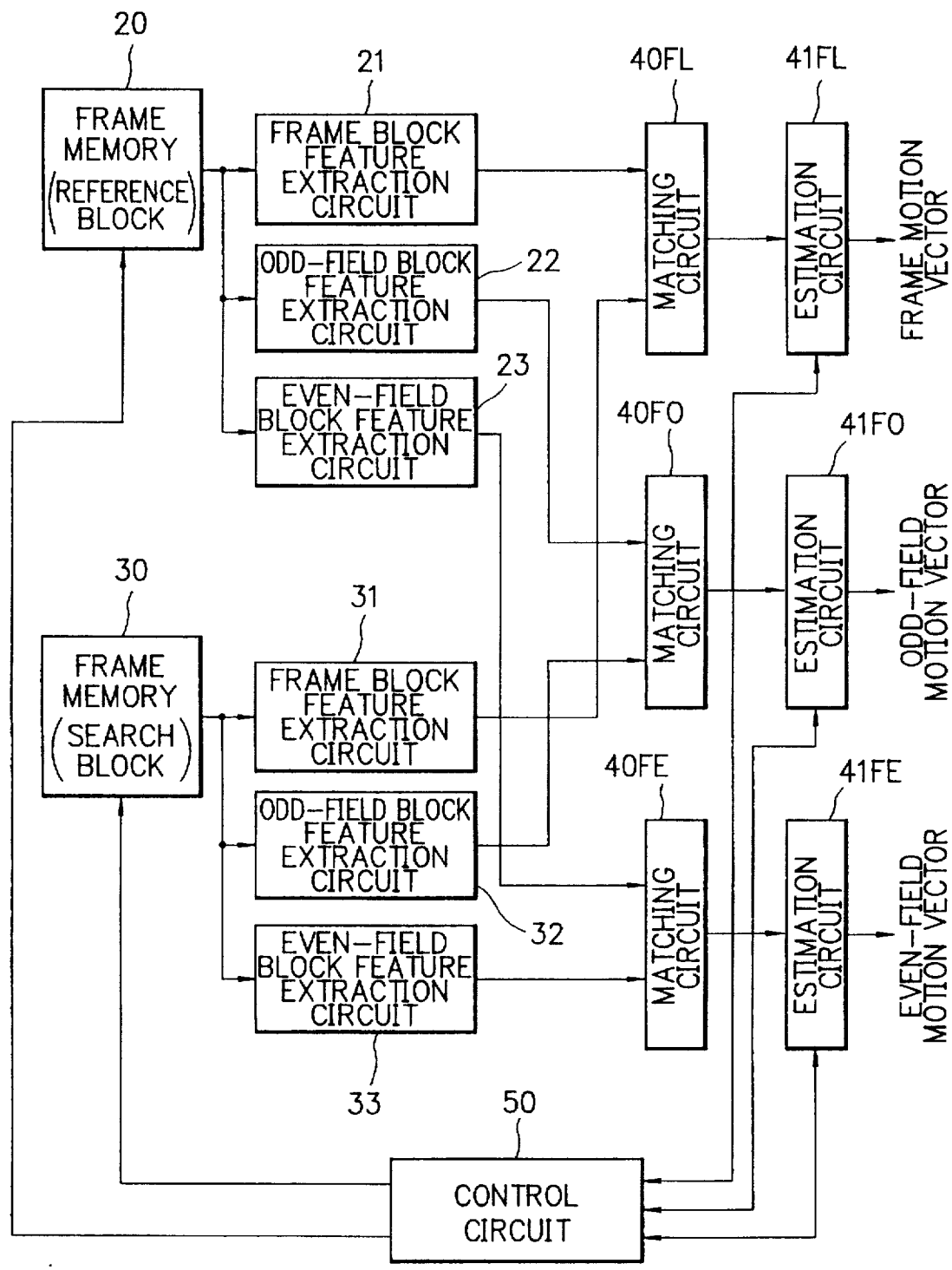
F I G. 39

FRAME BLOCK

DIVISION INTO MINOR BLOCK

TWO-DIMENSIONAL FREQUENCY COMPONENT

ODD-FIELD BLOCK    EVEN-FIELD BLOCK

DIVISION INTO MINOR BLOCK

TWO-DIMENSIONAL FREQUENCY COMPONENT

FRAME BLOCK
FIG. 42A
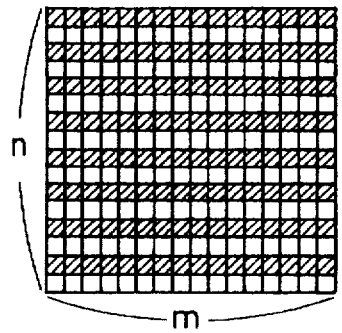
TWO-DIMENSIONAL FILTER (LPF)
FIG. 42B
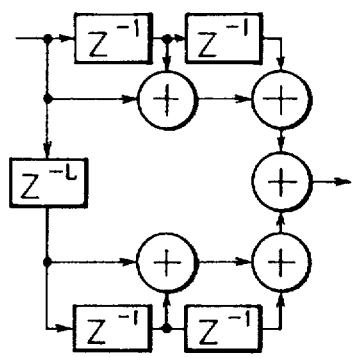
FIG. 42C
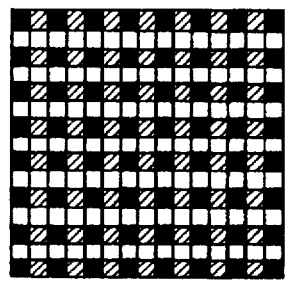
↓ SUB-SAMPLING
REPRESENTATIVE VALUES
FIG. 42D
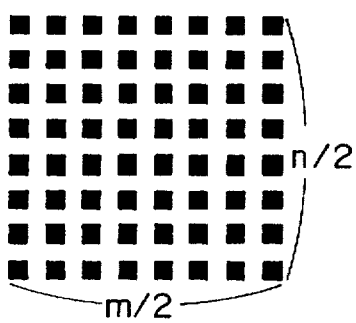
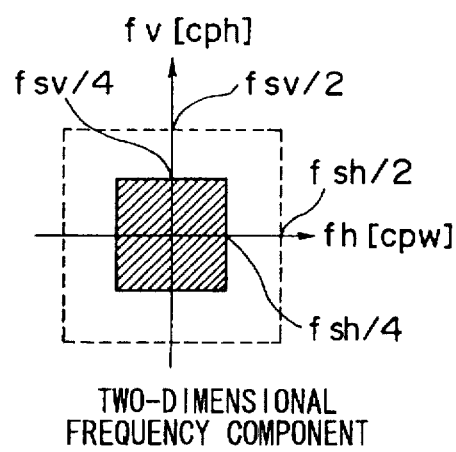
TWO-DIMENSIONAL FREQUENCY COMPONENT
FIG. 42E

FIG. 49

MOTION VECTOR DETECTION APPARATUS AND PREDICTIVE CODING SYSTEM FOR COMPENSATING FOR MOVEMENT WITH THE APPARATUS

This application is a division of application Ser. No. 08/515,527, filed Aug. 15, 1995.

BACKGROUND OF THE INVENTION

1. Field of the Invention

The present invention relates to a motion vector detection apparatus and a predictive coding system for compensating for movement when using such detection apparatus.

2. Description of the Related Art

FIG. 37 shows a predictive coding system for compensating for movement between frames, using DCT (discrete cosine transform) for compressing the data from a video signal. A digital video signal DV is supplied to a subtractor 2, which subtracts the digital video signal DV from a predictive video signal PDV and provides a predictive error signal PER. The predictive error signal PER is typically small since the video signals DV between frames are generally related. The predictive error signal PER from the subtractor 2 is supplied to a DCT circuit 3, which performs a discrete cosine transform process for the data for each coding block.

A transformed coefficient data TCD provided from the DCT circuit 3 is supplied to a quantizer 4, which performs quantization. In the quantizer 4, the step width for quantization is small when the data TCD is near 0 and the farther it moves from 0, the greater the step width for quantization becomes. This is due to the fact that a rough quantization is not visibly noticeable with a radical change. The data is compressed using such non-linear quantization. Quantized data from the quantizer 4 is encoded by a variable length encoder 5, which outputs code data DT.

The quantized data from the quantizer 4 is reversely quantized by a reverse quantizer 6. Converted coefficient data TCDp (approximately equal to the converted coefficient data TCD) from the reverse quantizer 6, is supplied to a reverse DCT circuit 7, which performs a reverse discrete cosine transform process. A predictive error signal PERp outputted from the reverse DCT circuit 7 is supplied to an adder 8, which adds it to the predictive video signal PDV. A video signal outputted from the adder 8 is delayed by one frame through the use of a frame memory 9, and a motion compensation circuit 10 provides the predictive video signal PDV, compensating for any movement present.

A motion vector detection circuit 11 receives the digital video signal DV and the video signal of one frame from the previous frame which is outputted from the frame memory 9, and detects a motion vector in the typical manner known to those skilled in this art. With the motion compensation circuit 10 described above, the amount of the compensation required is determined based on information from the motion vector which is provided through the detection of the motion vector detection circuit 11.

When the motion vector detection circuit 11 and the other apparatus in the predictive coding system for compensating for movement between frames in FIG. 37 use a matching method in order to detect a motion vector, a reference frame is divided into equal blocks (reference blocks), the block best matching each block is searched for among previous or subsequent frames (search frames), and the distance between such matching blocks is determined as a motion vector, as shown in FIG. 38.

Typically, in order to search for the best matching block, all pixels within two blocks are subtracted from each other, the sum of the absolute values or squares is calculated, and the position with the smallest value is determined to be the motion vector. In the case of a block with 16 pixels multiplied by 16 lines, 256 subtraction and absolutization calculations and 255 addition calculations are needed in order to search for one point. If the search range is set from −8 to +7 along the vertical and horizontal directions, 256 points must be searched. This requires a huge number of calculations and requires an enormous amount of hardware.

Currently, one method for reducing the scale of circuitry has been proposed. A frame block having (m×n) pixels, as shown in FIG. 40A, is divided into minor blocks, each of which has (a×b) pixels as indicated in FIG. 40B, and the integration of all pixels in each minor block gives a representative value. Such conversion for reducing the number of pixels in each block is termed "feature extraction."

With feature extraction, (m×n) pixels of matching elements can be reduced to (n×m)/(a×b), thereby reducing the scale of circuitry. In FIG. 40C, the hatched area corresponds to a two-dimensional frequency component after feature extraction, and the area defined by the dashed lines corresponds to a two-dimensional frequency component prior to the feature extraction. The horizontal axis represents a horizontal frequency fh|cpw|, and the vertical axis represents a vertical frequency fv|cph|. Further, fsv represents the number of lines in one frame (for example, 525 in the NTSC system), and fsh represents the number of samples in one line (for example, 910 in the NTSC system in which the sampling frequency is 4 fsc (fsc is a color sub-carrier frequency)).

While FIG. 40 shows the detection of the frame motion vector, in order to detect a field motion vector, a field block having (m×n/2) pixels in FIG. 41A is divided into minor blocks each of which has (a×b/2) pixels in each odd or even field, and the integration of all pixels in each minor block gives a representative value. According to such feature extraction, (m×n/2) pixels of matching elements can be reduced to (n×m)/(a×b), thereby reducing the scale of circuitry. In FIG. 41C, the hatched area corresponds to a two-dimensional frequency component after feature extraction, and the area defined by the dashed lines corresponds to a two-dimensional frequency component prior to feature extraction.

FIG. 39 illustrates a frame/field motion vector detection apparatus in which the scale of circuitry is reduced by using feature extraction. Reference numeral 20 denotes a frame memory which stores pixel signals in a reference frame. The pixel signals in the reference frame are read from the frame memory 20, controlled by a control circuit 50, and supplied to a feature extraction circuit 21. The feature extraction circuit 21 performs feature extraction (FIG. 40B), whereby the frame block is divided into minor blocks and the integration of all elements in each minor block gives a representative value.

Reference numeral 30 denotes a frame memory which stores pixel signals for the search frame. The pixel signals for the search frame blocks are read from the frame memory 30, controlled by the control circuit 50, and supplied to a feature extraction circuit 31. The feature extraction circuit 31 performs feature extraction (FIG. 40B), whereby the frame block is divided into minor blocks and the integration of all elements in each minor block gives a representative value. The representative value is supplied as a matching element to a matching circuit 40FL.

The matching circuit 40FL measures the differences between each of the feature-extracted elements of the reference frame blocks and the search frame blocks, and calculates the absolute value or square of each difference, which value is supplied as an estimated value to an estimation circuit 41FL. Although not described above, the pixel signals for the search frame blocks corresponding to the specified reference frame block are read from the frame memory 30, controlled by the control circuit 50, and are feature-extracted by the feature extraction circuit 31. Thus, the estimated values corresponding to the respective search frame blocks, are supplied from the matching circuit 40FL to the estimation circuit 41FL.

The estimation circuit 41FL selects the search frame block which best matches with the specified reference frame block among the estimated values corresponding to all search frame blocks, and outputs the position of the best matching search frame block relative to the reference frame block as a frame motion vector. Such detection of the frame motion vector is performed for a number of reference frame blocks which are read from the frame memory 20.

The pixel signals for the reference odd-field blocks are read from the frame memory 20, controlled by the control circuit 50, and supplied to a feature extraction circuit 22. The feature extraction circuit 21 performs feature extraction (FIG. 41B), whereby the odd-field block is divided into minor blocks and the integration of all elements in each minor block gives a representative value. The representative value is supplied as a matching element to a matching circuit 40FO.

The pixel signals for the search odd-field blocks are read from the frame memory 30, controlled by the control circuit 50, and supplied to a feature extraction circuit 32. The feature extraction circuit 32 performs feature extraction (FIG. 41B), whereby the odd-field block is divided into minor blocks and the integration of all elements in each minor block gives a representative value. The representative value is supplied as a matching element to a matching circuit 40FO.

The matching circuit 40FO measures the differences between each of the feature-extracted elements of the reference odd-field blocks and the search odd-field blocks, and calculates the absolute value or square of each difference, which value is supplied as an estimated value to an estimation circuit 41FO. Although not described above, the pixel signals for the search odd-field blocks corresponding to the specified reference odd-field block are read from the frame memory 30, controlled by the control circuit 50, and are feature-extracted by the feature extraction circuit 32. Thus, the estimated values corresponding the respective search odd-field blocks are supplied from the matching circuit 40FO to the estimation circuit 41FO.

The estimation circuit 41FO selects the search odd-field block which best matches the specified reference odd-field block among the estimated values corresponding to all search odd-field blocks, and outputs the position of the best matching search odd-field block relative to the reference odd-field block as a field motion vector. Such detection of the odd-field motion vector is performed for a number of the reference odd-field blocks which are read from the frame memory 20.

Reference numerals 23 and 33 denote feature extraction circuits for even-field blocks reference numeral 40FE denotes a matching circuit, and reference numeral 41FE denotes an estimation circuit. These circuits correspond to the feature extraction circuits 22 and 32, the matching circuit 40FO, and the estimation circuit 41FO for the odd field blocks, respectively. The estimation circuit 41FE outputs even-field motion vectors which correspond to each of a number of reference even-field blocks read from the frame memory 20.

An example of the feature extraction circuits 21 and 31 for the frame blocks is described below. In the example, (m×n) pixel data which constitute a frame block, are converted into (m/2×n/2) data (representative values). In this example, the (m×n) pixel data shown in FIG. 42A are passed through a two-dimensional filter (LPF) shown in FIG. 42B, and converted into data shown in FIG. 42C. Thereafter, the black portions of the data is sub-sampled in order to obtain the (m/2×n/2) data shown in FIG. 42D. In the two-dimensional filter in FIG. 42B, Z-1 represents one pixel delay, and Z-L represents one line delay for the frame structure. In FIG. 42E, the hatched area corresponds to a two-dimensional frequency component after feature extraction, and the area defined by the dashed lines corresponds to a two-dimensional frequency component prior to feature extraction.

With the simplified detection of the motion vector which can reduce the scale of circuitry by using feature extraction as shown in FIG. 39, the scale of circuitry becomes greater than that for detection of either the frame motion vector or the field motion vector when it is necessary to detect both the frame motion vector and the field motion vector.

Further, a low-pass filter used for feature extraction is insufficient to extract the feature for the block for the following reason.

FIG. 43A and FIG. 43B show vertical waveforms cut in one dimension for odd and even fields when there is no change in shape and no movement of an object between the fields. FIG. 43C and FIG. 43D show data which are sampled for vertical sampling intervals. When the video signals are handled as frame structures in a fashion similar to frame blocks, the sampling data for odd and even fields are merged together as shown in FIG. 43E.

In this case, because there is no object movement in the odd and even fields, the merged signal forms a continuous waveform as shown in FIG. 43E. The frequency component for such condition is shown in FIG. 44C. In other words, when the sampling frequency in the vertical direction for the frame structure is fs, there is no frequency component at fs/2. This is because the frequency components of the sampling data for the odd and even fields in FIG. 43C and FIG. 43D are shown in FIG. 44A and FIG. 44B respectively, and the frequency components at fs/2 differs by 180 and is thereby cancelled.

FIG. 45A and FIG. 45B show vertical waveforms cut in one dimension for the odd and even fields when there is no change in shape but there is movement of an object between the fields. FIG. 45C and FIG. 45D show data which are sampled for the vertical sampling intervals. FIG. 45E shows a situation in which the sampling data for each field are merged together.

Because there is movement of an object in the odd and even fields, the merged signal forms a discontinuous waveform as shown in FIG. 45E. The frequency component for such condition is shown in FIG. 46C. The frequency components at fs/2 are not cancelled because the frequency components at fs/2 shown in FIG. 46A and FIG. 46B for the sampling data of the odd and even fields (FIG. 45C and FIG. 45D) differ by 180° +α.

FIG. 47A and FIG. 47B show vertical waveforms cut in one dimension for the odd and even fields when there are changes in shape and movement of an object between the fields. FIG. 47C and FIG. 47D show data which are sampled for the vertical sampling intervals. FIG. 47E shows a situation in which the sampling data for each field are merged together.

Because there are changes in the shape and movement of an object in the odd and even fields, the merged signal forms a discontinuous waveform as shown in FIG. 47E. The frequency component for such case is shown in FIG. 48C. It may include a large, high-level component at fs/2, and the high level component may occasionally have a larger signal component than that of the low level component. The large frequency component at fs/2 is included because the frequency components at fs/2 shown in FIG. 48A and FIG. 48B for the sampling data for the odd and even fields (FIG. 47C and FIG. 47D, respectively) are offset in phase.

FIG. 49 shows frequency components in accordance with movement of an object and vertical resolution. It is obvious from the figure that the high-level component for the frame structure signal is small despite of the vertical resolution. As the level of movement and the change in shape are increased, the high-level component of the frame structure signal is increased. When a large amount of the high-level component is included, the accuracy of detection of the motion vector may be lost when the low-level component is only extracted by the low-pass filter and feature extraction is performed for the blocks.

An object of the present invention is to provide an improved motion vector detection apparatus which can reduce the scale of circuitry when simultaneously detecting the frame motion vector and field motion vector. Another object of the present invention is to provide an improved motion vector detection apparatus which can improve the accuracy of the simplified detection of the motion vector while reducing the scale of circuitry for feature extraction. A further object of the present invention is to provide an improved predictive coding system for compensating for movement with the motion vector detection apparatus.

SUMMARY OF THE INVENTION

In one aspect of the present invention, the frame matching elements are divided into the odd- and even-field matching elements, thereby eliminating a feature extraction circuit for obtaining the odd- and even-field matching elements and reducing the scale of circuitry.

In another aspect of the present invention, the odd- and even-field matching elements provided from the field block feature extraction means are synthesized together into frame matching elements, eliminating a feature extraction circuit for obtaining the frame matching elements and reducing the scale of circuitry.

In still another aspect of the present invention, the frame block feature extraction means extracts the frame matching elements as representative values in accordance with each set of odd- and even-field pixels which constitute each minor block. Accordingly, high-level components for frame matching elements can be extracted so that feature extraction can be satisfactorily performed when there is radical movement or a change in shape and the signal includes a number of high-level component. Accuracy in the detection of the frame motion vector can also be improved thereby.

In yet another aspect of the present invention, high-level components can be satisfactorily extracted because the weighting of the pixels which constitute the minor block and the calculations of the representative value have been performed by the frame block feature extraction means in such a wary that the vertically-directed sampled phases for the frame matching elements are spaced at regular intervals.

In further aspect of the present invention, the odd- and even-field matching elements provided from the field block feature extraction means are synthesized together into frame matching elements. Accordingly, the high-level components for frame matching elements can be extracted so that feature extraction can be satisfactorily performed when there is radical movement or a change in shape and the signal includes a number of high-level components. Accuracy in the detection of the frame motion vector can also be improved thereby.

In further aspect of the present invention, the frame block feature extraction means selects either the first feature extraction, which can extract a high-level component or the second feature extraction, which can not extract said high-level component, based on movement information, and can perform feature extraction suitable for image movement.

Additional objects and advantages of the present invention will be apparent from the following detailed description of a preferred embodiment thereof, which is best understood with reference to the accompanying drawings.

BRIEF DESCRIPTION OF THE DRAWINGS

FIG. 1 is a block diagram illustrating a construction of a first embodiment of a motion vector detection apparatus of the present invention;

FIGS. 5A–E are diagrams illustrating the frame/field matching elements in the present invention;

FIGS. 8A–C are diagrams illustrating feature extraction (for field structure) using integral projection in the present invention;

FIG. 9 is a block diagram illustrating a construction of a fourth embodiment of a motion vector detection apparatus of the present invention;

FIG. 12 is a block diagram illustrating a construction of a fifth embodiment of a motion vector detection apparatus of the present invention;

FIGS. 13A–E are diagrams illustrating the frame/field matching elements in the present invention;

FIG. 15 is a diagram illustrating the field motion vector in the present invention;

FIGS. 16A–D are diagrams illustrating a feature extraction circuit for the frame structure in the present invention;

FIGS. 17A–D are diagrams illustrating a feature extraction circuit for the field structure in the present invention;

FIGS. 20A–E are diagrams illustrating the frame/field matching elements in the present invention;

FIGS. 27A–F are diagrams illustrating an example of the feature extraction circuit in the present invention;

FIG. 28 is a block diagram illustrating a construction of an eighth embodiment of a motion vector detection apparatus of the present invention;

FIGS. 29A–E are diagrams illustrating the frame matching elements in the present invention;

FIG. 30 is a block diagram illustrating a construction of a ninth embodiment of a motion vector detection apparatus of the present invention;

FIGS. 31A–F are diagrams illustrating the frame matching elements in the present invention;

FIG. 32 is a block diagram illustrating a construction of a tenth embodiment of a motion vector detection apparatus of the present invention;

FIGS. 33A–E are diagrams illustrating the frame matching elements in the present invention;

FIG. 34 is a block diagram illustrating a construction of an eleventh embodiment of a motion vector detection apparatus of the present invention;

FIGS. 35A–F are diagrams illustrating an example of a feature extraction circuit in the present invention;

FIG. 36 is a diagram illustrating sampled phases relating to feature extraction in the present invention;

FIG. 39 is a block diagram illustrating a construction of a conventional frame/field motion vector detection apparatus of the prior art;

FIGS. 42A–E are diagrams illustrating an example of the feature extraction circuit in the prior art;

FIG. 49 is a graph illustrating frequency components in accordance with the presence of movement of an object and differences in vertically-directed resolution.

DESCRIPTION OF THE PREFERRED EMBODIMENT

A motion vector detection apparatus of a first preferred embodiment according to the present invention is described below with reference to FIG. 1, where the same reference numbers have been employed to designate like parts for FIG. 39, and only the differences are discussed.

Figure 2A:
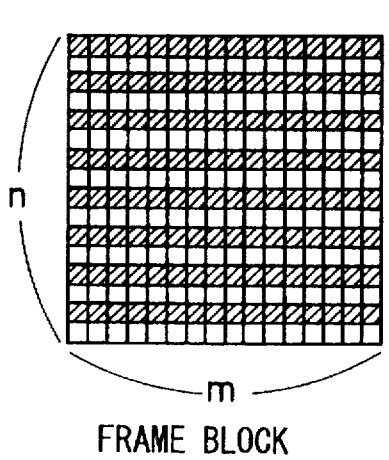
FIGS. 2A–F are diagrams illustrating frame/field matching elements in the present invention.
Figure 2B:
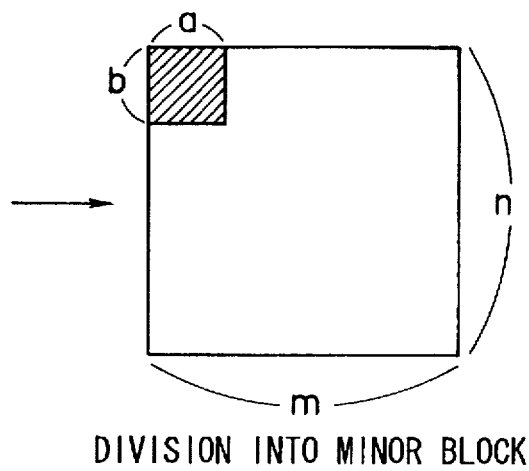
Figure 2C:
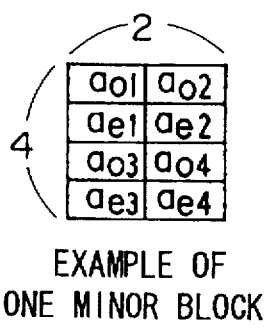
Figure 2D:
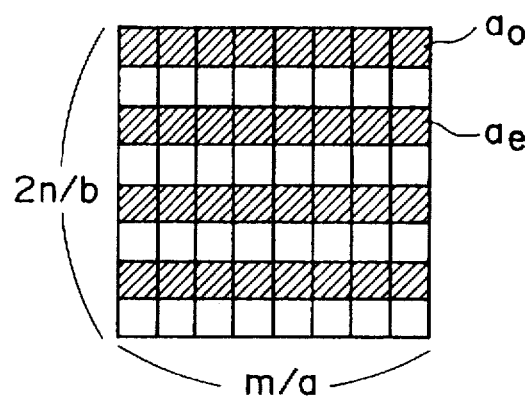

In the embodiment, frame matching elements are determined by feature extraction and are divided into field matching elements. A frame block with (m×n) pixels as shown in FIG. 2A is divided into minor blocks each of which has (a×b) pixels, as shown in FIG. 2B, and the integration of all pixels in the same field for each minor block gives matching elements ao and ae, representative values as shown in FIG. 2D. For example, as shown in FIG. 2C, when (2×4) pixels (odd-field pixels ao1 to ao4 and even-field pixels ae1 to ae4) constitute a minor block, the matching elements are obtained from ao=ao1+ao2+ao3+ao4, ae=ae1+ae2+ae3+ae4.

Figure 2E:
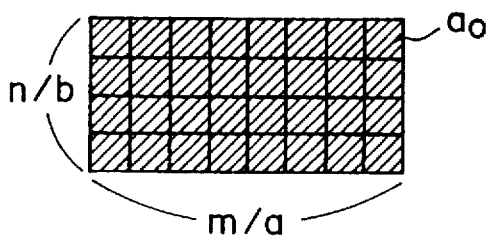
Figure 2F:
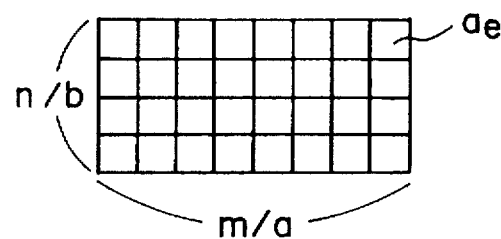

As shown in FIG. 2D, the frame matching elements obtained are divided into fields, so that odd-field matching elements in FIG. 2E and even-field matching elements in FIG. 2F are obtained.

Figure 3A:
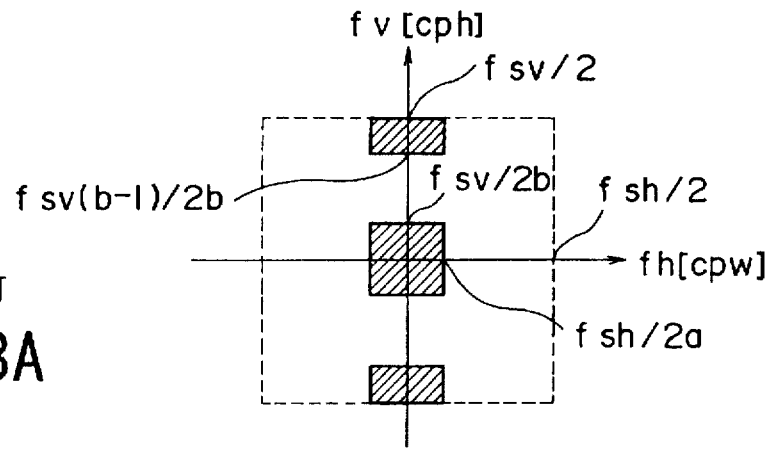
FIGS. 3A–C are diagrams illustrating two-dimensional frequency components for frame/field matching elements in the present invention.
Figure 3B:
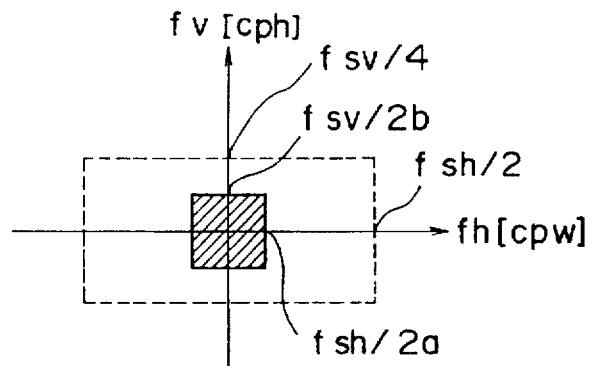
Figure 3C:
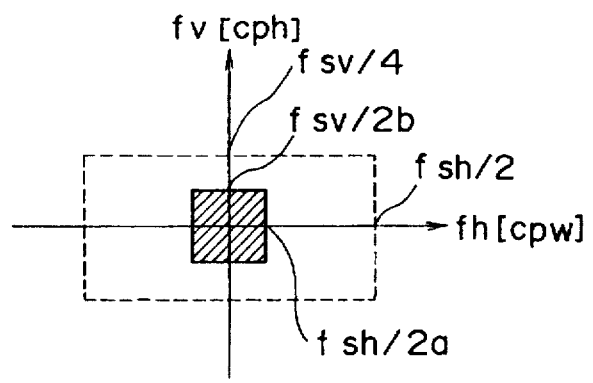

In FIG. 3A, the hatched areas correspond to a two-dimensional frequency component for the feature-extracted frame matching elements, and the area defined by dashed lines corresponds to a two-dimensional frequency component prior to feature extraction. It is obvious from the figure that the vertical high-level components are extracted for the two-dimensional frequency component for the frame matching elements. FIG. 3B and FIG. 3C show two-dimensional frequency components of the odd- and even-field matching elements, respectively.

In the first embodiment in FIG. 1, a pixel signal for a specified reference frame block which is read from a frame memory 20, is supplied to a feature extraction circuit 21A. Within the feature extraction circuit 21A, the frame matching elements (FIG. 2D) are feature-extracted in the manner shown in FIG. 2, and are supplied to a matching circuit 40FL.

A pixel signal for a search frame block which is read from a frame memory 30, is supplied to a feature extraction circuit 31A. Within the feature extraction circuit 31A, the frame matching elements (FIG. 2D) are feature-extracted in a similar fashion to the feature extraction circuit 21A, and are supplied to a matching circuit 40FL. The matching circuit 40FL and an estimation circuit 41FL are operated in a fashion similar to the circuits shown in FIG. 39, and the estimation circuit 41FL outputs frame motion vectors corresponding to a number of reference frame blocks which are read from the frame memory 20.

The frame matching elements which are outputted from the feature extraction circuit 21A, are supplied to a data division circuit 24, and are divided into the odd- and even-field matching elements (FIG. 2E and FIG. 2F) in the manner as described above for FIG. 2. The odd- and even-field matching elements which are outputted from the data division circuit 24, are supplied to matching circuits 40FO and 40FE.

Also, the frame matching elements which are outputted from the feature extraction circuit 31A, are supplied to a data division circuit 34, and are divided into the odd- and even-field matching elements in a fashion similar to that of the data division circuit 24. The odd- and even-field matching elements which are outputted from the data division circuit 34, are supplied to the matching circuits 40FO and 40FE. The matching circuits 40FO and 40FE and the estimation circuits 41FO and 41FE are operated similarly to those shown in FIG. 39. The estimation circuits 41FO and 41FE output odd- and even-field motion vectors which correspond to a number of the reference frame blocks which are read from the frame memory 20.

As described above, in the embodiment the frame matching elements are divided into the field matching elements, thereby eliminating a feature extraction circuit for obtaining the field matching elements and reducing the scale of circuitry. Further, because the vertical high level components are extracted as two-dimensional frequency components of the frame matching elements (as shown in FIG. 3A), feature extraction can be satisfactorily performed and the accuracy of the detection of the frame motion vector can be improved even when there is a radical change in shape and the signal includes a number of high frequency components.

A motion vector detection apparatus of a second preferred embodiment according to the present invention is described below with reference to FIG. 4, where the same reference numbers have been employed to designate like parts for FIG. 39, and only the differences are discussed.

In the embodiment, odd- and even-field matching elements are determined by feature extraction and are synthesized to produce frame matching elements. A field block with (m×n/2) pixels for each odd or even field as shown in FIG. 5A, is divided into minor blocks, each of which has (a×b/2) pixels as shown in FIG. 5B, and the integration of all pixels for each minor block gives matching elements ao and ae, as shown in FIG. 5D.

For example, as shown in FIG. 2C, when (2×2) pixels (ao1 to ao4, or ae1 to ae4) constitute the minor block for each odd or even field, the matching elements are obtained using ao=ao1+ao2+ao3+ao4 and ae=ae1+ae2+ae3+ae4. The obtained odd- and even-field matching elements shown in FIG. 2D are synthesized in order to produce frame matching elements shown in FIG. 2E. In this case, the two-dimensional frequency components for the odd- and even-field matching elements correspond to the hatched areas in FIG. 3B and 3C, and the two-dimensional frequency component prior to feature extraction corresponds to the area defined by the dashed lines in FIG. 3A.

Figure 4:
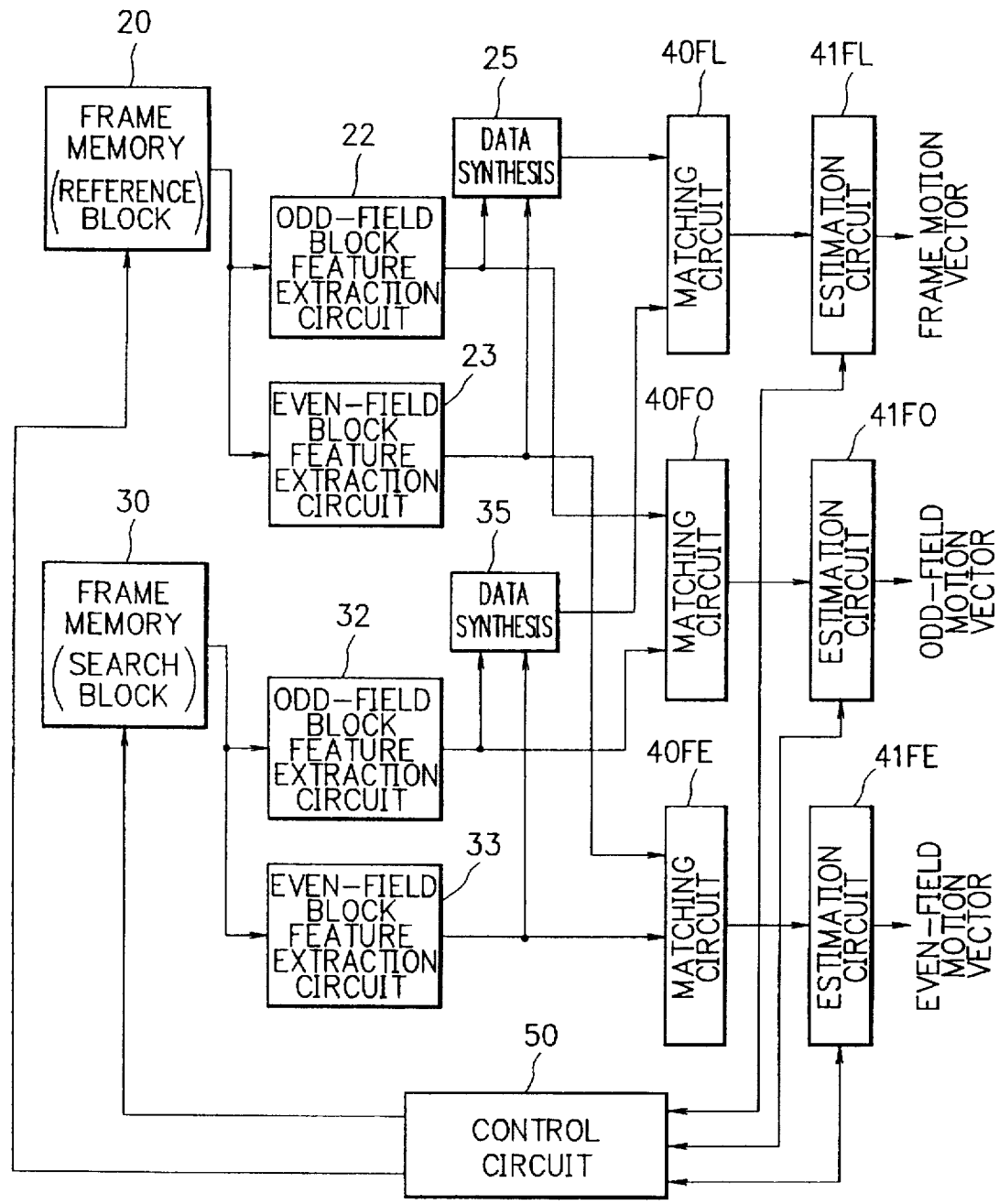
FIG. 4 is a block diagram illustrating a construction of a second embodiment of a motion vector detection apparatus of the present invention.

In the second embodiment shown in FIG. 4, the detection system for the odd- and even-field motion vector is similar to the circuits described in FIG. 39, and the estimation circuits 41FE and 41FO output odd- and even-field motion vectors corresponding to a number of reference odd- and even-field blocks.

The odd- and even-field matching elements which are outputted from the feature extraction circuits 22 and 23, are supplied to a data synthesis circuit 25, and are synthesized to produce the frame matching elements (FIG. 5E). The frame matching elements which are outputted from the data synthesis circuit 25, are supplied to a matching circuit 40FL. Also, the odd- and even-field matching elements which are outputted from the feature extraction circuit 32 and 33, are supplied to a data synthesis circuit 35, and are synthesized to produce frame matching elements.

The frame matching elements are supplied to the matching circuit 40FL. The matching circuit 40FL and the estimation circuit 41FL are operated similarly to those shown in FIG. 39. The estimation circuits 41FL outputs odd- and even-field motion vectors which correspond to a number of the reference odd- and even-field blocks which are read from the frame memory 20.

As described above, in the embodiment, the odd- and even-field matching elements are synthesized to produce the frame matching elements, thereby eliminating a feature extraction circuit for obtaining the frame matching elements and reducing the scale of circuitry. Further, because the vertical high level components are extracted as the two-dimensional frequency components of the frame matching elements (as shown in FIG. 1), feature extraction can be satisfactorily performed and the accuracy in the detection of the frame motion vector can be improved even when there is a radical change in shape and the signal includes a number of high frequency components.

A motion vector detection apparatus of a third preferred embodiment according to the present invention is described below with reference to FIG. 6, where the same reference numbers have been employed to designate like parts for FIG. 39, and only the differences are discussed.

In the embodiment, the calculated values (the absolute value or the square of each difference between each of the feature-extracted elements of the reference odd-field blocks and the search odd-field blocks) which are outputted from the matching circuits 40FO and 40FE, are supplied to an adder 42, whereby the values are added together, and are supplied to an estimation circuit 41FL. In this example, the output from the adder 42 is equal to the output from the matching circuit 40FL shown in FIG. 4.

Accordingly, the estimation circuit 41FL outputs the frame motion vectors, in a fashion similar to the embodiment shown in FIG. 4, and this eliminates a feature extraction circuit for obtaining the frame matching elements, thereby reducing the scale of circuitry.

Currently, feature extraction with integral projection along some axes is proposed.

Figure 7A:
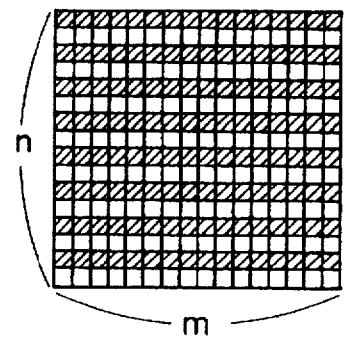
FIGS. 7A–E are diagrams illustrating feature extraction (for frame structure) using integral projection in the present invention.
Figure 7B:
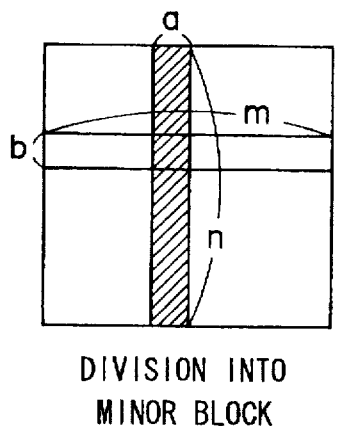
Figure 7C:
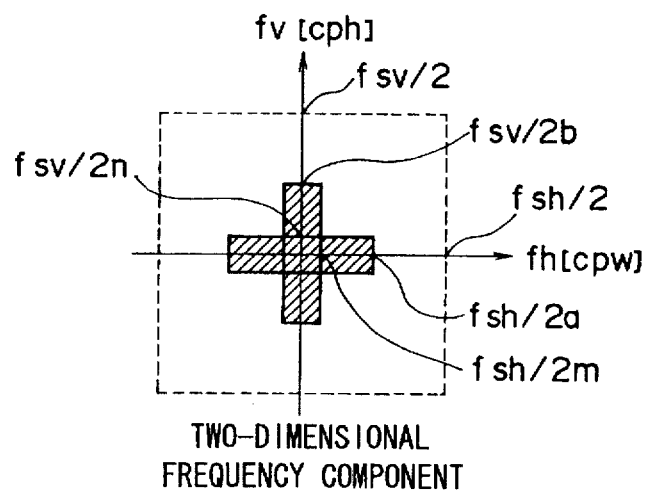

In feature extraction for the frame structure, (m×n) pixels shown in FIG. 7A, in other words, a frame block which consists of m pixels along the horizontal direction and n pixels along the vertical direction, are divided into minor blocks each of which has (m×b) pixels (a block which consists of m pixels along the horizontal direction and b (b<n) pixels along the vertical direction) and into minor blocks each of which has (a×n) pixels (a block which consists of a (a<m) pixels in the horizontal direction and n pixels in the vertical direction), as shown in FIG. 7B. The integration of all pixels in the same field for each minor block gives a representative value. In FIG. 7C, the hatched areas correspond to a two-dimensional frequency component for the feature-extracted frame matching elements, and the area defined by dashed lines corresponds to a two-dimensional frequency component prior to feature extraction.

Figure 40A:
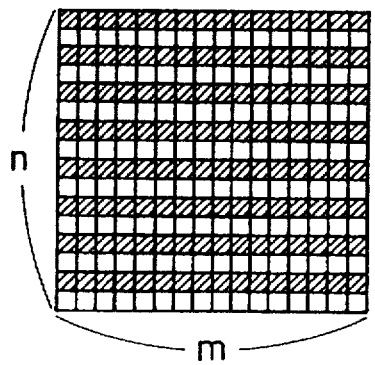
FIGS. 40A–C are diagrams illustrating a method (for a frame motion vector) for reducing the scale of circuitry from the prior art.
Figure 40B:
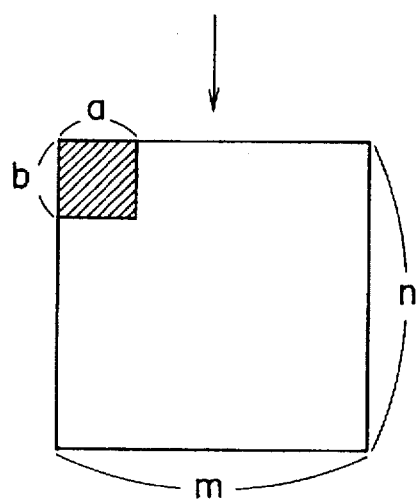
Figure 40C:
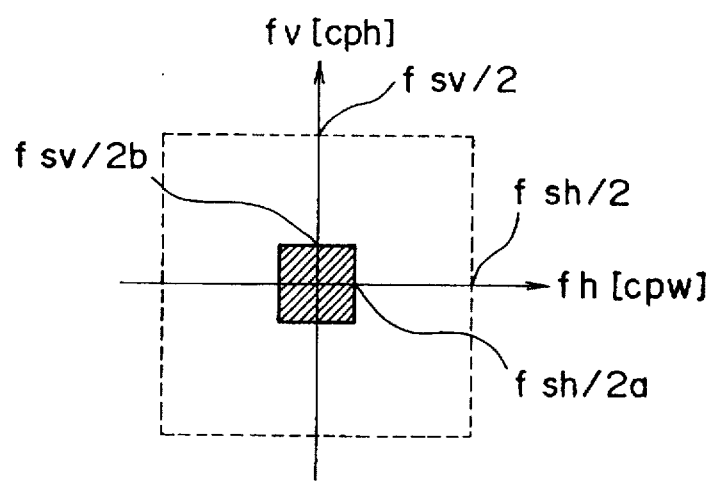
Figure 41A:
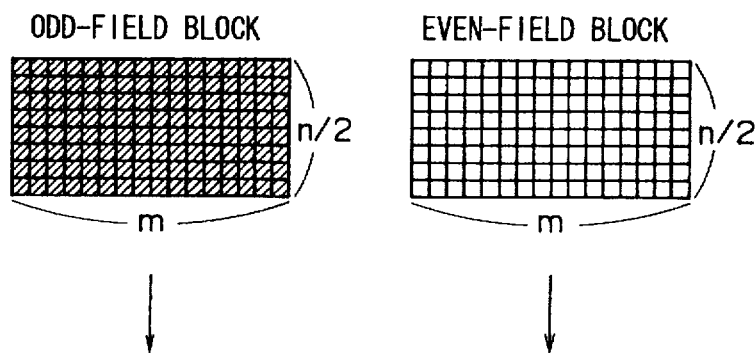
FIGS. 41A–C are diagrams illustrating a method (for a field motion vector) for reducing the scale of circuitry from the prior art.
Figure 41B:
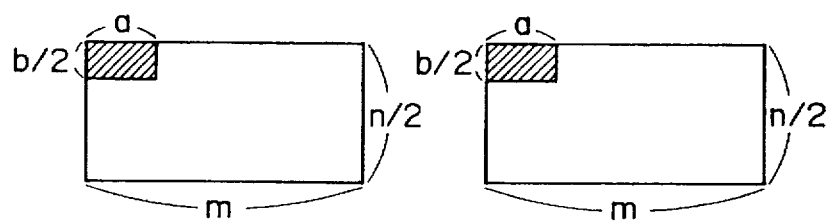
Figure 41C:
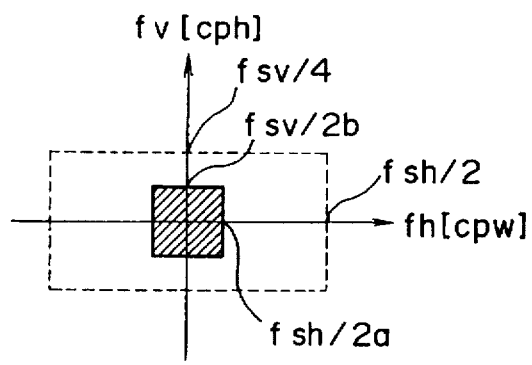
Figure 43A:
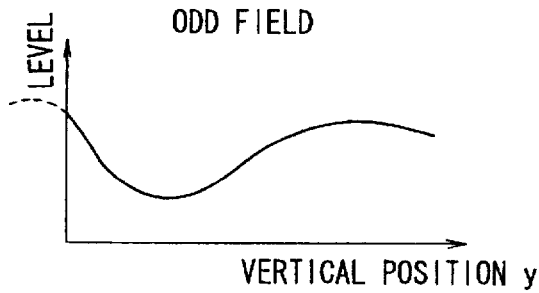
FIGS. 43A–E are graphs illustrating a merged signal (when there is no change in shape and no movement of any object between fields) in the prior art.
Figure 43B:
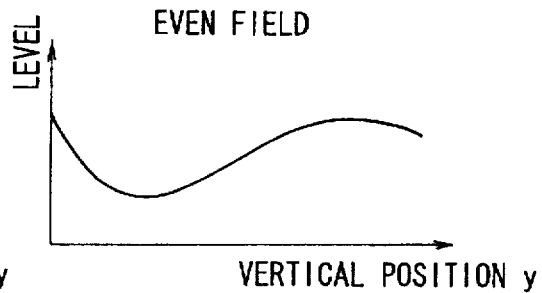
Figure 43C:
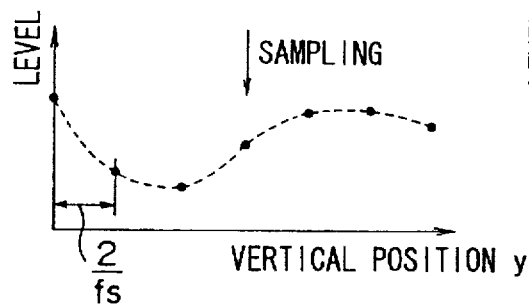
Figure 43D:
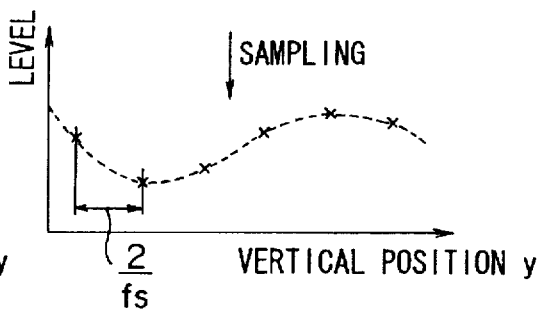
Figure 43E:
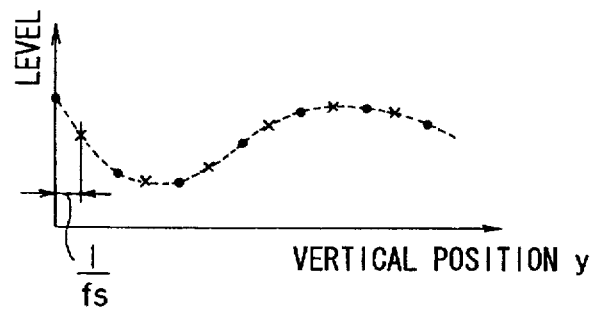
Figure 44A:
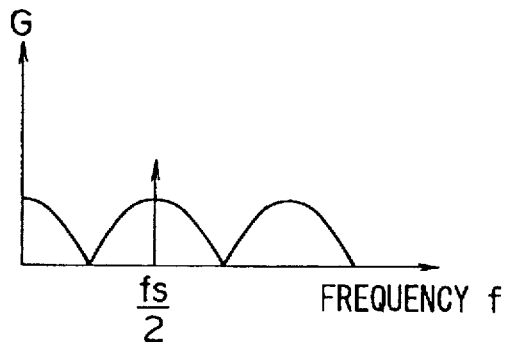
FIGS. 44A–C are graphs illustrating frequency components for the merged signal (when there is no change in shape and no movement of any object between fields) in the prior art.
Figure 44B:
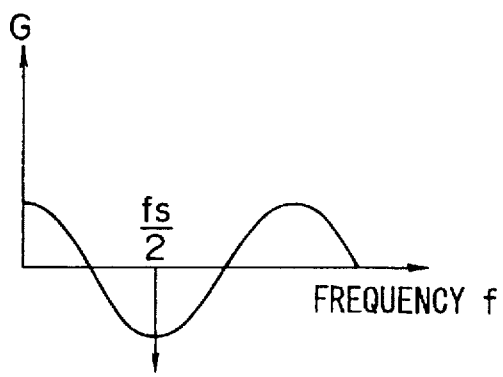
Figure 44C:
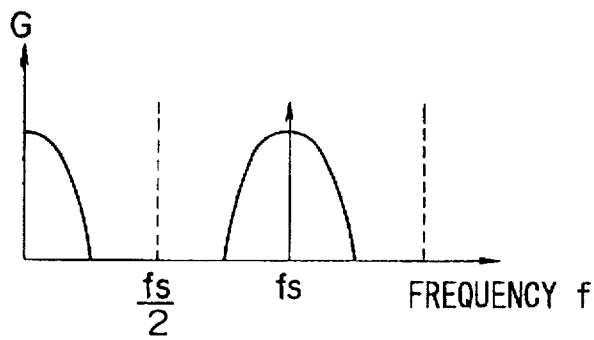
Figure 45A:
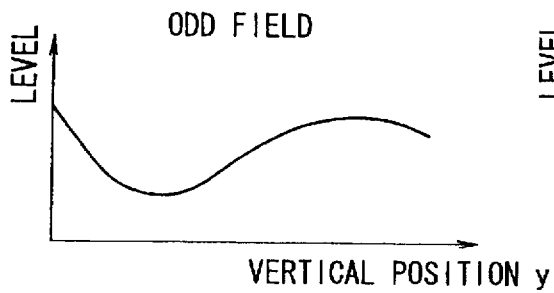
FIGS. 45A–E are graphs illustrating the merged signal (when there is no change in shape but there is movement of an object between fields) in the prior art.
Figure 45B:
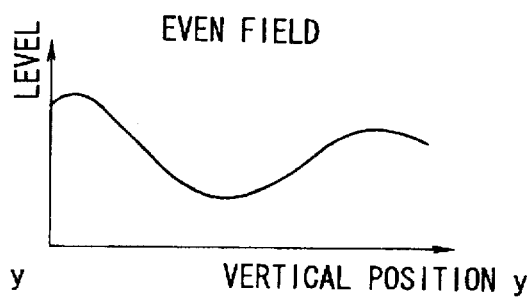
Figure 45C:
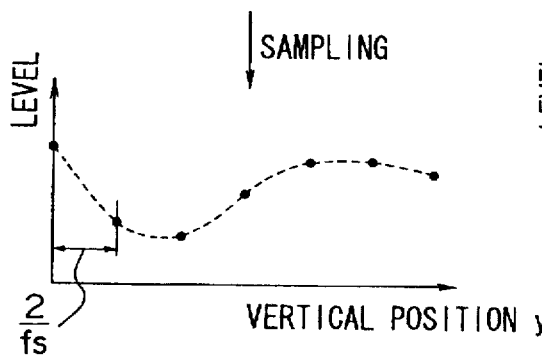
Figure 45D:
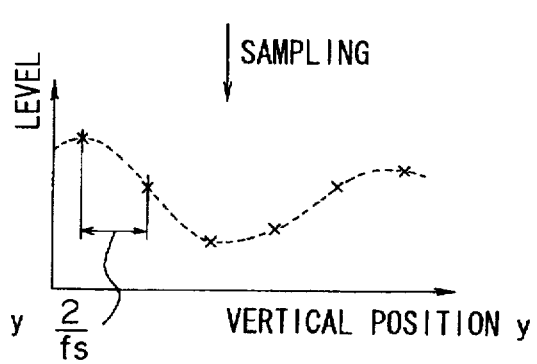
Figure 45E:
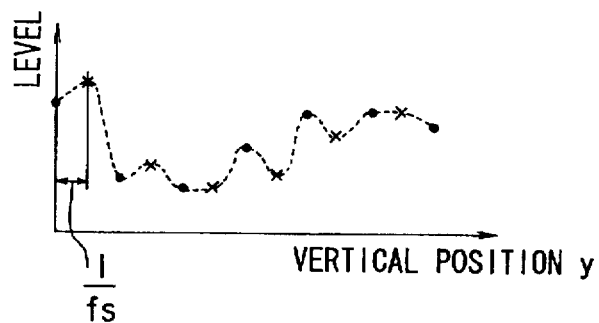
Figure 46A:
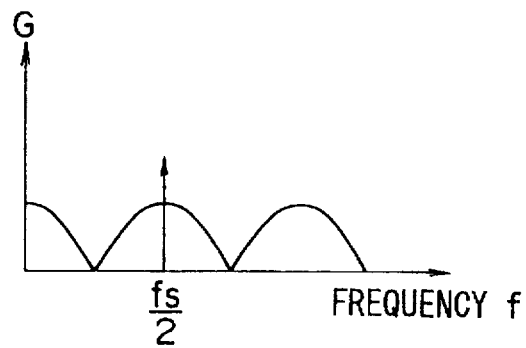
FIGS. 46A–C are a graphs illustrating frequency components for the merged signal (when there is no change in shape but there is movement of an object between fields) in the prior art.
Figure 46B:
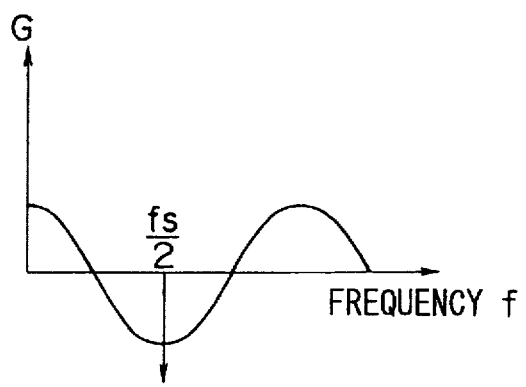
Figure 46C:
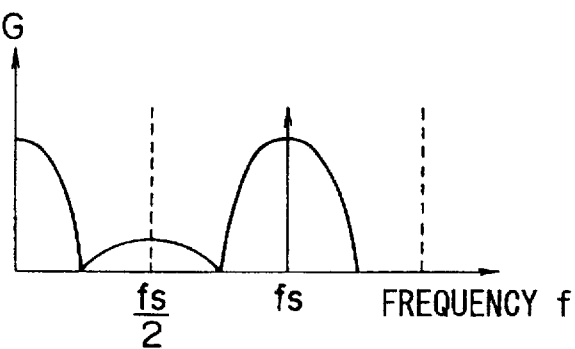
Figure 47A:
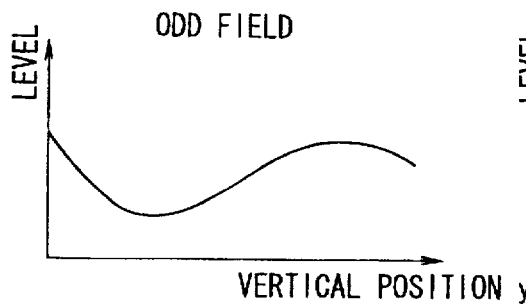
FIGS. 47A–E are graphs illustrating the merged signal (when there is a change in shape and movement of an object between fields) in the prior art.
Figure 47B:
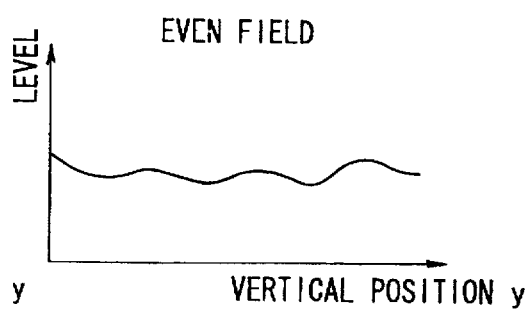
Figure 47C:
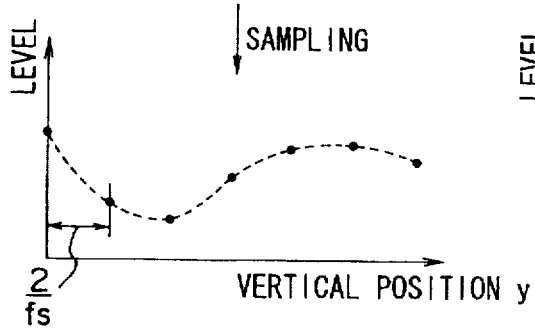
Figure 47D:
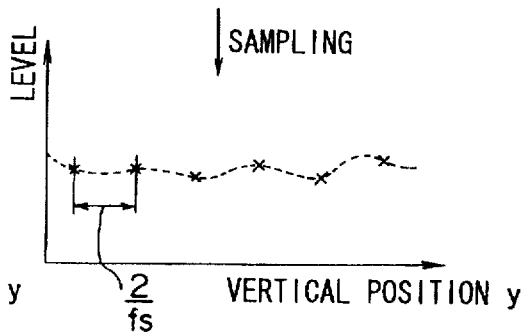
Figure 47E:
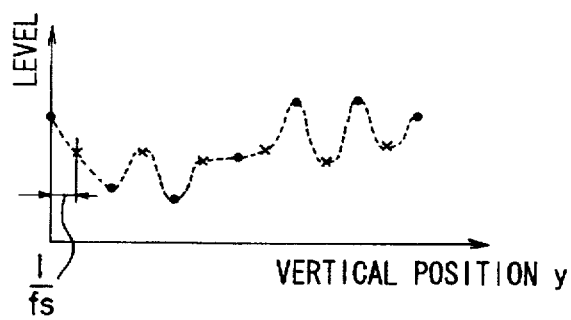
Figure 48A:
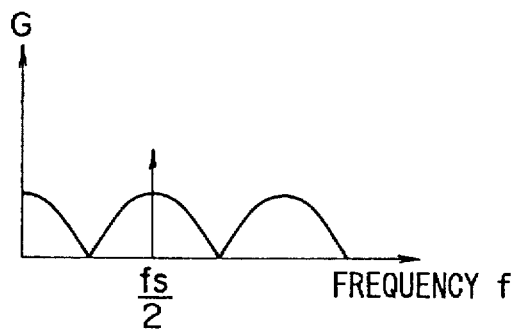
FIGS. 48A–C are graphs illustrating frequency components for the merged signal (when there is a change in shape and movement of an object between fields) in the prior art.
Figure 48B:
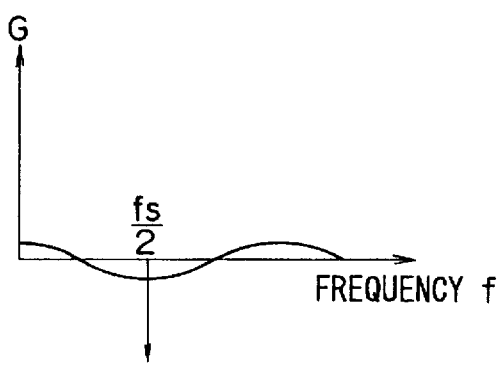
Figure 48C:
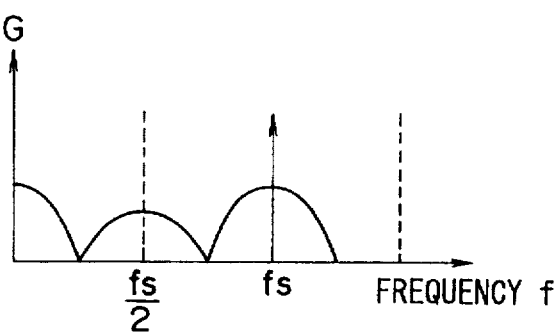

With feature extraction using integral projection, the number of matching elements are reduced. For example, although the division into the minor blocks having (a×b) pixels provides (m/a×n/b) matching elements, the division using integral projection provides (m/a+n/b) matching elements. When FIG. 7C is compared with FIG. 40C, it is clear that even with integral projection described in relation to FIG. 7C, with the sufficient vertical and horizontal frequency component, feature extraction can be performed. This is similar to feature extraction for the frame or field structure.

Figure 7D:
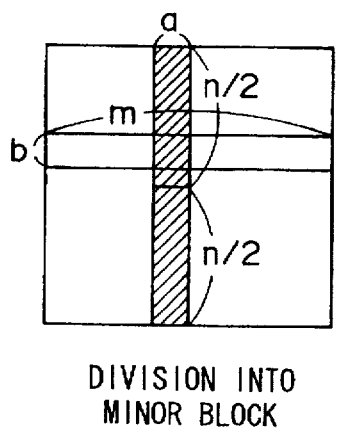
Figure 7E:
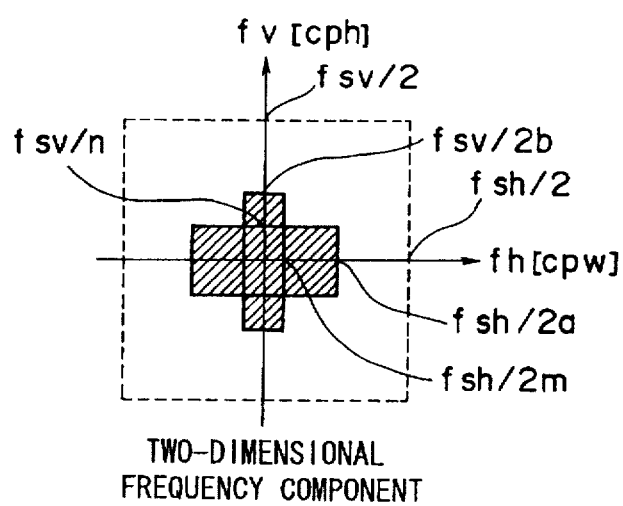

In feature extraction for the frame structure, a frame block with (m×n) pixels as shown in FIG. 7A, is divided into minor blocks each of which has (m×b) pixels, and minor blocks each of which has (a×n/2) pixels as shown in FIG. 7D. The integration of all pixels for each minor block gives a representative value. In FIG. 7E, the hatched areas correspond to a two-dimensional frequency component after feature extraction, and the area defined by the dashed lines corresponds to a two-dimensional frequency component prior to feature extraction.

In feature extraction for the frame structure, a frame block with (m×n/2) pixels in each odd or even field as shown in FIG. 8A, is divided into minor blocks each of which has (a×n/2) pixels as shown in FIG. 8B, and is divided into minor blocks each of which has (m×b) pixels. The integration of all pixels in each of the minor blocks gives a representative value. In FIG. 8C, the hatched areas correspond to a two-dimensional frequency component for the feature-extracted frame matching elements, and the area defined by dashed lines corresponds to a two-dimensional frequency component prior to feature extraction.

A motion vector detection apparatus of a fourth preferred embodiment according to the present invention is described below with reference to FIG. 9, where the same reference numbers have been employed to designate like parts for FIG. 1, and only the differences are discussed.

Reference numerals 21B and 31B denote feature extraction circuits, which correspond to the feature extraction circuits 21A and 31A shown in FIG. 1. The feature extraction circuits 21B and 31 B perform feature extraction using integral projection and provide frame matching elements.

Figure 10A:
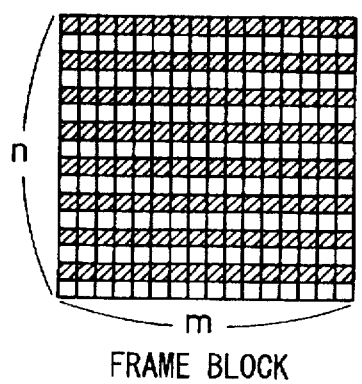
FIGS. 10A–F are diagrams illustrating the frame/field matching elements in the present invention.
Figure 10B:
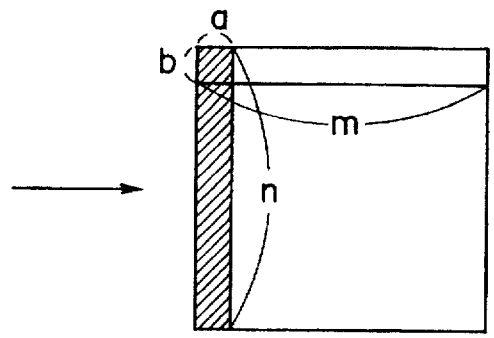
Figure 10C:
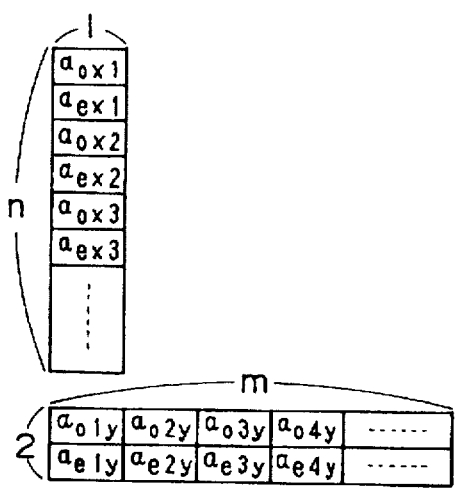
Figure 10D:
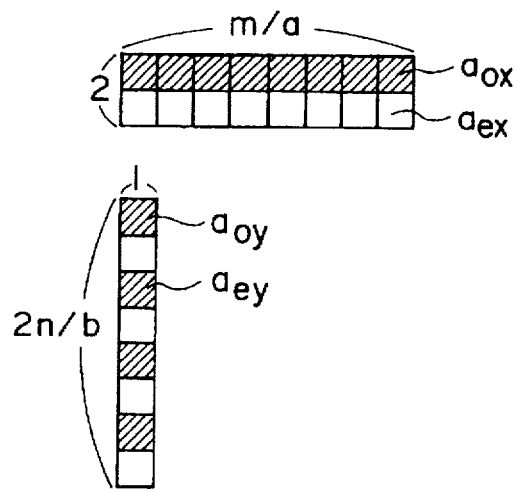

In this embodiment, a frame block with (m×n) pixels shown in FIG. 10A is divided into minor blocks each of which has (a×n) pixels as shown in FIG. 10B, and minor blocks each of which has (n×b) pixels. The integration of all pixels in the same field for each minor block gives the matching elements aox, aex, aoy, aey, as shown in FIG. 10D. For example, as shown in FIG. 10C, when (1×n) pixels (aox1, aox2, aox3, . . . aex1, aex2, aex3, . . . ) constitute the minor block with (a×n) pixels, the matching elements are obtained from aox=aox1+aox2+aox3 . . . , aex=aex1+aex2+aex3 When (m×2) pixels (ao1y, ao2y, ao3y, . . . ae1y, ae2y, ae3y, . . . ) constitute the minor block with (m×2) pixels, the matching elements are obtained from aoy=ao1y+ao2y+ao3y . . . , aey=ae1y+ae2y+ae3y . . .

Figure 10E:
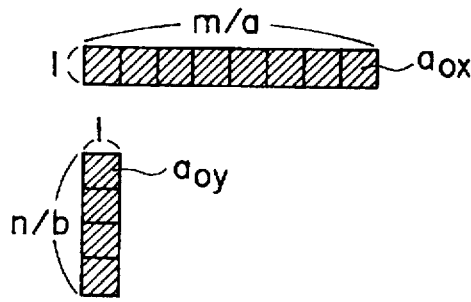
Figure 10F:
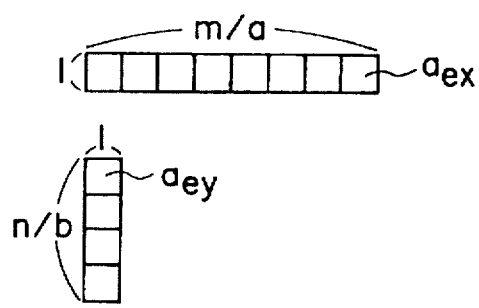

As shown in FIG. 10D, the frame matching elements provided from the feature extraction circuits 21B and 31B, are divided into fields by the data division circuits 24B and 34B, so that odd-field matching elements in FIG. 10E and even-field matching elements in FIG. 10F are obtained.

Figure 11A:
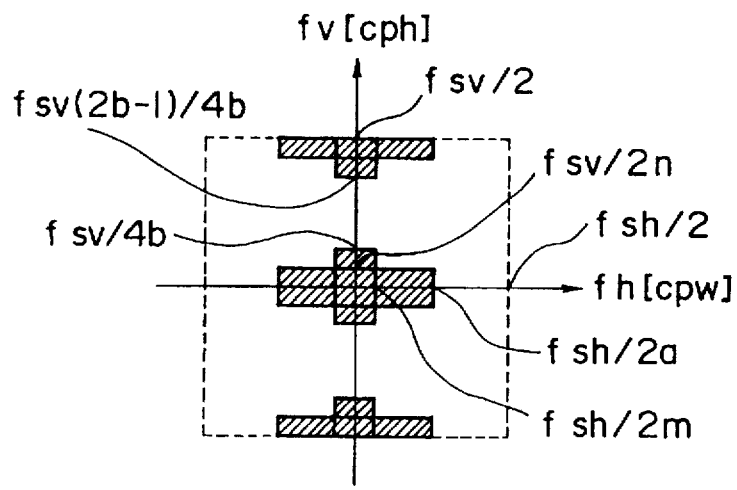
FIGS. 11A–C are diagrams illustrating the two-dimensional frequency components for frame/field matching elements in the present invention.
Figure 11B:
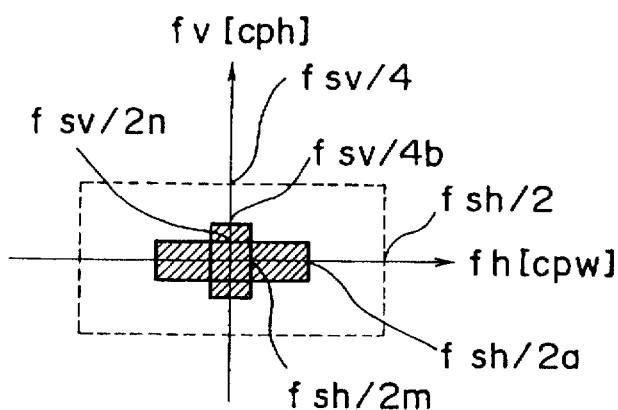
Figure 11C:
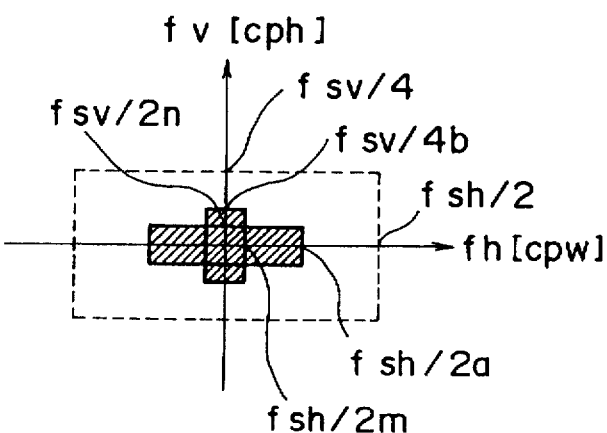

In FIG. 11A, the hatched areas correspond to a two-dimensional frequency component for the feature-extracted frame matching elements, and the area defined by the dashed lines corresponds to a two-dimensional frequency component prior to feature extraction. It is obvious from the figure that the vertical high-level components are extracted for the two-dimensional frequency component for the frame matching elements. FIG. 11B and FIG. 11C show two-dimensional frequency components for the odd- and even-field matching elements, respectively.

The frame matching elements provided from the feature extraction circuits 21B and 31B, are supplied to a matching circuit 40FL. The odd-field matching elements provided from the data division circuits 24B and 34B, are supplied to a matching circuit 40FO while the even-field matching elements provided from the data division circuits 24B and 34B, are supplied to a matching circuit 40FE.

Since the other portions in this embodiment are similar to those for the embodiment shown in FIG. 1; an estimation circuit 41FL outputs frame motion vectors, an estimation circuit 41FO outputs odd-field motion vectors, and an estimation circuit 41FE outputs even-field motion vectors. Thus, this embodiment has the same advantages as that of the embodiment shown in FIG. 1, and can further reduce the scale of circuitry due to feature extraction using integral projection.

A motion vector detection apparatus of a fifth preferred embodiment according to the present invention is described below with reference to FIG. 12, where the same reference numbers have been employed to designate like parts for FIG. 4, and only the differences are discussed.

Reference numerals 22B, 23B, 32B, and 33B denote feature extraction circuits, which correspond to the feature extraction circuits 22, 23, 32, and 33, respectively, shown in FIG. 4. The feature extraction circuits 22B, 23B, 32B, and 33B perform feature extraction using integral projection in order to provide odd- and even-field matching elements.

A field block with (m×n/2) pixels for each odd or even field as shown in FIG. 13A, is divided into minor blocks each of which has (a×n/2) pixels as shown in FIG. 13B, and minor blocks each of which has (m×b/2) pixels. The integration of all pixels for each minor block gives the matching elements aox, aoy, aex, and aey, as shown in FIG. 13D. For example, as shown in FIG. 13C, when (1×n/2) pixels (aox1, aox2, aox3, . . . ) and (m×1) pixels (ao1y, ao2y, ao3y, . . . ) constitute the minor block for the odd field, the matching elements are obtained from aox=aox1+aox2+aox3+ . . . . aoy=ao1y+ao2y+ao3y+ . . . . Similarly, when (1×n/2) pixels (aex1, aex2, aex3, . . . ) and (m×1) pixels (ae1y, ae2y, ae3y, . . . ) constitute the minor block for the even field, the matching elements are obtained from aex=aex1+aex2+aex3+ . . . . aey=ae1y+ae2y+ae3y+ . . . .

The odd- and even-field matching elements provided from the feature extraction circuits 22B, 23B, 32B, and 33B, as shown in FIG. 13D, are synthesized by data synthesis circuits 25B and 35B so that the frame matching elements shown in FIG. 13E are produced. In this case, the two-dimensional frequency components for the odd- and even-field matching elements correspond to the hatched areas in FIG. 11B and 11C, and the two-dimensional frequency component prior to feature extraction corresponds to the area defined by dashed lines in FIG. 11A.

The frame matching elements provided from the data synthesis circuits 25B and 35B, are supplied to a matching circuit 40FL. The odd-field matching elements provided from the feature extraction circuits 22B and 32B, are supplied to a matching circuit 40FO, while the even-field matching elements provided from the feature extraction circuits 23B and 33B, are supplied to a matching circuit 40FE.

Since the other portions in this embodiment are similar to the embodiment shown in FIG. 4, an estimation circuit 41FL outputs frame motion vectors, an estimation circuit 41FO outputs odd-field motion vectors, and an estimation circuit 41FE outputs even-field motion vectors. This embodiment has the same advantages as that of the embodiment shown in FIG. 4, and can further reduce the scale of circuitry due to feature extraction using integral projection.

Figure 6:
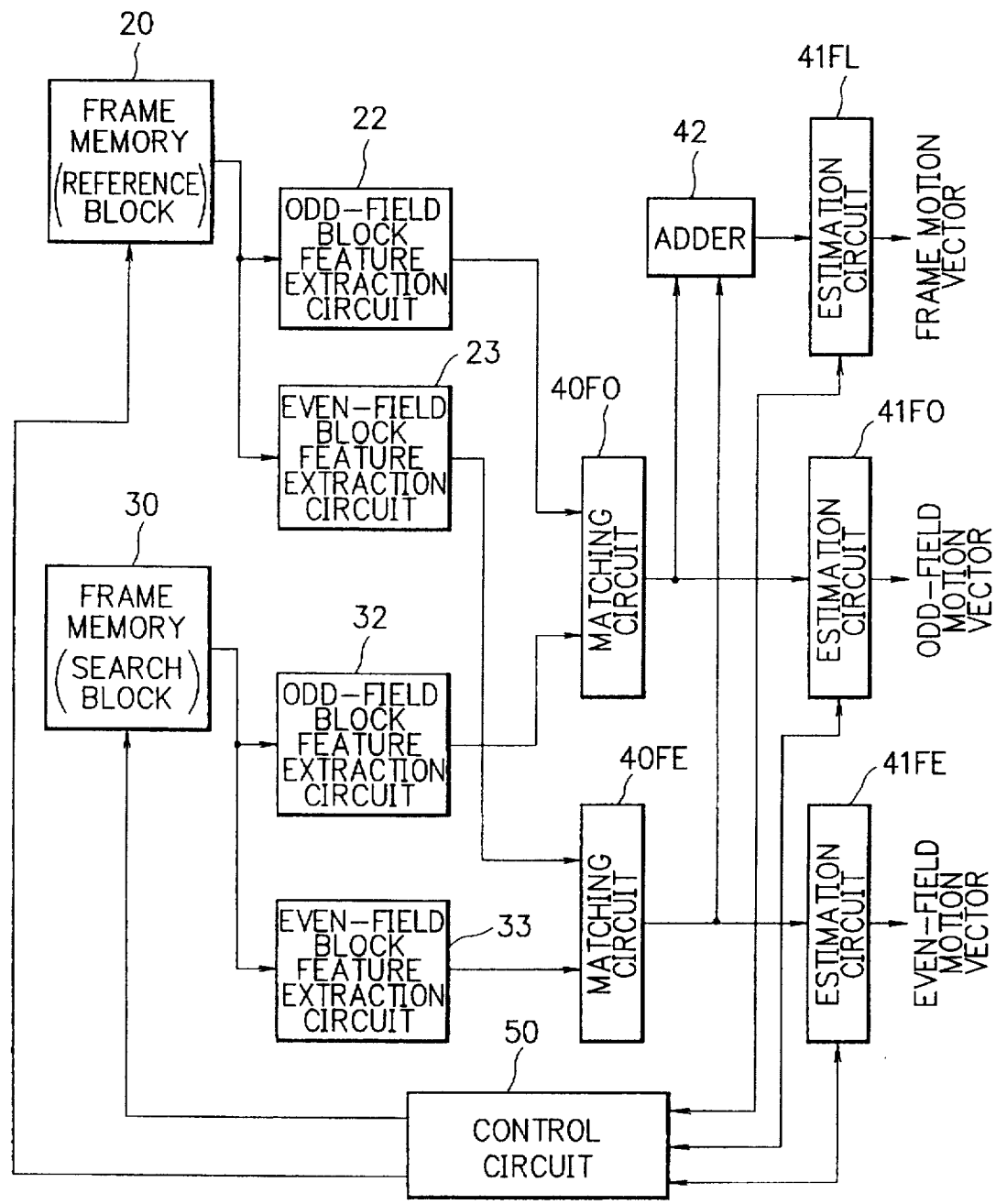
FIG. 6 is a block diagram illustrating a construction of a third embodiment of a motion vector detection apparatus of the present invention.

Although the fourth embodiment shown in FIG. 9 and the fifth embodiment shown in FIG. 12 correspond to the first embodiment shown in FIG. 1 and the second embodiment shown in FIG. 4, respectively, the third embodiment shown in FIG. 6 can be constructed with the feature extraction circuits 22B, 23B, 32B, and 33B instead of the feature extraction circuits 22, 23, 32, and 33, similarly to the fifth embodiment.

Figure 14:
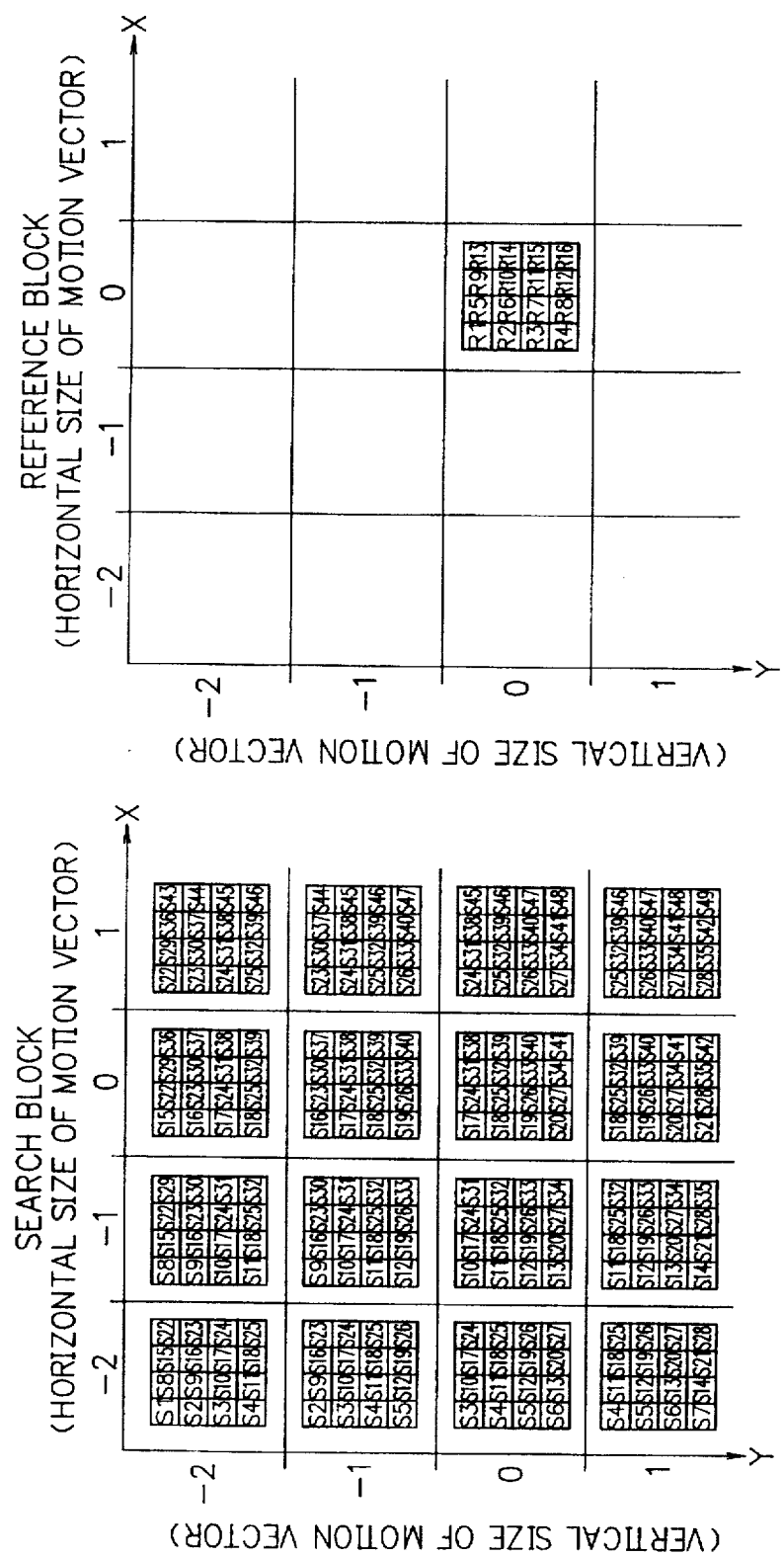
FIG. 14 is a diagram illustrating a frame motion vector in the present invention.

These embodiments are described below more concretely. FIG. 14 shows the reference and search blocks in the frame structure and the range of the search block. The frame block has (4×4) pixels. The matching process between the reference block with pixels R1 to R16 and sixteen patterns of search blocks within the range of the search block with pixels S1 to S49, is performed, and the position of the best matched search block is determined to be the frame motion vector.

FIG. 15 shows the reference block and the search block for the odd and even fields in the field structure. The field block has (4×2) pixels. The matching process between the reference block with odd-field pixels R1, R3, ... R11, R15 and sixteen patterns of search blocks within the range of the search block with pixels S1 to S48, is performed, and the position of the best matching search block is determined to be the odd-field vector. The matching process between the reference block with even field pixels R2, R4, ... R12, R16 and sixteen patterns of search blocks within the range of the search block with pixels S2 to S49, is performed, and the position of the best matched search block is determined to be the even-field vector.

When the motion vector of the odd field is MVo(X, Y) and the motion vector of the even field is MVe(X, Y), the pixels in the field search blocks at that position are equal to the pixels in the frame search block at the position of the frame motion vector MV(X, 2Y). Accordingly, as long as such relation is maintained, frame matching elements can be produced from the matching elements provided by the field feature extraction.

It is obvious from FIG. 14 and FIG. 15 that the matching process for the reference frame block must be performed for the sixteen search frame blocks, and that the matching process for the reference field block must performed for the sixteen patterns of the search field blocks for each of the odd and even fields. Generally, it is necessary that these matching processes are performed in sixteen clocks, the number of which is equal to the number of the pixels in the reference block. Accordingly, one search block must be processed in one clock, and one frame, with one odd field and one even field, must be simultaneously processed.

In an embodiment whereby frame and field matching elements are provided separately, feature extraction for the frame and field structure is performed as described below. In feature extraction for the frame structure, a frame block with (4×4) pixels as shown in FIG. 16A, is divided into minor blocks each of which has (1×4) pixels and is divided into minor blocks each of which has (4×1) pixels, as shown in FIG. 16B, and the integration of all pixels in each of the minor blocks gives the frame matching elements shown in FIG. 16C. In FIG. 16D, the hatched areas correspond to two-dimensional frequency components for the feature-extracted frame matching elements, and the area defined by the dashed lines corresponds to a two-dimensional frequency component prior to feature extraction.

In feature extraction for the field structure, a frame block with (4×2) pixels in each odd or even field as shown in FIG. 17A, is divided into minor blocks each of which has (1×2) pixels, and minor blocks each of which has (4×1) pixels as shown in FIG. 17B. The integration of all pixels in each of the minor blocks gives the odd- and even-field frame matching elements as shown in FIG. 17C. In FIG. 17D, the hatched areas correspond to a two-dimensional frequency component for the feature-extracted frame matching elements, and the area defined by the dashed lines corresponds to a two-dimensional frequency component prior to feature extraction.

Figure 18A:
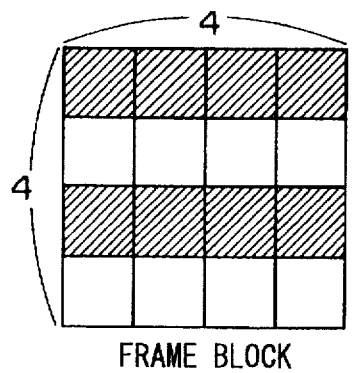
FIGS. 18A–F are diagrams illustrating the frame/field matching elements in the present invention.
Figure 18B:
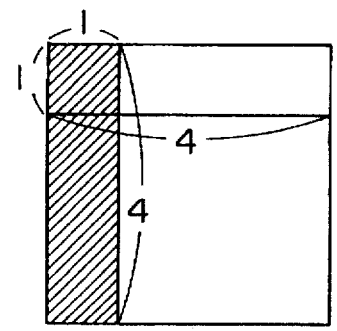

Feature extraction is performed as described below in the fourth embodiment shown in FIG. 9, whereby the frame matching elements are produced by feature extraction and the field matching elements are produced by the division of the frame matching elements. In this embodiment, a frame block with (4×4) pixels shown in FIG. 18A is divided into minor blocks each of which has (1×4) pixels and minor blocks each of which has (4×1) pixels as shown in FIG. 18B. The integration of all pixels in the same field for each minor block gives the matching elements aox, aex, aoy, aey, as shown in FIG. 18D.

Figure 18C:
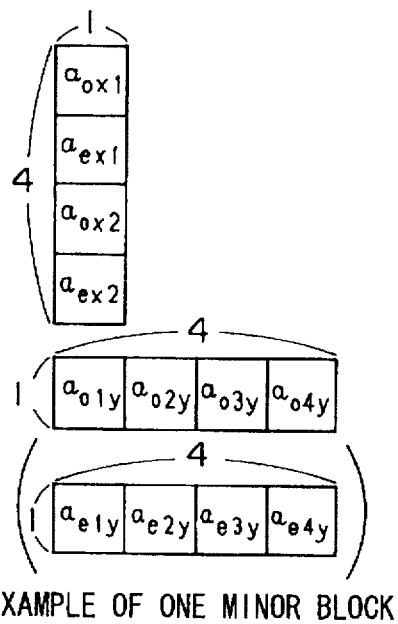

For example, as shown in FIG. 18C, when pixels (aox1, aox2, aex1, aex2) constitute the minor block with (1×4) pixels, the matching elements are obtained from aox=aox1+aox2, aex=aex1+aex2. When pixels (ao1y, ao2y, ao3y, ao4y) or (ae1y, ae2y, ae3y, ae4y) constitute the minor block with (4×1) pixels, the matching elements are obtained from aoy=ao1y+ao2y+ao3y+ao4y, aey=ae1y+ae2y+ae3y+ae4y, as shown in FIG. 18C.

Figure 18D:
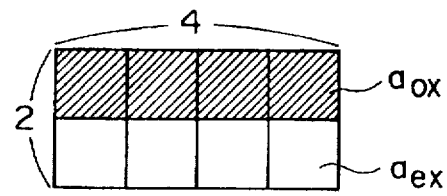
Figure 18E:
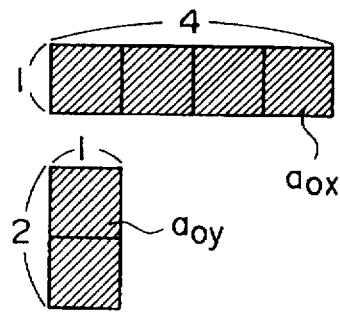
Figure 18F:
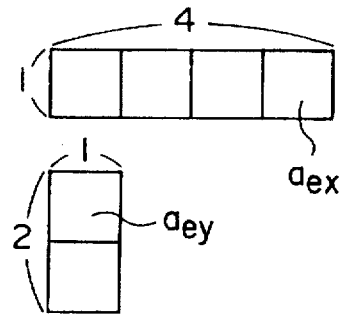

The frame matching elements as shown in FIG. 18D are divided, so that the odd-field matching elements shown in FIG. 18E and the even-field matching elements shown in FIG. 18F are produced.

Figure 19A:
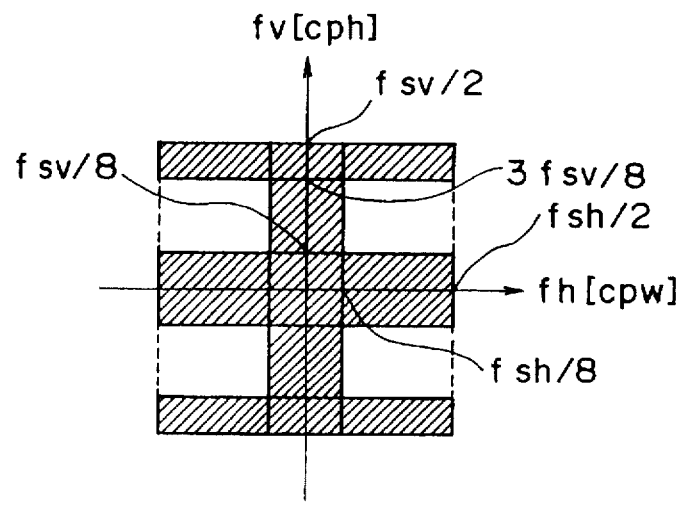
FIGS. 19A–C are diagrams illustrating the two-dimensional frequency components for frame/field matching elements in the present invention.
Figure 19B:
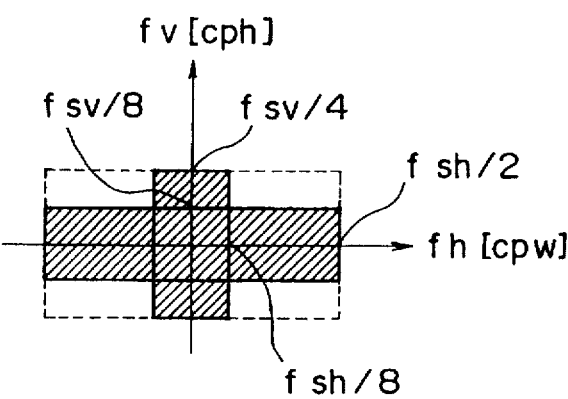
Figure 19C:
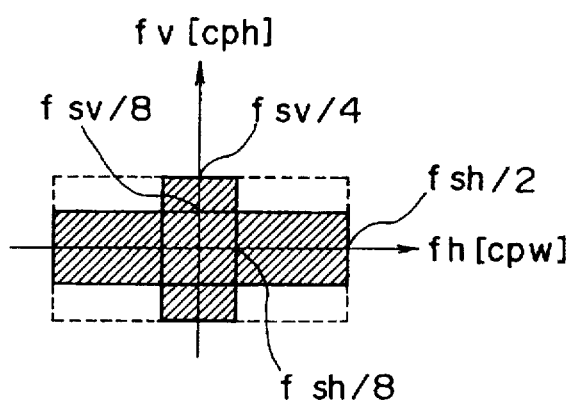

In FIG. 19A, the hatched areas correspond to a two-dimensional frequency component for the feature-extracted frame matching elements, and the area defined by the dashed lines corresponds to a two-dimensional frequency component prior to feature extraction. It is obvious from the figure that the vertical high-level components are extracted for the two-dimensional frequency component for the frame matching elements. FIG. 19B and FIG. 19C show two-dimensional frequency components for the odd- and even-field matching elements, respectively.

Feature extraction is performed as described below in the fifth embodiment shown in FIG. 12, whereby the odd- and even-field matching elements are produced by feature extraction and the frame matching elements are produced by the synthesis of the odd- and even-field matching elements.

In this embodiment, a frame block with (4×2) pixels in each odd or even field shown in FIG. 20A is divided into minor blocks each of which has (1×2) pixels and minor blocks each of which has (4×1) pixels as shown in FIG. 20B. The integration of all pixels for each minor block gives matching elements aox, aex, aoy, and aey, as shown in FIG. 20D. For example, as shown in FIG. 20C, when pixels (aox1, aox2) and (ao1y, ao2y, ao3y, ao4y) constitute the minor block for the odd field, the matching elements are obtained from aox=aox1+aox2, aoy=ao1y+ao2y+ao3y+ ao4y. Similarly, when pixels (aex1, aex2) and (ae1y, ae2y, ae3y, ae4y) constitute the minor block for the even field, the matching elements are obtained from aex=aex1+aex2, aey= ae1y+ae2y+ae3y+ae4y.

The odd- and even-field matching elements as shown in FIG. 20D are synthesized, so that the frame matching elements shown in FIG. 20E are produced. In this case, the two-dimensional frequency components for the odd- and even-field matching elements correspond to the hatched areas in FIG. 19B and 19C, and the two-dimensional frequency component prior to feature extraction corresponds to the area defined by the dashed lines in FIG. 19A.

Figure 21:
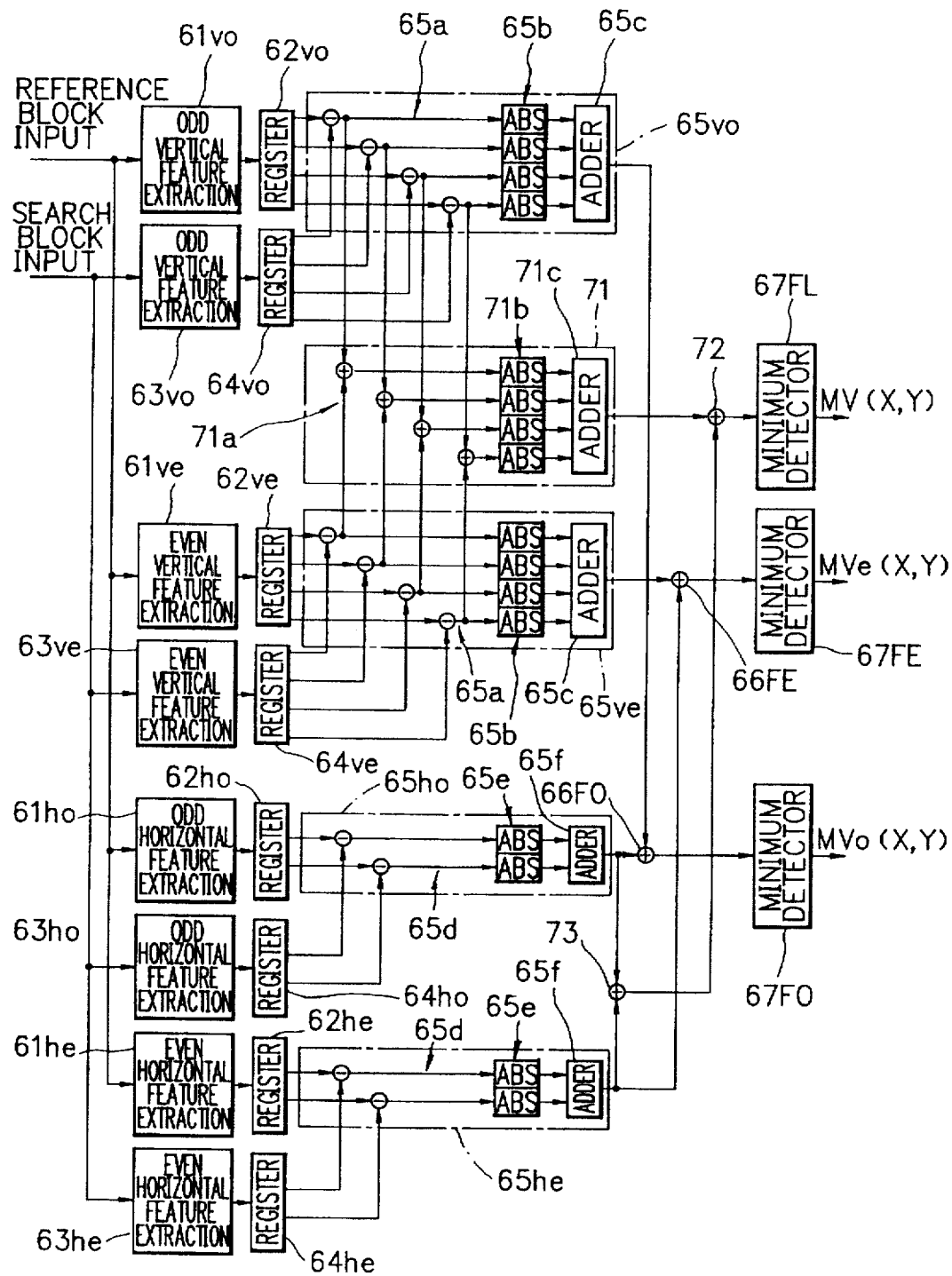
FIG. 21 is a block diagram illustrating a construction of a sixth embodiment of a motion vector detection apparatus of the present invention.

FIG. 21 shows a construction of a sixth embodiment of the motion vector detection apparatus according to the present invention. With this embodiment, a field block has (4×2) pixels, odd and even field matching elements are obtained by the feature extraction using integral projection, and frame matching elements (as shown in FIG. 20) are produced by the synthesis of these matching elements.

In FIG. 21, the reference odd-field block (shown in FIG. 20A) is supplied to the feature extraction circuits 61vo and 61ho, and the reference even-field block (shown in FIG. 20A) is supplied to the feature extraction circuit 61ve and 61he. The feature extraction circuit 61vo, using the vertical integral projection, calculates the odd-field matching element aox (shown in FIG. 20D), which is stored in a register 62vo.

The feature extraction circuit 61ho, using the horizontal integral projection, calculates the odd-field matching element aoy (shown in FIG. 20D), which is stored into a register 62ho. The feature extraction circuit 61ve, using the vertical integral projection, calculates the even field matching element aex (shown in FIG. 20D), which is stored in a register 62ve. The feature extraction circuit 61he, using the horizontal integral projection, calculates the even-field matching element aey (shown in FIG. 20D), which is stored in a register 62he.

The search odd-field block (shown in FIG. 20A) is supplied to the feature extraction circuit 63vo and 63ho, and the search even-field block (shown in FIG. 20A) is supplied to the feature extraction circuit 63ve and 63he. The feature extraction circuit 63vo, using the vertical integral projection, calculates the odd field matching element aox (shown in FIG. 20D), which is stored into a register 64vo.

The feature extraction circuit 63ho, using the horizontal integral projection, calculates the odd-field matching element aoy (shown in FIG. 20D), which is stored in a register 64ho. The feature extraction circuit 63ve, using the vertical integral projection, calculates the even-field matching element aex (shown in FIG. 20D), which is stored in a register 64ve. The feature extraction circuit 63he, using the horizontal integral projection, calculates the even-field matching element aey (shown in FIG. 20D), which is stored in a register 64he.

The odd-field matching elements aox which are stored in the registers 62vo and 64vo in accordance with each of the search field blocks, are supplied to a matching circuit 65vo, where the matching process is performed. Specifically, a subtractor 65a calculates the difference between each set of four matching elements aox which are stored in the registers 62vo and 64vo, an absolutization circuit 65b absolutizes the differences, and an adder 65c adds up the absolutized differences. The even-field matching elements aex which are stored into the registers 62ve and 64ve in accordance with each of the search field blocks, are supplied to a matching circuit 65ve, where the matching process is performed in a similar fashion to the matching circuit 65vo described above.

The odd-field matching elements aoy which are stored into the registers 62ho and 64ho in accordance with each of the search field blocks, are supplied to a matching circuit 65ho, where the matching process is performed. Specifically, a subtractor 65d calculates the difference between each set of four matching elements aoy which are stored in the registers 62ho and 64ho, an absolutization circuit 65e absolutizes the differences, and an adder 65f adds up the absolutized differences. The even-field matching elements aey which are stored into the registers 62he and 64he in accordance with each of the search field blocks, are supplied to a matching circuit 65he, whereby the matching process is performed in a fashion similar to that for the matching circuit 65ho described above.

Signals provided from the matching circuits 65vo and 65ho in accordance with each of the search field blocks, are added together by an adder 66FO, and the added signal is supplied as an estimated value to a minimum detector 67FO. The minimum detector 67FO outputs the position of the search field block corresponding to the minimum for the estimated values for sixteen patterns of the search field blocks (odd) in FIG. 15, which is the odd-field motion vector MVo(X, Y).

Signals provided from the matching circuits 65ve and 65he in accordance with each of the search field blocks, are added together by an adder 66FE, and the added signal is supplied as an estimated value to a minimum detector 67FE. The minimum detector 67FE outputs the position of the search field block corresponding to the minimum for the estimated values for sixteen patterns of the search field blocks (even) in FIG. 15, which is the even-field motion vector MVe(X, Y).

A set of four difference signals provided from the subtractors 65a in the matching circuits 65vo and 65ve, are added together by an adder 71a in a matching circuit 71, the added signals are absolutized by an absolutization circuit 71b, and the absolutized signal are added together by an adder 71c. The output signal from the matching circuit 71 is supplied to an adder 72.

The output signals from the matching circuit 65ho and 65he are added together by an adder 73, and the added signal is supplied to the adder 72. The output signal from the adder 72 is supplied as an estimated value to a minimum detector 67FL. The minimum detector 67FL outputs the position of the search field block corresponding to the minimum for the estimated values for sixteen patterns of the search frame blocks in FIG. 14, which is the frame motion vector MV(X, Y).

The embodiment can be constructed from the feature extraction circuits used for producing the odd- and even-field matching elements, thereby eliminating a feature extraction circuit for obtaining the frame matching elements and reducing the scale of circuitry, in a fashion similar to the other embodiments.

Figure 22:
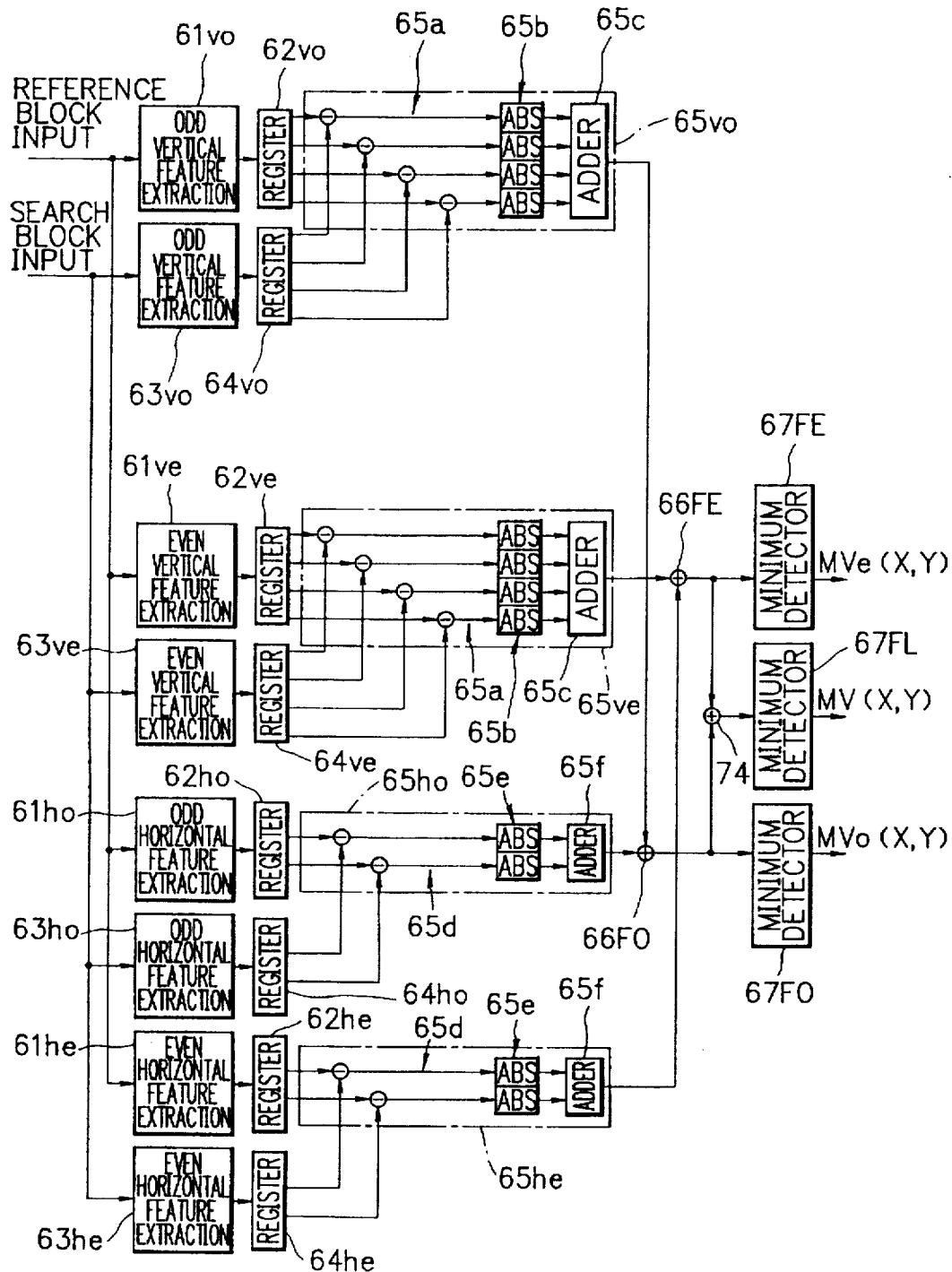
FIG. 22 is a block diagram illustrating a construction of a seventh embodiment of a motion vector detection apparatus of the present invention.

A motion vector detection apparatus of a seventh preferred embodiment according to the present invention is described below with reference to FIG. 22, where the same reference numbers have been employed to designate like parts for FIG. 21, and only the differences are discussed.

In the embodiment, output signals provided from the adders 66FO and 66FE, in other words, estimated values for the odd and even fields are added together by an adder 74, and the added signal is supplied as an estimated value to a minimum detector 67FL. The minimum detector 67FL outputs a frame motion vector MV(X, Y). The other portions are constructed in a fashion similar to the sixth embodiment. This embodiment eliminates the matching circuit 71 in the sixth embodiment shown in FIG. 21, thereby reducing the scale of circuitry.

In the conventional frame feature extraction circuit, for example, when (m×n) pixel data are converted into (m/2× n/2) data as shown in FIG. 42A, a two-dimensional filter (LPF) shown in FIG. 42B is used and the black portions in FIG. 42C are sub-sampled. In this construction, when the signal includes a large amount of a vertical high-level components due to a change in shape and movement of an object between fields, feature extraction cannot be satisfactorily performed. According to a construction described below, the vertical high-level components can be extracted, so that feature extraction for blocks is improved.

Figure 23A:
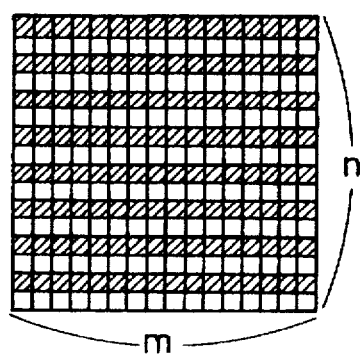
FIG. 23A–E are diagrams illustrating an example of a feature extraction circuit in the present invention.
Figure 23B:
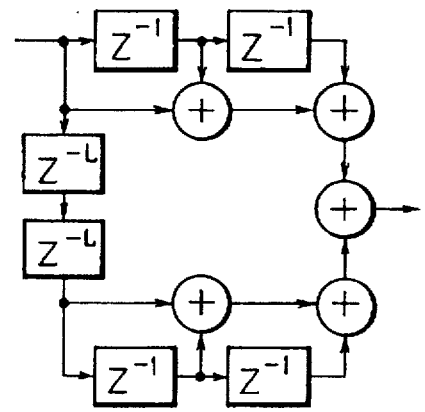
Figure 23C:
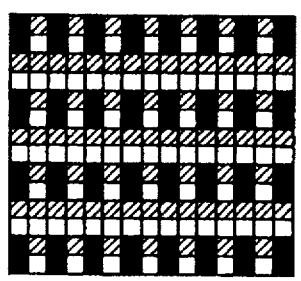
Figure 23D:
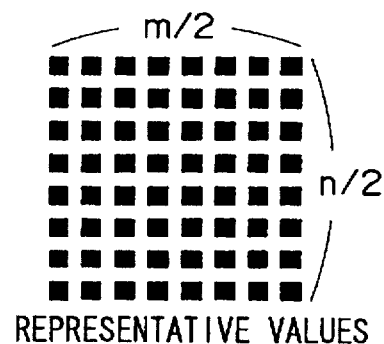
Figure 23E:
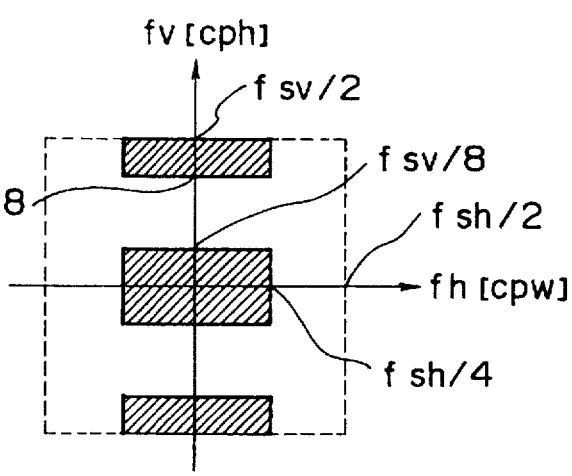

In the example, when (m×n) pixel data which constitute a frame block, are converted into (m/2×n/2) data (representative values), the (m×n) pixel data shown in FIG. 23A are passed through a two-dimensional filter (LPF) shown in FIG. 23B, and converted into the data shown in FIG. 23C. Thereafter, the black portions of the data is sub-sampled in order to obtain the (m/2×n/2) data shown in FIG. 23D. With the two-dimensional filter in FIG. 23B, Z-1 represents one pixel delay, and Z-L represents one line delay for the frame structure. In FIG. 23E, the hatched areas correspond to a two-dimensional frequency component after feature extraction, and the area defined by the dashed line corresponds to a two-dimensional frequency component prior to feature extraction.

As described above, because the two-dimensional filter (LPF) with a delay of two vertical lines is used, as shown in FIG. 23B, and the black portions in FIG. 23C are sub-sampled, the vertical high level components are extracted as the two-dimensional frequency components for the frame matching elements as shown in FIG. 23E. Accordingly, even when there is a radical change in shape and the signal includes a number of high frequency components, feature extraction can be satisfactorily performed and the accuracy of the detection of the frame motion vector can be improved.

Figure 24:
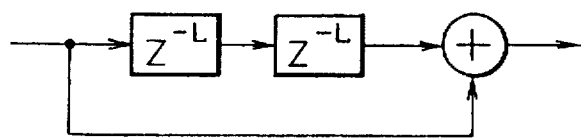
FIG. 24 is a diagram illustrating a two-dimensional filter (from a vertical, one-dimensional perspective) in the present invention.
Figure 25A:
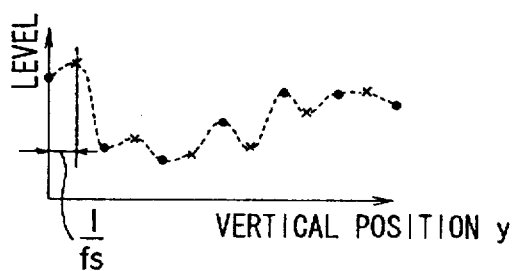
FIGS. 25A–H are diagrams illustrating signal processing for the frame structure in the present invention.
Figure 25B:
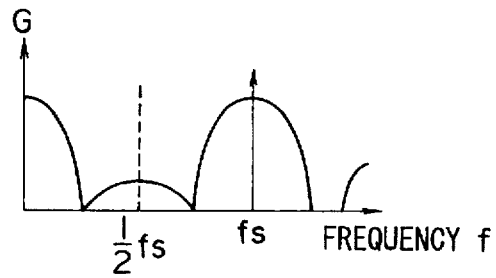

From a vertical, one-dimensional point of view, the two-dimensional filter shown in FIG. 23B can be illustrated as shown in FIG. 24. FIG. 25A shows data sampled at vertical sampling intervals from the frame structure data, with the symbol "●" representing the odd-field data, and symbol "×" representing the even-field data. FIG. 25B shows the vertical frequency component, and fs represents a vertical sampling frequency for the frame structure.

Figure 25C:
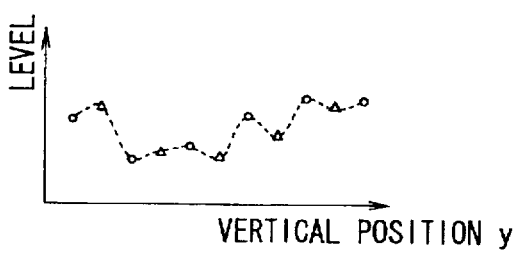
Figure 25D:
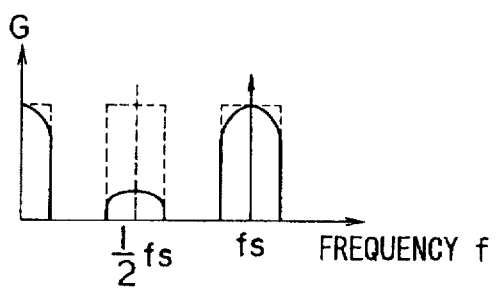
Figure 25E:
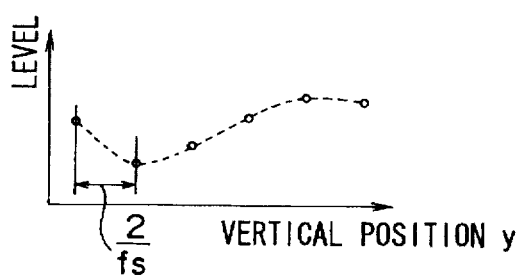

FIG. 25C shows data after being passed through the filter shown in FIG. 24, with the symbol "○" representing the odd-field data, and symbol "△" representing the even-field data. FIG. 25D shows the vertical frequency component. The dashed line in FIG. 25D represents an ideal vertical frequency characteristic shown in FIG. 25D. It is obvious from FIG. 25D that the signal component remains at fs/2. The odd- and even-field data shown in FIG. 25C are sub-sampled in order to produce the data shown in FIG. 25E and FIG. 25G, and the respective frequency component are shown in FIG. 25F and FIG. 25H.

Figure 26A:
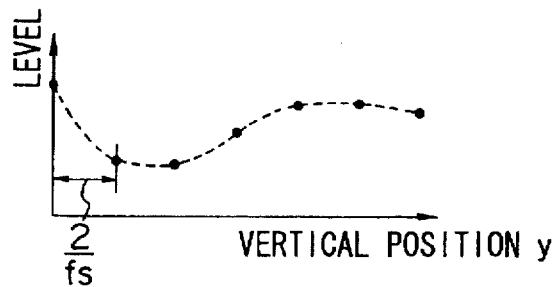
FIGS. 26A–H are diagrams illustrating signal processing for the field structure in the present invention.
Figure 26B:
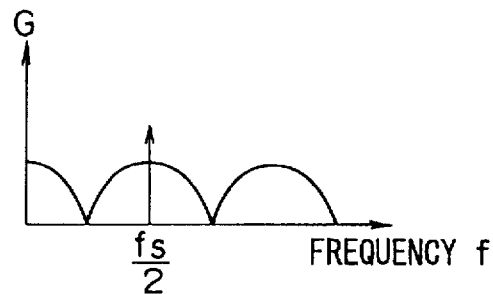
Figure 26C:
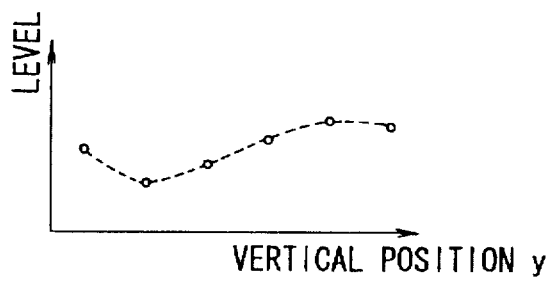
Figure 26D:
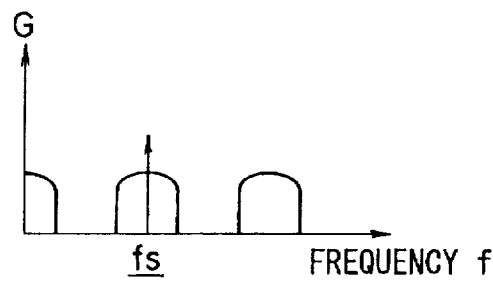
Figure 26E:
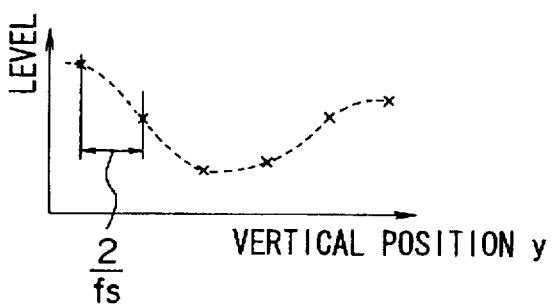
Figure 26F:
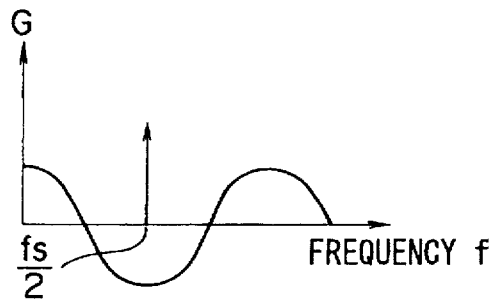
Figure 26G:
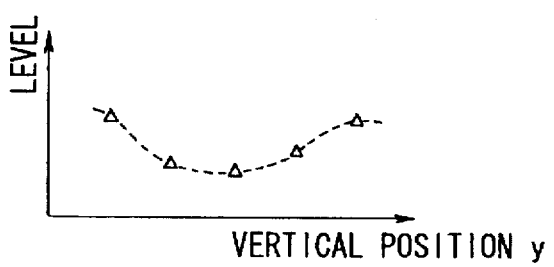

In FIG. 26A, the symbol "●" represents the odd-field data for the field structure, and the vertical frequency component are shown in FIG. 26B. In FIG. 26C, the symbol "○" represents data after being passed through the filter shown in FIG. 24, and the vertical frequency component are shown in FIG. 26D. In FIG. 26E, the symbol "×" represents the even-field data for the field structure, and the vertical frequency component are shown in FIG. 26F. In FIG. 26G, the symbol "△" represents data after being passed through the filter shown in FIG. 24, and the vertical frequency component are shown in FIG. 26H.

Figure 25F:
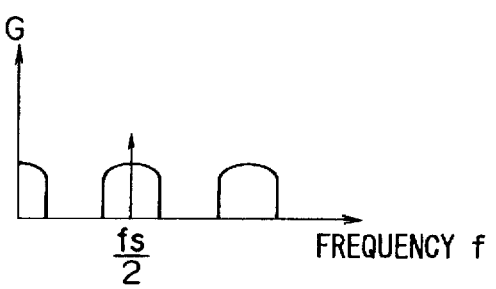
Figure 25G:
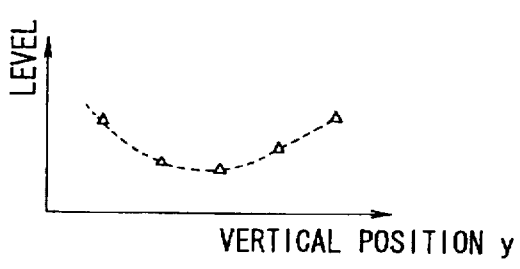
Figure 25H:
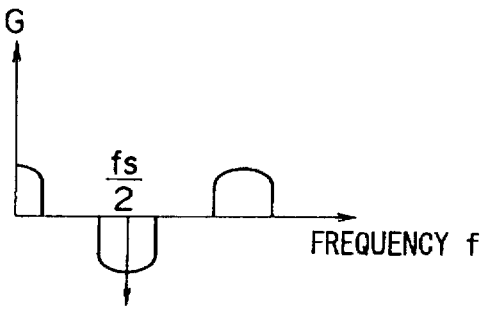
Figure 26H:
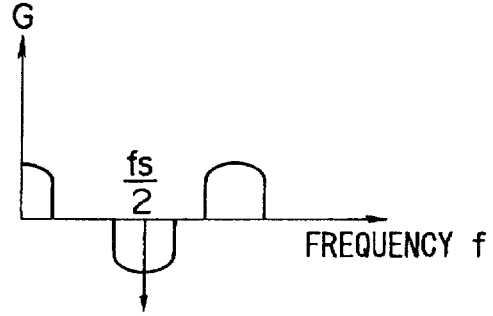
Figure 37:
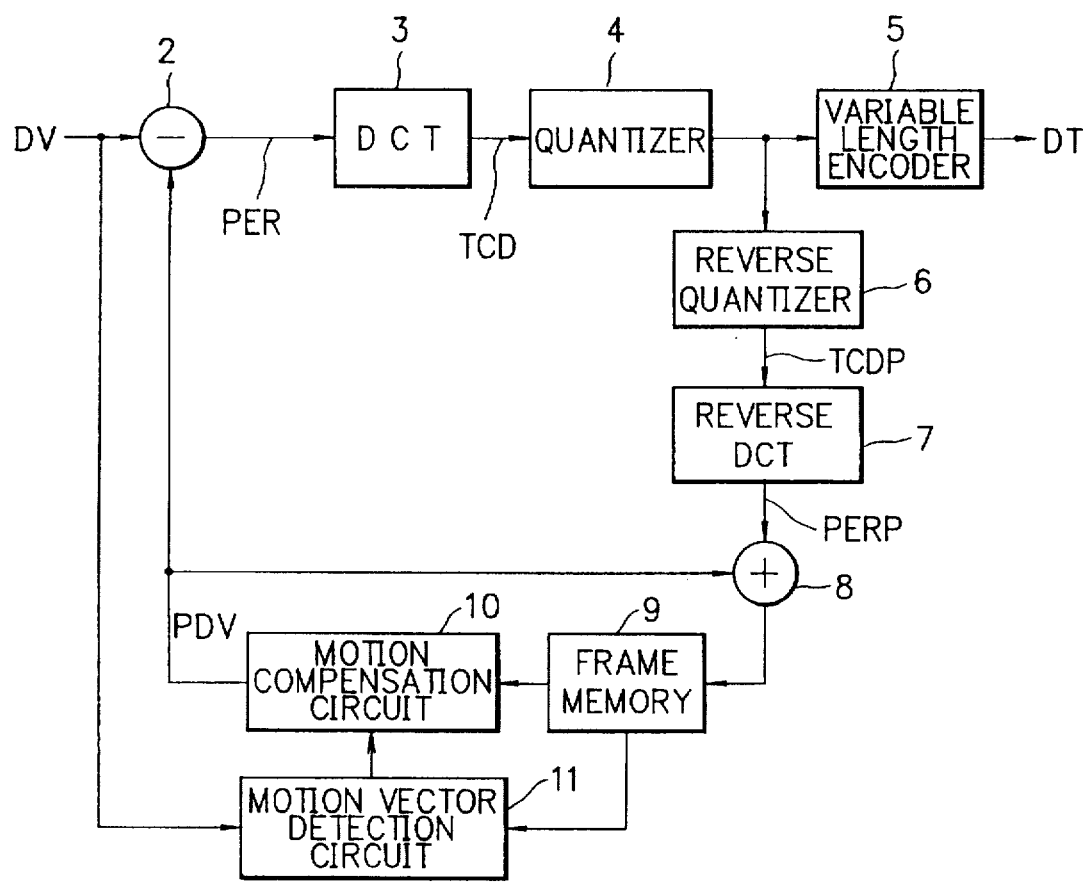
FIG. 37 is a diagram illustrating a construction of an example of a predictive coding system for compensating movement between frames.
Figure 38:
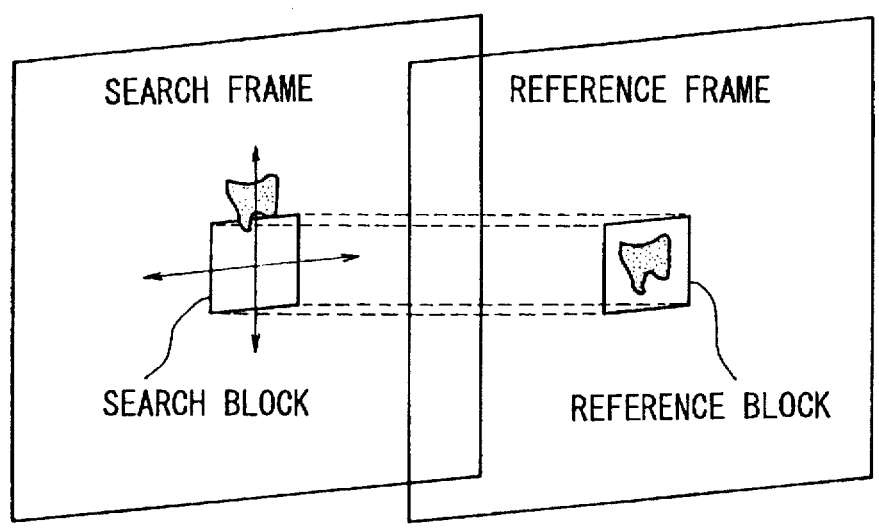
FIG. 38 is a diagram illustrating detection of the motion vector in the present invention.

The frequency components shown in FIG. 25F and FIG. 25H are equal to those shown in FIG. 26D and FIG. 26H. In other words, the data which are obtained by the merging of the odd- and even-field data into the frame structure and by the sub-sampling of the merged data through the filter, are equal to the data for the field structure which have passed through the filter. Accordingly, when the field structure odd- and even-field data are passed through the filter and are merged each other, the data provided are equal to the frame structure data which passed through the filter.

Accordingly, feature extraction for the frame signal as shown in FIG. 27, provides the advantages similar to that described in relation to FIG. 23. In this embodiment, (m×n/2) pixel data shown in FIG. 27A in each odd- or even-field block are passed through a two-dimensional filter (LPF) shown in FIG. 27B, and converted into the data shown in FIG. 27C. Thereafter, the black portions of the data is sub-sampled in order to obtain the (m/2×n/4) data for each odd or even field as shown in FIG. 27D. The odd- and even-field data are merged together into (m/2×n/2) data as shown in FIG. 27E. In FIG. 27F, the hatched areas correspond to two-dimensional frequency components after feature extraction, which components are equal to those shown in FIG. 23E.

A motion vector detection apparatus of an eighth preferred embodiment according to the present invention is described below with reference to FIG. 28, where the same reference numbers have been employed to designate like parts for FIG. 39, and only the differences are discussed.

In the embodiment, frame motion vectors are provided from frame matching elements which are obtained by feature extraction as shown in FIG. 23. The frame block with (m×n) pixels shown in FIG. 29A, is divided into minor blocks each of which has (a×b) pixels as shown in FIG. 29B, and the integration of all pixels in the same field for each minor block gives matching elements ao and ae, representative values as shown in FIG. 29D. For example, as shown in FIG. 29C, when (2×4) pixels (odd-field pixels ao1 to ao4 and even-field pixels ae1 to ae4) constitute the minor block, the matching elements are obtained from ao=ao1+ao2+ao3+ao4, ae=ae1+ae2+ae3+ae4. In FIG. 29E, the hatched areas correspond to a two-dimensional frequency component of the frame matching elements -after feature extraction, and the area defined by the dashed line corresponds to a two-dimensional frequency component prior to feature extraction.

Although the process for dividing the block into the minor blocks with (a×b) pixels and for integrating all pixels in the same field for each minor block may be performed with the two-dimensional low-pass filter and the sub-sampling process as described in relation to FIG. 23, the sampled values other than the sub-sampled portions must be calculated, thereby making the process inefficient. This is similar to embodiments described below.

In the eighth embodiment in FIG. 28, a pixel signal for a specified reference frame block which is read from a frame memory 20, is supplied to a feature extraction circuit 21C.

Within the feature extraction circuit 21C, the frame matching elements (FIG. 29D) are feature-extracted in the manner described in relation to FIG. 29, and are supplied to a matching circuit 40FL.

A pixel signal for a search frame block which is read from a frame memory 30, is supplied to a feature extraction circuit 31C. Within the feature extraction circuit 31C, the frame matching elements are feature-extracted in a fashion similar for the feature extraction circuit 21C, and are supplied to a matching circuit 40FL. The matching circuit 40FL and an estimation circuit 41FL are operated in a fashion similar to the circuits described in FIG. 39, and the estimation circuit 41FL outputs frame motion vectors corresponding to a number of reference frame blocks which are read from the frame memory 20.

A motion vector detection apparatus of a ninth preferred embodiment according to the present invention is described below with reference to FIG. 30. In FIG. 28, the same reference numbers have been employed to designate like parts for FIG. 39, and only the differences are discussed.

In the embodiment, frame motion vectors are provided from frame matching elements which are obtained by feature extraction as described in relation to FIG. 27. A field block with (m×n/2) pixels for each odd or even field as shown in FIG. 31A, is divided into minor blocks each of which has (a×b/2) pixels as shown in FIG. 31B, and the integration of all pixels for each minor block gives matching elements ao and ae, as shown in FIG. 31D. For example, as shown in FIG. 31C, when (2×2) pixels (ao1 to ao4, or ae1 to ae4) constitute the minor block for each odd or even field, the matching elements are obtained from ao=ao1+ao2+ao3+ao4, ae=ae1+ae2+ae3+ae4. The obtained odd- and even-field matching elements shown in FIG. 31D are synthesized together in order to produce frame matching elements shown in FIG. 31E. In FIG. 31F, the hatched areas correspond to two-dimensional frequency components after feature extraction, which components are equal to those shown in FIG. 29E.

In the ninth embodiment in FIG. 30, signals for specified reference odd- and even-field blocks which are read from a frame memory 20, are supplied to feature extraction circuits 22C and 23C. The feature extraction circuits 22C and 23C perform feature extraction and provide the odd- and even-field data (FIG. 31D) shown in FIG. 31. The odd- and even-field data are supplied to a data synthesis circuit 25C, and are synthesized together to produce the frame matching elements (FIG. 31E) which are supplied to a matching circuit 40FL.

Also, signals for the search field block which are read from the frame memory 30, are supplied to feature extraction circuits 32C and 33C. The feature extraction circuits 32C and 33C perform feature extraction and provide the odd- and even-field data in a similar fashion to the feature extraction circuits 22C and 23C. The odd- and even-field data are supplied to a data synthesis circuit 35C, and are synthesized together to produce the frame matching elements which are supplied to a matching circuit 40FL. The matching circuit 40FL and the estimation circuit 41FL are operated in a fashion similar to those shown in FIG. 39. The estimation circuits 41FL outputs odd- and even-field motion vectors which correspond to a number of the reference odd- and even-field blocks which are read from the frame memory 20.

A motion vector detection apparatus of a tenth preferred embodiment according to the present invention is described below with reference to FIG. 32, where the same reference numbers have been employed to designate like parts for FIG. 28, and only the differences are discussed.

Figure 49:
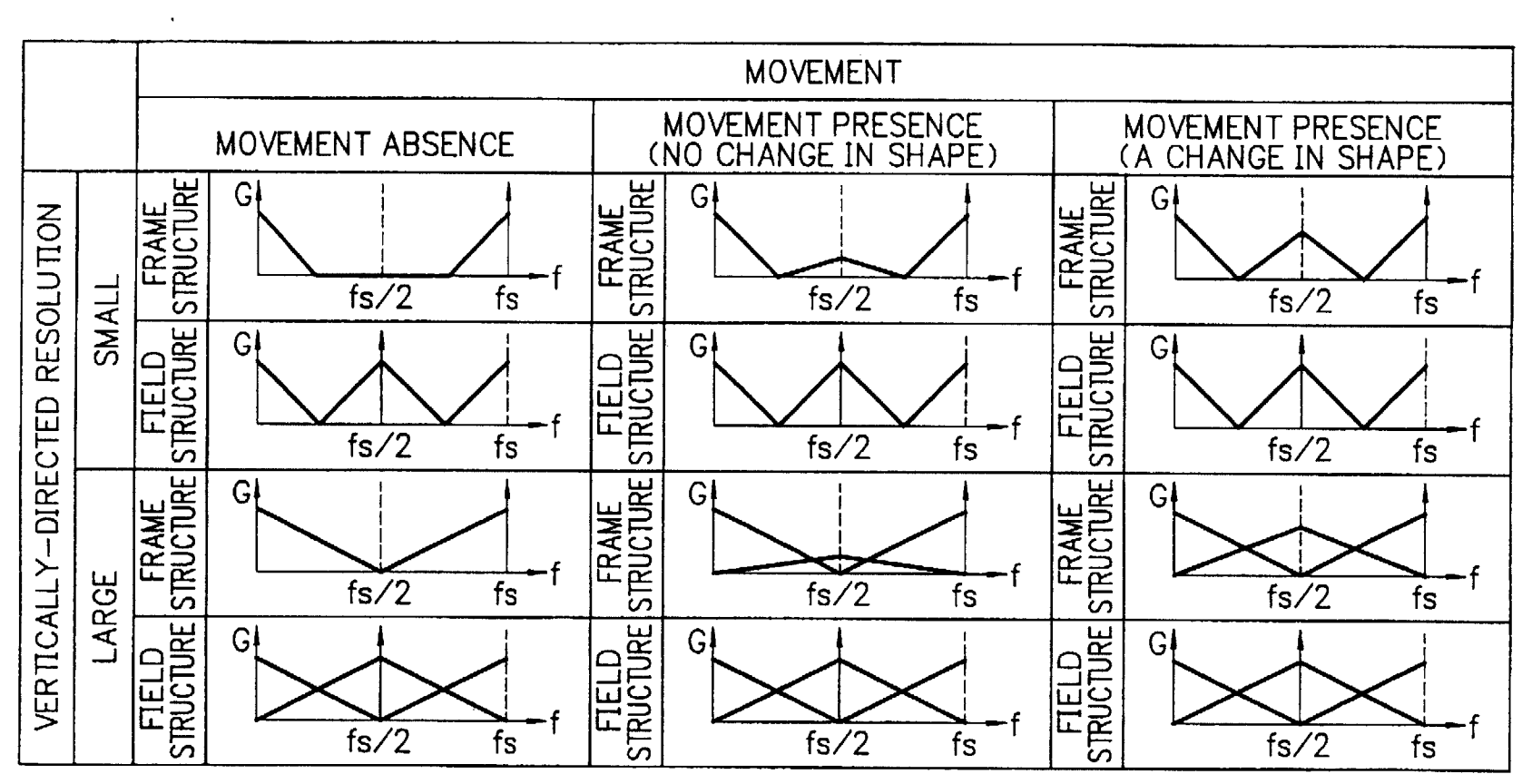

When there is movement in fields, the merged frame structure signal may include a high-level component as shown in FIG. 49. In the embodiment, an degree of movement between fields is detected, and the method of feature extraction is changed in accordance with such degree of movement. When there is radical movement, feature extraction for extracting only a vertical frequency component is performed.

In the tenth embodiment shown in FIG. 32, a pixel signal for a specified reference frame block which is read from a frame memory 20 is supplied to a field motion detection circuit 81. The field motion detection circuit 81 detects the relationship between odd and even fields which constitute one frame, and when there is a difference between them, it is determined that there is a large amount of movement between the fields. The relationship between fields may be detected in each block in which a motion vector is detected, or the detection can be switched for each frame in order to detect the relationship for one frame. When the detection is switched on a block basis, delay circuits 82 and 83, which are described below, perform delay for only one block, and when the detection is switched on a frame basis, the delay circuits 82 and 83 must perform delay for one frame.

The pixel signal for a specified reference frame block which is read from a frame memory 20, is passed through the delay circuit 82 described above for adjusting the timing of the signal in accordance with the delay time caused by the motion detection circuit 81, and is supplied to a feature extraction circuit 21D. The feature extraction circuit 21D changes the method of feature extraction in accordance with a detection signal provided from the motion detection circuit 81. When it is determined by the motion detection circuit 81D that there is radical movement, the feature extraction described in relation to FIG. 29 is performed so that a vertical high-level component is extracted.

On the other hand, when it is determined by the motion detection circuit 81 that there is little movement, the feature extraction described below is performed. A frame block with (m×n) pixels as shown in FIG. 33A, is divided into minor blocks each of which has (a×b) pixels as shown in FIG. 33B, and the integration of all pixels in the same field for each minor block gives matching elements aoe as shown in FIG. 33D.

For example, as shown in FIG. 33C, when (2×2) pixels (odd-field pixels ao1 and ao2, and even-field pixels ae1 and ae2) constitute the minor block, the matching elements are obtained from aoe=ao1+ao2+ae1+ae2. In FIG. 33E, the hatched area corresponds to a two-dimensional frequency component of the frame matching elements after feature extraction, and no vertical high-level component is extracted. In this example, the number of the matching elements is reduced and calculations are easily performed.

Referring to FIG. 32, the frame matching elements which are outputted from the feature extraction circuits 21D, are supplied to a matching circuit 40FL. A pixel signal for the search frame block which is read from a frame memory 30, is passed through a delay circuit 83 for adjusting the timing of signal in accordance with the delay time caused by the motion detection circuit 81, and is supplied to a feature extraction circuit 31D. The feature extraction circuit 31D performs feature extraction, in a fashion similar to the feature extraction circuit 21D, and provides the frame matching elements which are supplied to the matching circuit 40FL. The matching circuit 40FL and the estimation circuit 41FL are operated in a fashion similar to those in FIG. 28. The estimation circuits 41FL outputs frame motion vectors which correspond respectively to a number of the reference odd- and even-field blocks which are read from the frame memory 20.

A motion vector detection apparatus of a eleventh preferred embodiment according to the present invention is described below with reference to FIG. 34, where the same reference numbers have been employed to designate like parts for FIG. 32, and only the differences are discussed.

In the embodiment, the frame motion vectors which are outputted from the estimation circuit 41FL, are stored in a motion vector memory 84. When a specified block in a current frame is processed by the feature extraction circuits 21D and 31D, the motion vector for the previous frame from the specified block is read from the memory 84, and is supplied to a motion area predictive circuit 85, whereby the movement in the current frame is predicted. The feature extraction circuits 21D and 31D change the method of feature extraction based on the prediction output from the motion area predictive circuit 85. For example, when radical movement is predicted, the feature extraction, described in FIG. 29 is performed, and when little movement is predicted, feature extraction described in FIG. 33 is performed. The other circuits are constructed in a fashion similar to the embodiment shown in FIG. 32.

In the example in which the pixel signal for the frame block is passed through the two-dimensional filter shown in FIG. 23B and feature extraction is performed by the sub-sampling of the black portions in FIG. 23C, it is obvious from the positions of the black portions that the sampled phases are not positioned vertically at regular intervals, and accordingly, the frequency components for the hatched areas shown in FIG. 23E cannot be satisfactorily extracted. Such problem can be solved by the feature extraction described below.

In the example, the odd- and even-field block data with the (m×n/2) pixels shown in FIG. 35A are each passed through the respective two-dimensional filter (LPF) shown in FIG. 35B and converted into the data shown in FIG. 35C. Thereafter, the black portions of the data is sub-sampled, and the (m/2×n/4) field data for each odd or even field, as shown in FIG. 35D, are produced. These odd- and even-field data are merged together into (m/2×n/2) data, as shown in FIG. 35E. In FIG. 35F, the hatched areas correspond to a two-dimensional frequency component after feature extraction.

FIG. 36 shows that the sampled phases are positioned at regular intervals after feature extraction using the method described in FIG. 35. The symbol "○" represents sampled phases for the odd-field block, and since the symbol "▫" represents sampled phases after being passed through the two-dimensional filter according to a coefficient ratio of lines, the symbol "□" represents sampled phases after sub-sampling. The symbol "x" represents sampled phases for the even-field block, and since the symbol "▲" represents sampled phases after being passed through the two-dimensional filter according to a coefficient ratio of lines, the symbol "△" represents sampled phases after sub-sampling. Accordingly, the sampled phases for the merged data (frame matching elements) are positioned at regular intervals.

Although the example shown in FIG. 35 is employed in the embodiment in which the pixel signal for the frame block is passed through the two-dimensional filter, is sub-sampled, and is feature-extracted, it can also be employed in the embodiment which performs the division into the minor blocks and the integration of all pixels in each minor block as shown in FIG. 31. In this case shown in FIG. 31, when the pixels are divided into minor blocks, the odd-field data ao and the even-field data ae are obtained from ao=(ao1+ao2)/4+3 (ao3+ao4), ae=3 (ae1+ae2)/4+(ae3+ae4)/4.

Although not described in detail, in the embodiment whereby frame matching elements are produced from the frame block as shown in FIG. 23 and FIG. 29, the two-dimensional filter is switched when the odd- and even-field data is obtained, or a coefficient for the addition calculation for each pixel is changed, so that the sampled phases are positioned vertical at regular intervals.

In relation to the present invention, Japanese applications No. 06-043131 (filed on Feb. 17, 1990), No. 06-022223 (filed on Jan. 21, 1994), and No. 06-104707 (filed on Apr. 19, 1994) have been proposed by the present applicant. Each of the above applications is owned by the assignee of the present invention and hereby incorporated by reference. Applications corresponding to the three applications have been filed in the US.

It will be obvious to those having skill in the art that many changes may be made in the above-described details of the preferred embodiment of the present invention. The scope of the present invention, therefore, should be determined by the following claims.

What is claimed is:

1. A motion vector detection apparatus, comprising:
   reference odd-field block feature extraction means for actually dividing a reference odd-field block into a plurality of minor blocks and for determining a value for an odd-field matching element, which value represents pixels constituting each of said minor blocks;
   reference even-field block feature extraction means for actually dividing a reference even-field block into a plurality of minor blocks and for determining a value for an even-field matching element, which value represents pixels constituting each of said minor blocks;
   first data synthesis means for synthesizing together into frame matching elements said odd-field matching elements and even-field matching elements which are provided from said reference odd-field block feature extraction means and said reference even-field block feature extraction means;
   search odd-field block feature extraction means for actually dividing a search odd-field block into a plurality of minor blocks and for determining a value for an odd-field matching element, which value represents pixels constituting each of said minor blocks;
   search even-field block feature extraction means for actually dividing a search even-field block into a plurality of minor blocks and for determining a value for an even-field matching element, which value represents pixels constituting each of said minor blocks;
   second data synthesis means for synthesizing together into frame matching elements said odd-field matching elements and even-field matching elements which are provided from said search odd-field block feature extraction means and said search even-field block feature extraction means; and
   frame motion vector generating means for generating an frame motion vector in order to search for a search frame block which best matches reference frame block, based on said frame matching elements provided from said first and second data synthesis means.

2. The motion vector detection apparatus in accordance with claim 1, wherein said reference odd-field block feature extraction means, said even-field block feature extraction means, said search odd-field block feature extraction means, and said search even-field block feature extraction means weight the pixels constituting each of said minor blocks and calculate said representative values in order to arrange sampled phases for said frame matching elements provided from said first and second data synthesis means vertically at regular intervals.

3. A method for detecting a motion vector, comprising the steps of:

performing feature extraction to actually divide a reference odd-field block into a plurality of minor blocks and to determine a value for a reference odd-field matching element, which value represents pixels constituting each of said minor blocks;

performing feature extraction to actually divide a reference even-field block into a plurality of minor blocks and to determine a value for a reference even-field matching element, which value represents pixels constituting each of said minor blocks;

synthesizing said reference odd-field matching elements and said reference even-field matching elements together into reference frame matching elements;

performing feature extraction to actually divide a search odd-field block into a plurality of minor blocks and to determine a value for a search odd-field matching element, which value represents pixels constituting each of said minor blocks;

performing feature extraction to actually divide a search even-field block into a plurality of minor blocks and to determine a value for a search even-field matching element, which value represents pixels constituting each of said minor blocks;

synthesizing said search odd-field matching elements and said each even-field matching elements together into search frame matching elements; and generating an frame motion vector in order to search for a search frame block which best matches a reference frame block, based on said reference and search frame matching elements.

4. The method for detecting a motion vector in accordance with claim 3, further comprising the steps of weighting the pixels constituting each of said minor blocks and calculating said representative values in order to arrange sampled phases for said frame matching elements provided from said first and second data synthesis means vertically directed at regular intervals.

* * * * *